United States Patent
Xu

(10) Patent No.: US 7,165,252 B1
(45) Date of Patent: Jan. 16, 2007

(54) METHOD OF SCHEDULING EXECUTIONS OF PROCESSES WITH VARIOUS TYPES OF TIMING PROPERTIES AND CONSTRAINTS

(76) Inventor: Jia Xu, 1 Gilgorm Road, Toronto, Ontario (CA) M5N 2M4

( * ) Notice: Subject to any disclaimer, the term of this patent is extended or adjusted under 35 U.S.C. 154(b) by 0 days.

(21) Appl. No.: 09/336,990

(22) Filed: Jun. 21, 1999

(51) Int. Cl.
G06F 9/46 (2006.01)

(52) U.S. Cl. ...................... 718/102; 718/100
(58) Field of Classification Search ........ 709/100–108; 718/100, 102
See application file for complete search history.

(56) References Cited

U.S. PATENT DOCUMENTS

| | | | |
|---|---|---|---|
| 5,448,732 A * | 9/1995 | Matsumoto | 709/104 |
| 5,640,563 A | 6/1997 | Carmon | |
| 5,742,847 A | 4/1998 | Knoll et al. | |
| 6,086,628 A * | 7/2000 | Dave et al. | 716/7 |
| 6,178,542 B1 * | 1/2001 | Dave | 716/18 |
| 6,345,287 B1 * | 2/2002 | Fong et al. | 709/102 |
| 6,430,593 B1 * | 8/2002 | Lindsley | 709/103 |
| 6,438,573 B1 * | 8/2002 | Nilsen | 709/100 |

OTHER PUBLICATIONS

N. C. Audsley, et al, "The end of the line for static cyclic scheduling?" Proc. Fifth Euromicro Workshop on Real-Time Systems, 36-41, 1993.

N.C. Audsley et al, "Putting fixed priority scheduling theory into engineering practice for safety critical applications", 2nd IEEE RTAS'96, Boston, Jun. 1996, p. 2-10.

N.C. Audsley, et al, "On fixed priority scheduling, offsets and co-prime task periods", Information processing letters, 67, 1998, p. 65-69.

T. P.Baker, et al, "The cyclic executive model and Ada," Journal of Real-Time Systems, vol. 1, p. 7-25, Jun. 1989.

A. Burns, et al, "Generating Feasible Cyclic Schedules", Control Engineering Practice, vol. 3, No. 2, 1995, p. 151-162.

A. Burns, "Preemptive priority-based scheduling: an appropriate engineering approach", in Advances in Real-Time Systems, Ed. By S. H. Son, Prentice Hall, 1995, p. 225-248.

A. Burns, et al, "Effective analysis for engineering real-time fixed priority schedulers," IEEE Trans. Software Eng., 21, 475-480, 1995.

R. Devillers, et al, "General response time computation for the deadline driven scheduling of periodic tasks", Fundamenta Informaticae 34, 1999, p. 1-21.

G. Fohler, "Flexibility in Statically Scheduled Hard Real-Time Systems", Ph.D. thesis, Institute fur Technische Informatik, TUW, Austria, Apr. 1994, p. 1-101.

(Continued)

Primary Examiner—Meng-Al T. An
Assistant Examiner—Kenneth Tang

(57) ABSTRACT

A system and methods for scheduling execution of various types of processes. Using information gathered relating to the different processes, pre-run-time scheduling is integrated of run-time scheduling to guarantee that the executions of the processes will satisfy all the specified relations and constraints. Whenever a new set of processes arrives in the system, the system schedules their execution in two phases: a pre-run-time (off-line) phase performed by a pre-run-time scheduler, and a run-time scheduler (on-line) phase performed by a run-time scheduler.

42 Claims, 30 Drawing Sheets

OTHER PUBLICATIONS

Figure 1:
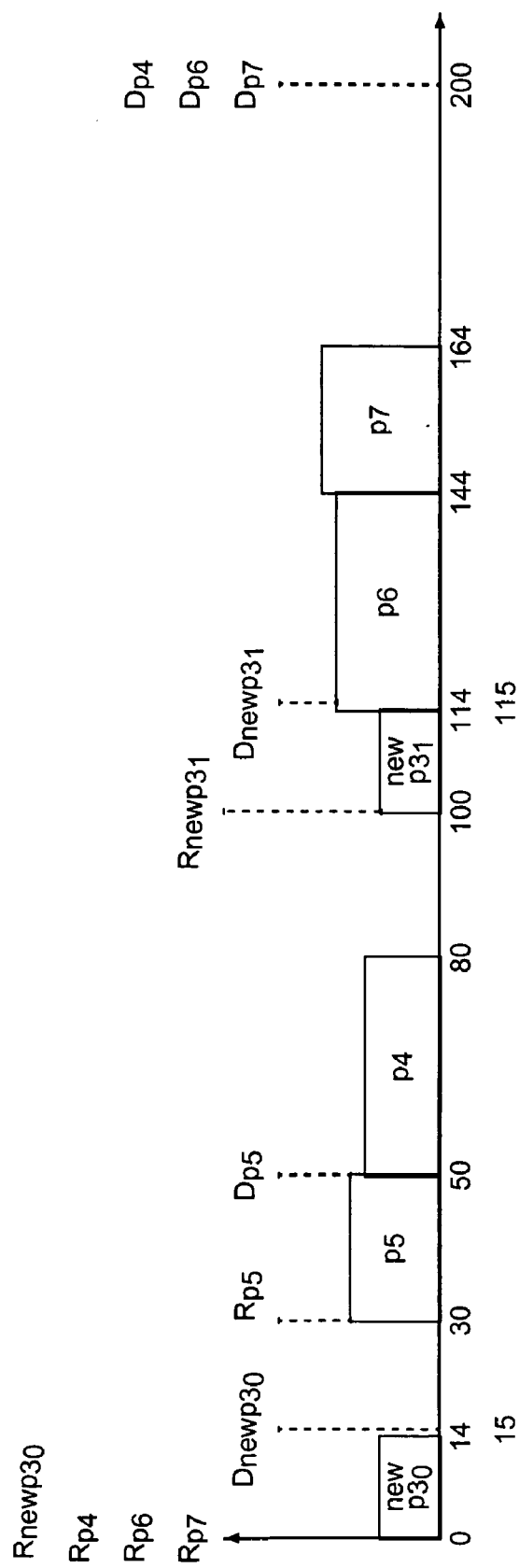

G. Fohler, et al, "Heuristic Scheduling for Distributed Hard Real-Time Systems", Research Report Dec. 1990, Institute fur Technische Informatik, TUW, Austria, 1990, p. 1-19.

G. Fohler, "Joint scheduling of distributed complex periodic and hard aperiodic tasks in statically scheduled systems", 16th IEEE RTSS'95, Dec. 1995, p. 152-161.

R. Gerber, et al, "Guaranteeing real-time requirements with resource-based calibration of periodic processes", IEEE Trans. On Software Eng. 21, 7, Jul. 1995, p. 579-592.

J. Goossens, et al, "The non-optimality of the monotonic priority assignments for hard real-time offset free systems", Real-Time Systems; vol. 13, 1997, p. 107-126.

M. Iwasaki, et al, "Isochronous Scheduling and its Application to Traffic Control", 19th IEEE Real-Time Systems Symposium, Dec. 1998.

K. Jeffay, et al, "On non-preemptive scheduling of periodic and sporadic tasks", Proc. 12th IEEE Real-Time Systems Symposium (RTSS'91), 1991, p. 129-139.

H. Kopetz, et al., "Distributed fault tolerant real-time systems: the MARS approach", IEEE Micro, Feb. 1989, p. 25-40.

E.L. Lawler, et al, "Scheduling periodically occurring tasks on multiple processors", Information Processing Letters, 12, 1, 1981, p. 9-12.

D. W. Leinbaugh, "Guaranteed response time in a hard real-time environment," IEEE Trans. Software Eng., vol. SE-6, Jan. 1980, p. 85-91.

J. Y.-T. Leung, et al, "A note on preemptive scheduling of periodic, real-time tasks," Information Processing Letters, vol. 11, Nov. 1980.

J. Y.-T Leung, et al, "On the complexity of fixed-priority scheduling of periodic, real-time tasks", Performance Evaluation, 2, 1982, p. 115-118.

M. A. Livani, et al, "EDF consensus on CAN bus access for dynamic real-time applications", 19th IEEE RTSS'98, Dec. 1998.

C. D. Locke, "Software architecture for hard real-time applications: cyclic executives vs. fixed priority executives," Real-Time Systems, 4, 37-53, 1992.

G. Manimaran, et al, "A new approach for scheduling of parallelizable tasks in real-time multiprocessor systems", Real-Time Systems, 15, 1998, p. 39-60.

A. K. Mok, "Fundamental Design Problems of Distributed Systems for the Hard-Real-Time Environment", Ph.D Thesis, MIT, Cambridge, Massachusetts, May 1983, p. 1-183.

S. Poledna, et al, "ERCOS: an operating system for automotive applications", SAE International Congress, Detroit, SAE Press, 1996, p. 1-11.

J.A. Stankovic, et al, "Deadline Scheduling For Real-Time Systems: EDF and Related Algorithms", Ch. 5, "Planning-Based Scheduling", Kluwer, 1998, p. 87-120.

A.D. Stoyenko, et al, "Analyzing hard-real-time programs for guaranteed schedulability", IEEE Trans. On Software Eng., 17, 8, Aug. 1991, p. 737-750.

J. K. Strosnider, et al, "The deferrable server algorithm for enhanced aperiodic responsiveness in hard real-time environments," IEEE Trans. Computers, 44, 1995, p. 73-91.

A.J. Wellings, et al, "Real-Time Scheduling in a Generic Fault-Tolerant Architecture", Proc. IEEE Real-Time Systems Symposium (RTSS'98), Dec. 1998.

W. Zhao, et al, "Scheduling tasks with resource requirements in hard real-time systems," IEEE Trans. on Software Engineering, vol. SE-13, May 1987.

* cited by examiner

METHOD OF SCHEDULING EXECUTIONS OF PROCESSES WITH VARIOUS TYPES OF TIMING PROPERTIES AND CONSTRAINTS

FIELD OF THE INVENTION

This invention relates to the field of scheduling methods such as scheduling of processes carried out by computer or other systems, and in particular to improved methods of scheduling execution of various types of processes with various types of timing properties and constraints.

BACKGROUND TO THE INVENTION

In operation of a computer system, executions of certain periodically or asynchronously occurring real-time processes must be guaranteed to be completed before specified deadlines, and in addition satisfying various constraints and dependencies, such as release times, offsets, precedence relations, and exclusion relations.

Embedded, real-time systems with high assurance requirements often must execute many different types of processes with complex timing and other constraints. Some of the processes may be periodic and some of them may be asynchronous. Some of the processes may have hard deadlines and some of them may have soft deadlines. For some of the processes, especially the hard real-time processes, complete knowledge about their characteristics can and must be acquired before run-time. For other processes, a prior knowledge of their worst case computation time and their data requirements may not be known.

Some processes may have complex constraints and dependencies between them. For example, a process may need to input data that are produced by other processes. In this case, a process may not be able to start before those other processes are completed. Such constraints are referred to herein as precedence relations.

Exclusion relations may exist between processes when some processes must prevent simultaneous access to shared resources such as data and I/O devices by other processes. For some periodic processes, they may not be able to start immediately at the beginning of their periods. In this case, those processes have release time constraints. For some periodic processes, the beginning of their first period may not start immediately from time zero, that is, the system start time. In this case, those processes have offset constraints.

Examples of such systems include plant control systems, aviation control systems, air traffic control systems, satellite control systems, communication systems, multimedia systems, on-line financial service systems, various embedded systems such as for automotive applications, etc.

Previous systems and methods related to scheduling executions of real-time processes can be broadly divided into two categories:

(a) systems and methods in which determination of the execution schedule of all the processes is done entirely at run-time (on-line); and (b) systems and methods in which determination of the execution schedule of the majority of the processes is done before run-time (off-line).

The vast majority of systems and methods related to scheduling executions of real-time processes belong to the first category above. The article "Scheduling Algorithms For Multiprogramming in a Hard-Real-Time Environment", by C. L. Liu, and J. W. Layland, J. ACM, 20, 46–61, 1973 is the best known representative of the priority scheduling approach. It assumes that all processes are periodic, and that the major characteristics of the processes are known before run-time, that is, the worst case execution times and period are known in advance. Fixed priorities are assigned to processes according to their periods; the shorter the period, the higher the priority. At any time, the process with the highest priority among all processes ready to run, is assigned the processor.

A schedulability analysis is performed before run-time based on the known process characteristics. If certain equations are satisfied, the actual scheduling is performed during run-time, and it can be assumed that all the deadlines will be met at run-time.

The article "Priority Ceiling Protocols: An Approach to Real-Time Synchronization", by L. Sha, R. Rajkumar, and J. P. Lehoczky "IEEE Trans. On Computers", 39, 1175–1185, 1990, makes the same assumptions as the Liu et al article, except that in addition, processes may have critical sections guarded by semaphores, and a protocol is provided for handling them. Similar to Rate Monotonic Scheduling, a schedulability analysis is performed before run-time based on the known process characteristics; if certain equations are satisfied, the actual scheduling is performed during run-time, and it can be assumed that all the deadlines will be met at run-time.

Variations on the above basic scheme have been proposed, as surveyed by C. J. Fidge in the article "Real-Time Schedulability Tests For Preemptive Multitasking", published in Real-Time Systems, vol 14, pp. 61–93, January 1998.

Commercial real-time operating systems perform all scheduling activities at run-time, during which at each point in time, the process with the highest priority is selected for execution.

Systems and methods that perform all scheduling activities at run-time, have the following disadvantages:

(a) High run-time overhead due to scheduling and context switching;

(b) Difficulty in analyzing and predicting the run-time behavior of the system;

(c) Difficulty in handling various application constraints and process dependencies;

(d) Low processor utilization.

High run-time overhead is partly due to the fact that embedded, real-time applications are becoming more and more complex, with an ever increasing number of processes and additional constraints and dependencies between processes. The amount of run-time resources consumed by the scheduler in order to compute the schedule, grows very rapidly as the number of processes and constraints increase. The scheduler often needs to perform many time consuming process management functions, such as suspending and activating processes, manipulating process queues, etc. In addition, since the priority scheduler does not know the schedule before run-time, it has to assume the worst case and save/restore complete contexts each time a process is preempted by another process.

Performing all the scheduling at run-time requires the use of complex run-time mechanisms in order to achieve process synchronization and prevent simultaneous access to shared resources. The run-time behavior of the scheduler can be very difficult to analyze and predict accurately.

For example, in one published study, fixed priority scheduling was implemented using priority queues, where tasks are moved between queues by a scheduler that was released at regular intervals by a timer interrupt. It was observed that because the clock interrupt handler had a priority greater than any application task, even a high priority task could suffer long delays while lower priority tasks are moved from one queue to another. Accurately predicting the scheduler overhead proved to be a very complicated task, and the estimated scheduler overhead was substantial, even though it was assumed that the system had a total of only 20 tasks, tasks did not have critical sections, and priorities are not to change. Such difficulties would be many times greater if there existed additional complex application constraints that would have to be satisfied by the synchronization mechanism at run-time.

The original schedulability analysis given in the aforenoted paper describing the PCP protocol by Sha et. al. above, assumed that all tasks are independent tasks, that there are no precedence relations, that their release times are equal to the beginning of their periods, and all periods have a common start time. It is difficult to extend the schedulability analysis for priority scheduling to take into account application constraints that frequently exist in real-time applications, such as precedence constraints, release times that are not equal to the beginning of their periods, offsets, low jitter requirements (limits on the variation in time a computed result is output to the external environment from cycle to cycle), etc. Despite considerable effort spanning more than a decade to extend the original PCP protocol to handle additional constraints, not much has been accomplished to this end, as evidenced by the absence of methods that can satisfactorily deal with such constraints in the survey by Fidge mentioned above.

Additional application constraints increase the computational complexity of scheduling problems, which already have high computational complexity whenever processes contain critical sections. When all the scheduling is performed at run-time, the scheduler does not have enough time to find solutions for complex problems. Most systems and methods that perform all scheduling at run-time, schedule processes according to process priorities assigned by the user. However, additional application constraints are most likely to conflict with the user assigned priorities. It is not generally possible to map the many different execution orderings of processes that are required by the different application constraints in a large complex system onto a rigid hierarchy of priorities.

It has been suggested that higher priorities be assigned to processes with: shorter periods, higher criticality, lower jitter requirements, precedence constraints, etc. Consequently, the system designer is faced with the impossible task of trying to simultaneously satisfy many different application constraints with one rigid hierarchy of priorities. Because of the inherent constraints built into the fixed priority scheduling model, (e.g. fixed priorities) and because scheduling is performed at run-time, attempts to take into account additional constraints typically result in suggestions that either are only applicable to a few very special cases, or make drastically simplifying assumptions, which significantly reduce schedulability, or are extremely complicated, making the run-time behavior of the system very difficult to analyze and predict.

In general, systems and methods that perform all scheduling activities at run-time achieve lower processor utilization than systems and methods that schedule processes before run-time. This is largely due to the fact that when all scheduling activities are performed at run-time, the scheduler does not have enough time to find good solutions to complex scheduling problems, and can only afford to use crude, suboptimal methods that do not take into account all the available information.

Systems that use priority scheduling methods have a much smaller chance of satisfying timing constraints, because priority-driven methods are only capable of producing a very limited subset of the possible schedules for a given set of processes. This severely restricts the capability of priority-driven systems and methods to satisfy timing and resource sharing constraints at run-time.

In general, the smaller the set of schedules that can be produced by a scheduling system or method, the smaller the chances are of finding a feasible schedule, and, the lower the level of processor utilization that can be achieved. With systems that use optimal methods that compute the schedule off-line, it is possible to achieve higher levels of resource utilization than those achievable by priority-driven systems. Hence, using priority-driven systems may increase the cost of the system to non-competitive levels.

When processes are scheduled at run-time, the scheduling strategy must avoid deadlocks. In general, deadlock avoidance at run-time requires that the run-time synchronization mechanism be conservative, resulting in situations where a process is blocked by the run-time synchronization mechanism, even though it could have proceeded without causing deadlock. This reduces further the level of processor utilization.

In contrast to conventional approaches where most of the processes are scheduled at run-time, with pre-run-time scheduling the schedule for most of the processes is computed off-line; this approach requires that the major characteristics of the processes in the system be known, or bounded, in advance. It is known that it is possible to use pre-run-time scheduling to schedule periodic processes. One possible technique consists of computing off-line a schedule for the entire set of periodic processes occurring within a time period that is equal to the least common multiple of the periods of the given set of processes, then at run-time executing the periodic processes in accordance with the previously computed schedule.

In pre-run-time scheduling, several alternative schedules may be computed off-line for a given time period, each such schedule corresponding to a different "mode" of operation. A small run-time scheduler can be used to select among the alternative schedules in response to external or internal events. This small run-time scheduler can also be used to allocate resources for asynchronous processes that have not been converted into periodic processes.

It is possible to translate an asynchronous process into an equivalent periodic process, if the minimum time between two consecutive requests is known in advance, and the deadline is not too short. Thus it is also possible to schedule such asynchronous processes using pre-run-time scheduling See "The Design of Real-Time Programming Systems Based On Process Models", Proc. 1984 IEEE Real-time systems Symposium, 5–17, 1984.

Systems and methods that perform scheduling before run-time, have the following advantages:

(a) ability to effectively handle complex constraints and dependencies;

(b) lower run-time overhead;

(c) higher processor utilization; and (d) ease of predicting the system's behaviour.

In the majority of real-time applications, the bulk of the processing is performed by periodic processes for which the major characteristics of the processes, including offsets, release times, worst-case execution times, deadlines, precedence and exclusion relations, and any other constraints, are known before run-time. For asynchronous processes, generally their worst-case computation times, deadlines, and the minimum time between two consecutive requests (interarrival times) are known in advance. Asynchronous processes normally are few in number, and often can be converted into new periodic processes that can be used to service the corresponding asynchronous process requests in a manner similar to polling. Thus it is not only possible, but highly desirable to schedule all the periodic processes, including the new periodic processes that are converted from some of the asynchronous processes, before run-time, rather than scheduling them at run-time.

For the processes whose characteristics are known before run-time, such as periodic processes, one may realize important advantages if the schedule is computed before run-time, instead of waiting until run-time to schedule them. This is because when scheduling is done before run-time, there is almost no limit on the running time of the scheduler, optimal scheduling methods can be used to maximize the possibility of finding a feasible schedule for the set of processes to be scheduled and to handle complex constraints and dependencies. In contrast, when processes are scheduled at run-time, the time available to the scheduler is very limited. This limits the ability of the scheduler to find a feasible schedule and to take into account the different types of constraints and knowledge about the system processes. Once the schedule for the periodic processes has been defined before run-time, the run-time scheduler can also use this information to schedule asynchronous processes more efficiently.

Other reasons for performing scheduling before run-time include: this greatly reduces the run-time resource requirements needed for scheduling and context switching. With pre-run-time scheduling, it is possible to avoid using sophisticated run-time synchronization mechanisms by directly defining precedence relations and exclusion relations on pairs of process segments to achieve process synchronization and prevent simultaneous access to shared resources. Because the schedule is known in advance, automatic code optimization is possible; one can determine in advance the minimum amount of information that needs to be saved and restored, and one can switch processor execution from one process to another process through very simple mechanisms such as procedure calls, or simply by concatenating code when no context needs to be saved or restored, which greatly reduces the amount of run-time overhead.

When the use of sophisticated run-time synchronization mechanisms is avoided, the benefits are multi-fold: not only is the amount of run-time overhead reduced, but it is also much easier to analyze and predict the run-time behavior of the system. Compared with the complex schedulability analysis required when run-time synchronization mechanisms are used, it is much more straightforward to verify that all processes will meet their deadlines and that all the additional application constraints will be satisfied in an off-line computed schedule.

In recent years, there has been an increased interest in systems and methods for the purpose of automating the process of pre-run-time scheduling, as described in the article by S. R. Faulk and D. L. Parnas "On Synchronization in Hard-Real-time Systems", Commun. ACM vol 31, pp. 274–287, March, 1988. Cyclic executives, a form of pre-run-time scheduling, have been used in safety critical systems, e.g. as described by G. D. Carlow in the article "Architecture of the Space Shuttle Primary Avionics Software System", Commun. ACM, September 1984. However, in the past, cyclic executives have mainly been constructed by hand, and are difficult to construct and maintain. In the aforenoted article by A. K. Mok, a technique for transforming an asynchronous process into an equivalent periodic process was introduced. Methods for solving the problem of scheduling processes with release times, deadlines, exclusion and precedence relations are given in the article by J. Xu and D. Parnas in the articles "Scheduling Processes with Relase Times, Deadlines, Precedence and Exclusiion Relations", IEEE Trans. on Software Engineering, vol 16, pp 360–369, March 1990, by J. Xu and D. L. Parnas in "Pre-run-time Scheduling of Processes with Exclusion Relations on Nested or Overlapping Critical Sections", Proc. Eleventh Annual IEEE International Phoenix Conference on Computers and Communications, IPCCC-92, Scottsdale, Ariz., Apr. 1—3, 1992, by J. Xu in "*Multiprocessor Scheduling of Processes with Release Times, Deadlines, Precedence and Exclusion Relations*", IEEE Trans. on Software Engineering, vol 19, pp 139–154, February 1993, and by J. Xu and D. L. Parnas in "On Satisfying Timing Constraints in Hard-Real-Time Systems", IEEE Trans. on Software Engineering, vol 19, pp 1–17, January 1993, which are incorporated herein by reference.

However, until now, unsolved problems have been main obstacles to fully automating the process of constructing scheduling systems that combine the pre-run-time scheduling of periodic processes with the run-time scheduling of asynchronous processes, as follows:

(1) Previously there did not exist any system or method that integrates the run-time scheduling of asynchronous processes with the pre-run-time scheduling of periodic processes, that could effectively satisfy exclusion relations, precedence relations, offsets and release times constraints between the periodic processes, as well as any exclusion relation between a periodic process and an asynchronous process, and any exclusion relation between two asynchronous processes, while making efficient use of available processor capacity, and maximizing the chances of satisfying all the timing constraints.

Previous systems and methods for scheduling periodic processes and asynchronous processes, either perform all the scheduling activities at run-time, or assume that any process can be preempted by any other process at any time (no exclusion relations can be enforced, so one cannot prevent certain data inconsistencies that are caused by more than one process simultaneously accessing shared data), or assume that all aperiodic processes have soft deadlines, or assume that all processes are non-preemptable, which reduces the system's flexibility in meeting deadlines, or use ad hoc schemes that do not make efficient use of available processor capacity, and reduce the chances of satisfying all the timing constraints. Examples of such systems and methods are described in the articles "A Reservation-based Algorithm for Scheduling Both Periodic and Aperiodic Real-time Tasks", by K. G. Shin and Y. C. Chang, IEEE Trans. on Computers, vol 44, pp. 1405–1419, December 1995, "An Optimal Algorithm For Scheduling Soft Aperiodic Tasks in Dynamic-Priority Preemptive Systems", by I. Ripoli, A. Crespo and A. Garcia-Fornes, IEEE Trans. on Software Eng., vol 23, pp. 388–400, June 1997, and "The Deferrable Server Algorithm For Enhanced Apriodic Responsiveness in Hard Real-Time Environments", IEEE Trans. on Computers, vol 44, pp. 73–91, January 1995.

(2) Previously there did not exist any system or method for systematically adjusting the period lengths of periodic processes, such that the adjusted period lengths are sufficiently close to the original period lengths, to satisfy the processor utilization level required by the application, and maximize the chances of finding a feasible schedule, while at the same time ensuring that the adjusted period lengths are as closely harmonically related to each other (having a smaller LCM value) as possible, in order to reduce the schedule length and the number of instances of new processes, and reduce storage requirements and system overhead.

Previous systems and methods use ad hoc methods that do not make the most efficient use of available processor capacity. For example, in cyclic executives, each periodic application task is required to complete within a fixed size frame, which is of the same size for all periodic application tasks. Such arbitrary constraints seriously restrict the system's ability to meet complex timing constraints.

(3) Previously there did not exist any system or method for systematically determining which asynchronous processes should be converted into new periodic processes, and which asynchronous processes should remain asynchronous, based on whether the ratio of the processor capacity that needs to be reserved for the new periodic process, to the processor capacity that needs to be reserved for the asynchronous process if unconverted, exceeds a specified threshold.

Another embodiment of the present invention provides a system and methods for systematically adjusting the period lengths of periodic processes, such that the adjusted period lengths are sufficiently close to the original period lengths, to satisfy the processor utilization level required by the application, and maximize the chances of finding a feasible schedule, while at the same time ensuring that the adjusted period lengths are as closely harmonically related to each other (having a smaller LCM value) as possible, in order to reduce the schedule length and the number of instances of new processes, and reduce storage requirements and system overhead.

There are certain asynchronous processes that cannot be converted into periodic processes at all, or if converted, may take up far too much processor capacity compared with allowing them to remain asynchronous. For example, an asynchronous process with a very short deadline, a short worst-case execution time, and with long interarrival times, could require that a overly high proportion, sometimes even exceeding one hundred percent, of the processor's capacity be reserved for that one single process if that process is converted into a periodic process for which it is guaranteed to meet it's deadline. But that same process, may require far less processor capacity be reserved for it, if it was not converted into a periodic process, and scheduled for execution at run-time as soon as it arrives in the system.

Previous systems and methods either indiscriminately schedule every asynchronous process at run-time as soon as it arrives in the system, or indiscriminately try to convert every asynchronous process into a periodic process; or rely on ad hoc rules of thumb.

(4) Previously there did not exist any system or method for systematically converting a given set of asynchronous processes into a set of new periodic processes that could make the most efficient use of available processor capacity, and maximize the chances of satisfying all the timing constraints.

In the aforenoted article by A. K. Mok, a technique for converting one single asynchronous process into a periodic process was described. However, the technique described in the Mok article did not consider the case of non-zero offsets, that is, non-zero intervals between time 0, that is, the system start time, and the beginning of their first periods. If only zero offsets are allowed, the chances of satisfying all the given timing constraints is decreased considerably. Furthermore, the described technique only deals with one process. When more than one process must be converted into periodic processes, the new periodic processes may have timing conflicts with each other and with the original set of asynchronous and periodic processes. For example, a direct application of the above technique might result in more than one periodic process each having a release time of zero and a deadline equal to the computation time.

Previous systems and methods use ad hoc methods that do not make the most efficient use of available processor capacity. For example, in cyclic executives, each periodic application task is required to complete within a fixed size frame, which is of the same size for all periodic application tasks. Such arbitrary constraints seriously restrict the system's ability to meet complex timing constraints.

SUMMARY OF THE INVENTION

An embodiment of the present invention provides a system and method in which pre-run-time scheduling techniques are combined with run-time scheduling techniques, where pre-run-time scheduling is used for scheduling the executions of periodic processes, including new periodic processes converted from a subset of the asynchronous processes, in order to satisfy complex relations and constraints such as exclusion relations, precedence relations, and offset constraints, release time constraints defined on the periodic processes, and any exclusion relation between a periodic process and an asynchronous process, and any exclusion relation between two asynchronous processes, and deadline constraints of all periodic processes, while run-time scheduling is used to schedule a subset of the asynchronous processes that would have consumed too much processor capacity if converted into periodic processes, so that efficient use is made of available processor capacity, and the chances of satisfying all the timing constraints of all processes is increased as much as possible.

In accordance with another embodiment, a pre-run-time scheduler may use existing methods that statically schedules a set of processes (including manual methods to satisfy any special requirements if necessary), to construct a feasible pre-run-time schedule in which processor capacity is reserved in the form of time slots in the pre-run-time schedule for each periodic process. The time slot for each periodic process also includes "room" for the execution of asynchronous processes that have less latitude than that periodic process in meeting their respective deadlines, to allow such asynchronous processes to preempt the execution of that periodic process at run-time. The pre-run-time scheduler adjusts the lengths of the periods using specified parameters which control the balance between the utilization level and the length of the pre-run-time schedule. The pre-run-time scheduler is able to schedule periodic processes that have offsets, i.e., intervals between the start of a periodic process' first period and time zero, that is, the system's start time, and is able to take advantage of any flexibility in periodic process offsets to increase schedulability. The pre-run-time scheduler thereby is able to guarantee that every periodic process will always be able to meet its deadline, while providing good response times for asynchronous processes, without requiring any change in the methods used in any of the other parts, steps or embodiments of the present invention. The system and methods have the flexibility to employ sophisticated static scheduling methods to satisfy complex relations and constraints, such as exclusion relations, precedence relations, offsets and release times defined on the periodic processes, and also have the flexibility to incorporate and take advantage of any future new static scheduling method for satisfying any additional desired constraints among the most important and numerous type of processes in real-time applications, the periodic processes, while making efficient use of available processor capacity, and increasing as much as possible the chances of satisfying the timing constraints all the processes. Thus the present invention is able to satisfy more complex application constraints and achieve higher chances of satisfying complex application constraints on periodic processes than previous systems and methods.

In accordance with an embodiment of the invention, a run-time scheduler uses the information about the beginning times and end times of the time slots reserved for the execution of periodic processes (including those new periodic processes that were converted from asynchronous processes) in the pre-run-time schedule, as well as the a priori knowledge of the processes characteristics, to make more informed decisions and satisfy any exclusion relation between a periodic process and an asynchronous process, and any exclusion relation between two asynchronous processes, while making efficient use of available processor capacity, and achieving higher chances of satisfying all the timing constraints of the periodic processes, when scheduling the execution of asynchronous processes. For example, an embodiment of the present invention makes it possible to completely avoid blocking of a periodic process with a shorter deadline by an asynchronous process with a longer deadline, thus achieving higher schedulability of periodic processes than previous systems and methods that schedule all processes at run-time.

In accordance with another embodiment, a run-time scheduler can use the information about the beginning times and end times of the time slots reserved for the execution of periodic processes (including those new periodic processes that were converted from asynchronous processes) in the pre-run-time schedule, as well as the a priori knowledge of the processes characteristics. A significant portion of the parameters used by the asynchronous process scheduler to make scheduling decisions are known before run-time so it is possible to pre-compute major portions of the conditions that are used for decision making. Hence the amount of computation that needs to be performed for scheduling purposes at run-time can be minimized, while making efficient use of available processor capacity, and increasing as much as possible the chances of satisfying all the timing constraints of the asynchronous processes. For example, an embodiment of the present invention makes it possible to create before run-time, a table of "safe starting time intervals" for each asynchronous process, and achieve lower run-time overhead than previous systems and methods by allowing the asynchronous processes to be scheduled by simple table lookup.

In accordance with another embodiment of the invention, bounds on the worst-case response times of asynchronous processes are computed, that are more accurate (tighter) than that achievable with previous systems and methods, by using a simulation procedure that takes into account the beginning times and end times of the time slots reserved for the execution of periodic processes including those new periodic processes that were converted from asynchronous processes) in the pre-run-time schedule, as well as the a priori knowledge of the processes characteristics, when simulating all possible worst-case scenarios of the executions of each asynchronous process.

In accordance with another embodiment, a system and methods can schedule the executions of both periodic and asynchronous real-time processes with hard or soft deadlines, with different a priori knowledge of the process characteristics, and with constraints and dependencies, such as offsets, release times, precedence relations, and exclusion relations. This exploits to a maximum extent any knowledge about processes' characteristics that are available to the scheduler both before run-time and during run-time, so that processor capacity is used to satisfy the constraints and dependencies of periodic and asynchronous processes with hard deadline process as a first priority. Then any remaining processor capacity is used to guarantee that processes with soft deadlines and known characteristics will also be completed before pre-determined time limits as a second priority. Then any remaining processor capacity is used to execute any asynchronous process with unknown characteristics on a "best-effort" basis.

In accordance with another embodiment, a system and methods schedule the executions of both periodic and asynchronous real-time processes with hard or soft deadlines, with different a priori knowledge of the process characteristics, and with constraints and dependencies, such as offsets, release times, precedence relations, and exclusion relations. This exploits to a maximum extent any knowledge about processes' characteristics that are available to the scheduler both before run-time and during run-time, in order to:

(a) effectively handle complex application constraints and dependencies between the real-time processes;

(b) minimize run-time overhead;

(c) make the most efficient use of available processor capacity;

(d) maximize the chances of satisfying all the timing constraints;

(e) provide firm and tight response time guarantees for all the processes whose characteristics are known before run-time; and (f) make it easier to verify that all timing constraints and dependencies will always be satisfied.

Thus the present invention is able to schedule a wider variety of processes with a wider variety of constraints compared with previous systems and methods.

In accordance with another embodiment, which asynchronous processes should be converted into new periodic processes, and which asynchronous processes should remain asynchronous, is automatically determined. This is based on whether the ratio of the processor capacity that needs to be reserved for the new periodic process, to the processor capacity that needs to be reserved for the asynchronous process if unconverted, exceeds a specified threshold.

An embodiment of the invention systematically converts a given set of asynchronous processes into a set of new periodic processes that could make the most efficient use of available processor capacity, and increase as much as possible the chances of satisfying all the timing constraints.

All of the above can be achieved while the process of constructing scheduling systems that combine pre-run-time scheduling with run-time scheduling of periodic and asynchronous processes is fully automated, while the most efficient use of available processor capacity is achieved, the chances of satisfying all the timing constraints is increased as much as possible. Thus the present invention can achieve a much higher degree of automation, and substantially reduce the cost of designing the system and of making changes to the systems to meet new requirements, reduce the chances of errors, as compared with previous systems and methods that schedule processes before run-time.

An embodiment of the present invention provides a system and methods for scheduling execution of both periodic and asynchronous real-time processes with hard or soft deadlines, with different a priori knowledge of the process characteristics, such that complex relations and constraints, such as exclusion relations, precedence relations, offset constraints and release time constraints defined on the hard deadline periodic processes, and any exclusion relation between a hard deadline periodic process and a hard deadline asynchronous process, and any exclusion relation between two hard deadline asynchronous processes, and deadline constraints of all hard deadline processes, will be satisfied.

An embodiment of the present invention integrates pre-run-time scheduling with run-time scheduling to guarantee that the executions of the processes will satisfy all the specified relations and constraints. Whenever a new set of processes arrives in the system, the system schedules their executions in two phases: a pre-run-time (off-line) phase performed by a pre-run-time scheduler, and a run-time (on-line) phase performed by a run-time scheduler.

In accordance with an embodiment of the invention, in each pre-run-time phase, the pre-run-time scheduler executes five steps, as follows:

In Step 1, the pre-run-time scheduler divides asynchronous processes with hard deadlines and known characteristics, referred to herein as A-h-k processes, into two subsets. One subset of asynchronous processes, referred to herein as A-h-k-p processes, are converted into new periodic processes by the pre-run-time scheduler before run-time. When the pre-run-time scheduler converts an asynchronous process into a new periodic process, it prevents possible timing conflicts with other periodic and asynchronous processes, by reserving enough "room" (time) prior to each new periodic process's deadline, to accommodate the computation times of all the periodic and asynchronous processes that have less latitude in meeting their deadlines, to allow such processes to preempt that new periodic process if possible at run-time. The processes in the other subset of asynchronous processes, referred to herein as A-h-k-a, remain asynchronous and are scheduled by the run-time scheduler at run-time. The pre-run-time scheduler reserves processor capacity for A-h-k-a processes by adding the computation time of each A-h-k-a process to the computation time of every periodic process that has a greater latitude in meeting its deadline than that A-h-k-a process, to allow each A-h-k-a process to preempt the execution of any such periodic process if possible at run-time.

Whether each asynchronous process is converted into a new periodic process or not, is determined based on whether the ratio of the processor capacity that needs to be reserved for the new periodic process, to the processor capacity that needs to be reserved for the asynchronous process if unconverted, exceeds a specified threshold.

In Step 2, the pre-run-time scheduler determines the schedulability of the set of all periodic processes with hard deadlines and known characteristics, referred to herein as P-h-k processes, which also include the new periodic processes converted from A-h-k-p processes. The pre-run-time scheduler constructs a pre-run-time schedule in which one or more time slots are reserved for the execution of every P-h-k process, including every new P-h-k process converted from an A-h-k-p process. The time slots reserved for each P-h-k process also include time reserved for the executions of all A-h-k-a processes that have less latitude in meeting their deadlines than that P-h-k process, and which may preempt the execution of that P-h-k process. The pre-run-time scheduler adjusts the lengths of the periods using for example user or otherwise specified parameters which control the balance between the utilization level and the length of the pre-run-time schedule.

The pre-run-time scheduler is able to schedule periodic processes that have offsets, i.e., intervals between the start of a periodic process' first period and time zero. The pre-run-time scheduler takes advantage of any flexibility in periodic process offsets to increase schedulability. An embodiment of the present invention preferably allows the pre-run-time scheduler to use existing methods (including manual methods) which statically schedule set of processes, to construct the pre-run-time schedule of periodic processes in Step 2 and in Step 4 (to be described below), without requiring any change in the methods used in any of the other steps of the present invention. This allows the system and methods to have the flexibility to incorporate and take advantage of any future new static scheduling method for satisfying any additionally desired constraints among the most important and numerous type of processes in real-time applications, the periodic processes.

The pre-run-time scheduler includes a function "adjust-period" which uses a sorted list of reference periods to adjust the length of the period of each periodic process. Each reference period is equal to $2^{i}*3^{j}*5^{k}*7^{l}*11^{f}, \ldots$, for some integers i, j, k, l, f, ... where $0 \leq i \leq exp2$, $0 \leq j \leq exp3$, $0 \leq k \leq exp5$, $0 \leq l \leq exp7$, $0 \leq f \leq exp11$, .... exp2, exp3, exp5, exp7, exp11, ..., are the upperbounds on the exponents i, j, k, l, f, ..., that are applied to the prime numbers 2, 3, 5, 7, 11, .... Application dependent parameters are used to fine tune the exponent upperbounds which control the balance between the utilization level and the length of the pre-run-time schedule.

In Step 3, the pre-run-time scheduler uses knowledge about the time slots reserved for the P-h-k processes in the pre-run-time schedule, to determine, before run-time, the worst-case response times of all A-h-k-a processes. The pre-run-time scheduler preferably uses one of two methods, one a formula, the other a simulation procedure, for determining the worst-case response time of each A-h-k-a process. The pre-run-time scheduler verifies the schedulability of each A-h-k-a asynchronous process by checking whether its deadline is greater than or equal to its worst-case response time. Thus, the pre-run-time scheduler provides an a priori guarantee that all periodic and asynchronous processes with hard deadlines and known characteristics will always meet their deadlines.

In Step 4, the pre-run-time scheduler determines the schedulability of all the periodic processes with soft deadlines and known characteristics, called P-s-k processes, under the condition that all the P-h-k processes and A-h-k-a processes that are guaranteed to be schedulable in the previous steps are still schedulable. The pre-run-time scheduler reconstructs the pre-run-time schedule in which one or more time slots are reserved for the execution of every P-h-k process (including every new P-h-k process converted from an A-h-k-p process), and for every P-s-k process. The time slots reserved for each P-h-k or P-s-k process also include time reserved for the executions of all A-h-k-a processes that have deadlines that are shorter than that P-h-k or P-s-k process' deadline, and which may preempt the execution of that P-h-k or P-s-k process. The pre-run-time scheduler uses the methods in the previous step that take into account knowledge about the time slots reserved for the P-h-k and P-s-k processes in the pre-run-time schedule to determine again, before run-time, the worst-case response times of every A-h-k-a process.

In Step 5, the pre-run-time scheduler preferably uses knowledge about the time slots reserved for the P-h-k and P-s-k processes in the pre-run-time schedule to determine, before run-time, the worst-case response times of asynchronous processes with soft deadlines and known characteristics, i.e., A-s-k processes.

At the end of the pre-run-time phase, a feasible pre-run-time schedule for all the periodic processes with known characteristics will have been constructed, while the worst-case response times of all the asynchronous processes with known characteristics will have been determined.

During the run-time phase, a run-time scheduler uses knowledge about the time slots reserved for the periodic processes in the pre-run-time schedule to schedule the executions of all the periodic and asynchronous processes, that is, the P-h-k processes (including every new P-h-k process converted from an A-h-k-p process), P-s-k processes, A-h-k-a processes, A-s-k processes, as well as asynchronous processes with soft deadlines and unknown characteristics (referred to herein as A-s-u processes), in a way that guarantees that every periodic process's execution will complete before the end of that periodic process's time slot in the pre-run-time schedule, and all the asynchronous processes with soft deadlines and known characteristics, are guaranteed to be completed within the worst-case response time pre-determined in Step 4 and Step 5 after their arrival, so that all the constraints and dependencies of all processes with known characteristics will always be satisfied. The run-time scheduler, can use the information about the beginning times and end times of the time slots reserved for the execution of periodic processes (including those new periodic processes that were converted from asynchronous processes) in the pre-run-time schedule, as well as the a priori knowledge of the processes characteristics, to pre-compute major portions of the conditions that are used for decision making, hence the amount of computation that needs to be performed for scheduling purposes at run-time can be minimized.

For example, the present invention makes it possible to create before run-time, a table of "safe starting time intervals" for each asynchronous process, and achieve lower run-time overhead than previous systems and methods by allowing the asynchronous processes to be scheduled by simple table lookup.

A-s-u processes are scheduled at run-time on a "best-effort" basis using the remaining processor capacity.

The present invention exploits to a maximum extent any knowledge about the characteristics that are available to the system both before run-time and during run-time, in order to:

(a) effectively handle complex application constraints and dependencies between the real-time processes;

(b) minimize run-time overhead;

(c) maximize the chances of being able to guarantee that all the processes with hard deadlines will always meet their deadlines;

(d) provide firm and tight response time guarantees for all the processes whose characteristics are known before run-time; and (e) make it easier to verify that all timing constraints and dependencies will always be satisfied.

It is believed that as compared with previous systems and methods that perform all scheduling activities at run-time, for most real-time applications, the present invention is better suited to meeting the above for the following reasons:

(1) In most real-time applications the bulk of the computation is usually performed by periodic processes for which the characteristics are known a priori. Complex constraints and dependencies are normally defined on the periodic processes. In the present invention, all the periodic processes are scheduled before run-time, there is practically no limit on the time that can be used for scheduling the periodic processes. This allows the use of better methods to handle a great variety of application constraints and dependencies, and thus can achieve higher schedulability for the most important and most numerous type of processes in real-time applications.

(2) The run-time overhead required for scheduling and context switching is much smaller than that of the prior art.

(3) The number of asynchronous processes that the run-time scheduler needs to schedule should be small, as in most real-time applications. In most real-time applications the number of asynchronous processes with hard deadlines is usually small.

(4) A significant portion of asynchronous processes can be transformed into periodic processes, if desired by the user, when using the present invention. For those asynchronous processes that are not transformed into periodic processes, their interarrival times are likely to be long.

(5) Most of the important scheduling decisions have already been determined before run-time. In particular, the relative ordering of all the periodic processes was determined before run-time when the pre-run-time schedule was computed.

(6) A significant portion of the parameters used by the run-time scheduler to make scheduling decisions for asynchronous processes, are known before run-time, so that major portions of the conditions that are used for decision making can be pre-computed, and the amount of computation that needs to be performed for scheduling asynchronous processes at run-time can be minimized.

(7) From the pre-run-time schedule, it becomes known in advance exactly which periodic process may preempt which other periodic process at run-time. Thus one can use this information to minimize the amount of context switching.

(8) Once the pre-run-time schedule has been determined for all the periodic processes, the run-time scheduler can use this knowledge to achieve higher schedulability for the small number of asynchronous processes that needs to be scheduled at run-time.

(9) The run-time scheduler can use knowledge about the pre-run-time schedule to schedule asynchronous processes more efficiently, e.g., it would be possible to completely avoid blocking of a periodic process with less latitude in meeting its deadline by an asynchronous process with greater latitude.

(10) When determining the worst-case response times of asynchronous processes, overly pessimistic assumptions need not be made, e.g., it need not be assumed that for each process, all the periodic processes with less latitude in meeting their deadlines can arrive at the same time to delay that process. Thus tighter worst-case response times for asynchronous processes can be achieved.

(11) Using the present invention, verifying that all timing constraints will always be satisfied is much easier.

(12) Using the present invention, it becomes straightforward to verify that all the timing constraints and dependencies between the periodic processes are satisfied in a pre-run-time schedule.

(13) When using the technique of pre-run-time scheduling, timing constraints and dependencies are directly "embedded" in the pre-run-time schedule, thus for the majority of the processes, the use of complicated run-time synchronization mechanisms for which it is often extremely difficult to obtain reasonable and accurate execution time bounds, can be avoided.

(14) The number of asynchronous processes is reduced, and the ordering of the periodic processes is fixed in the pre-run-time schedule. This significantly reduces the complexity of verifying that the asynchronous processes will meet timing constraints.

In accordance with another embodiment of the invention, a method of scheduling executions of both periodic and asynchronous real-time processes having hard or soft deadlines, comprises automatically generating a pre-run-time schedule comprising mapping from a specified set of periodic process executions to a sequence of time slots on a time axis, each of the time slots having a beginning time and an end time, reserving each one of the time slots for execution of one of the periodic processes, a difference between the end time and the beginning time of each of the time slots being sufficiently long that execution of all of the periodic processes, including satisfaction of predetermined constraints and relations comprising at least one of release time, worst-case computation time, period, deadline, deadline nature, offset and permitted range of offset constraints, and precedence and exclusion relations and criticality levels can be completed between the beginning time and end time of respective time slots, and executing the processes in accordance with the schedule during run-time of the processor.

In accordance with another embodiment, a method for automatically adjusting lengths of periods of a predetermined set of periodic processes, comprises storing and sorting a list of reference periods, setting the length of the period of each periodic process to the length of the largest reference period that is no larger than an original period of the periodic process to form adjusted periods, and storing the adjusted periods for subsequent use in scheduling executions of the periodic processes.

In accordance with another embodiment, a method of processing a plurality of processes, some of which are periodic and some of which are asynchronous, comprises:

(i) prior to executing the processes on a processor:
  (a) determining which asynchronous processes have less flexibility in meeting their deadlines than which of the periodic processes,
  (b) adding the execution time of each of the less flexible asynchronous processes to the execution time of each of the more flexible periodic processes,
  (c) scheduling each of the periodic processes into time slots, (ii) and during run-time of the processor:
  (d) executing the periodic processes according to the schedule, interrupting when possible any of the more flexible periodic processes to execute any of the less flexible asynchronous processes for which a request to execute has been received by the processor,
  (e) on receiving a request to execute an asynchronous process which has greater or equal flexibility in meeting their deadlines than any of the periodic processes, scheduling the requesting asynchronous process at a time which will not conflict with execution and completion of any of the less flexible periodic processes.

In accordance with another embodiment, a method of processing a plurality of processes, some of which are periodic and some of which are asynchronous, comprises:

(i) prior to executing the processes:
  (a) determining which asynchronous processes should be converted into new periodic processes, converting each asynchronous process that should be converted into a new periodic process,
  (b) determining which of the remaining asynchronous processes have less flexibility in meeting their deadlines than which of the periodic processes, including new periodic processes converted from asynchronous processes, adding the execution time of each of the less flexible asynchronous processes to the execution time of each of the more flexible periodic processes,
  (c) scheduling each of the periodic processes into time slots, (ii) and during run-time,
  (d) executing the periodic and new periodic processes, interrupting any of the more flexible periodic and new periodic processes whenever possible to process any of the less flexible asynchronous processes for which a request to execute may be received at any time.

In accordance with another embodiment, a method of scheduling execution of processes by a processor comprises:
  (a) scheduling periodic time slots for all periodic processes which time slots each include time for each of the periodic processes and time for all asynchronous processes which have less flexibility in meeting their deadlines than do the periodic processes,
  (b) construct a schedule which includes the periodic time slots and sufficient intervening time to process said all other processes,
  (c) determining worst case response times of all asynchronous processes, and
  (d) executing the processes in accordance with the schedule and as said all other processes are required to be processed from time to time.

BRIEF INTRODUCTION TO THE DRAWINGS

Figure 2:
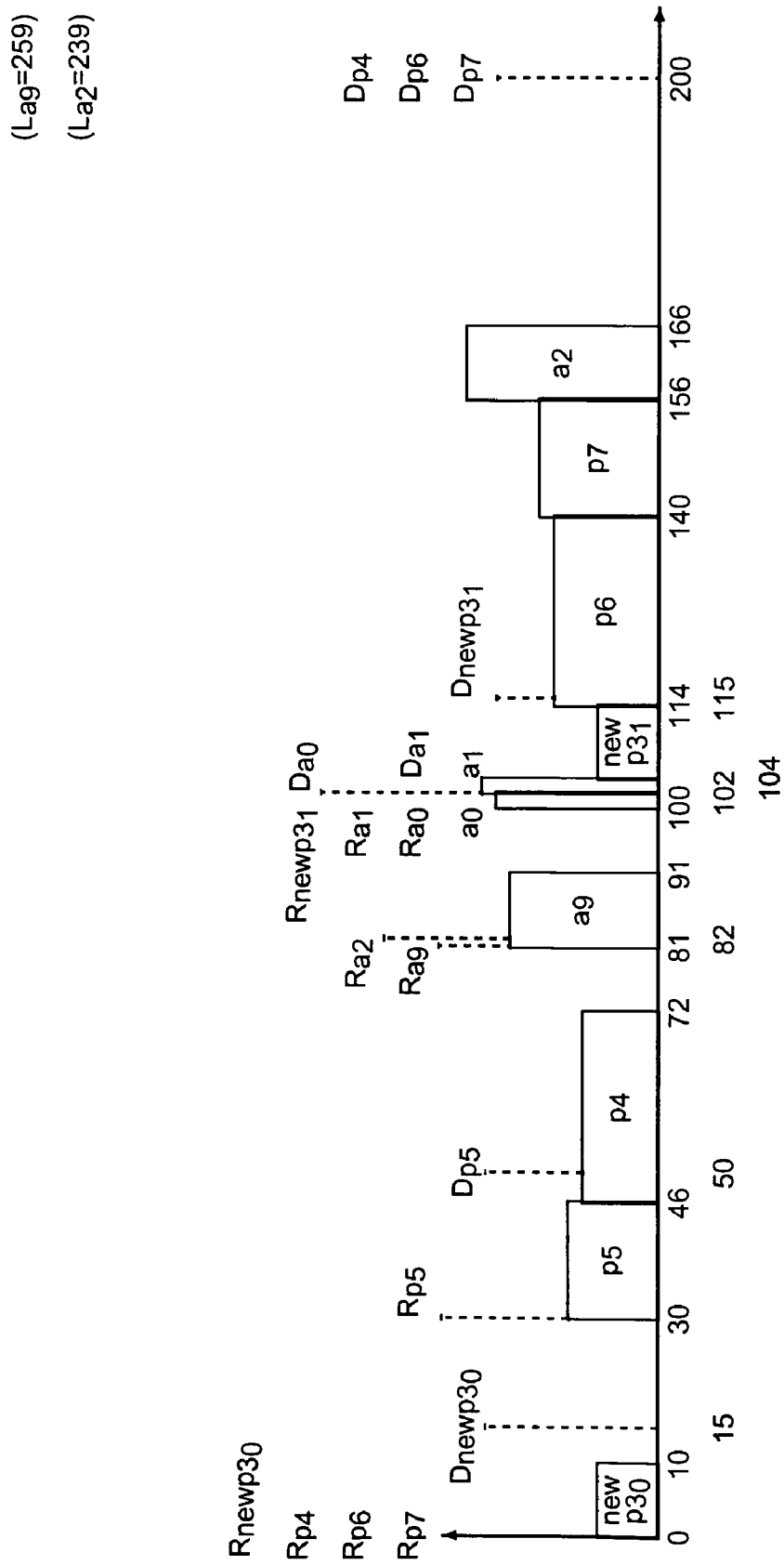
Figure 3:
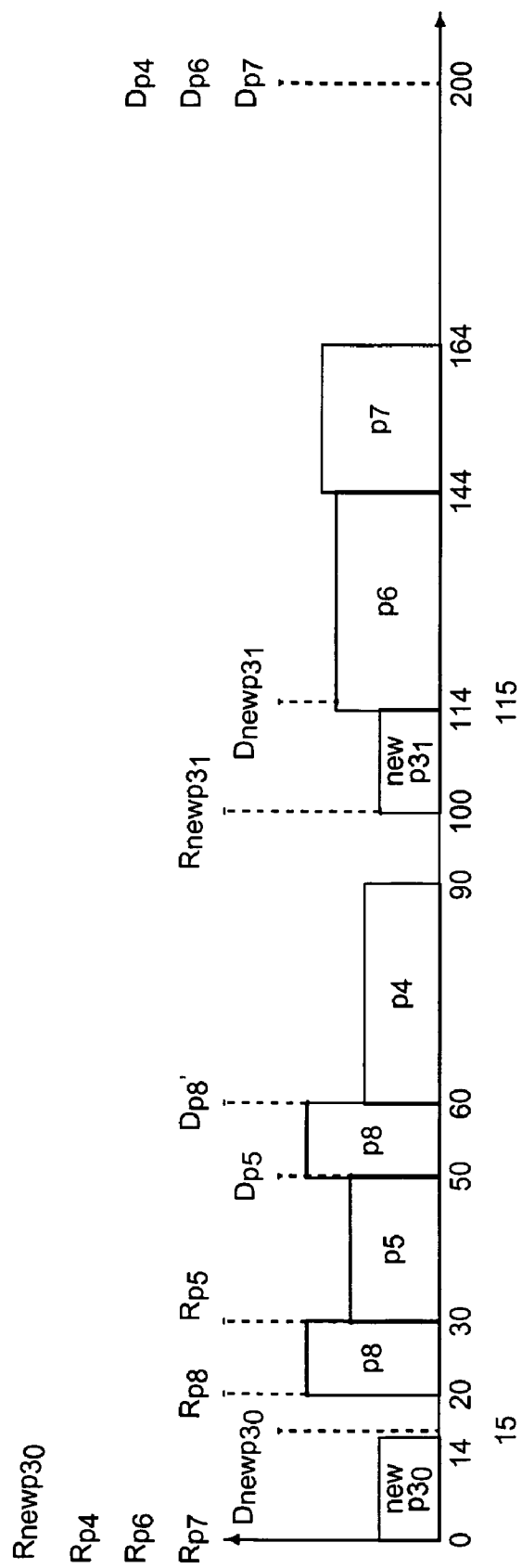
Figure 6:
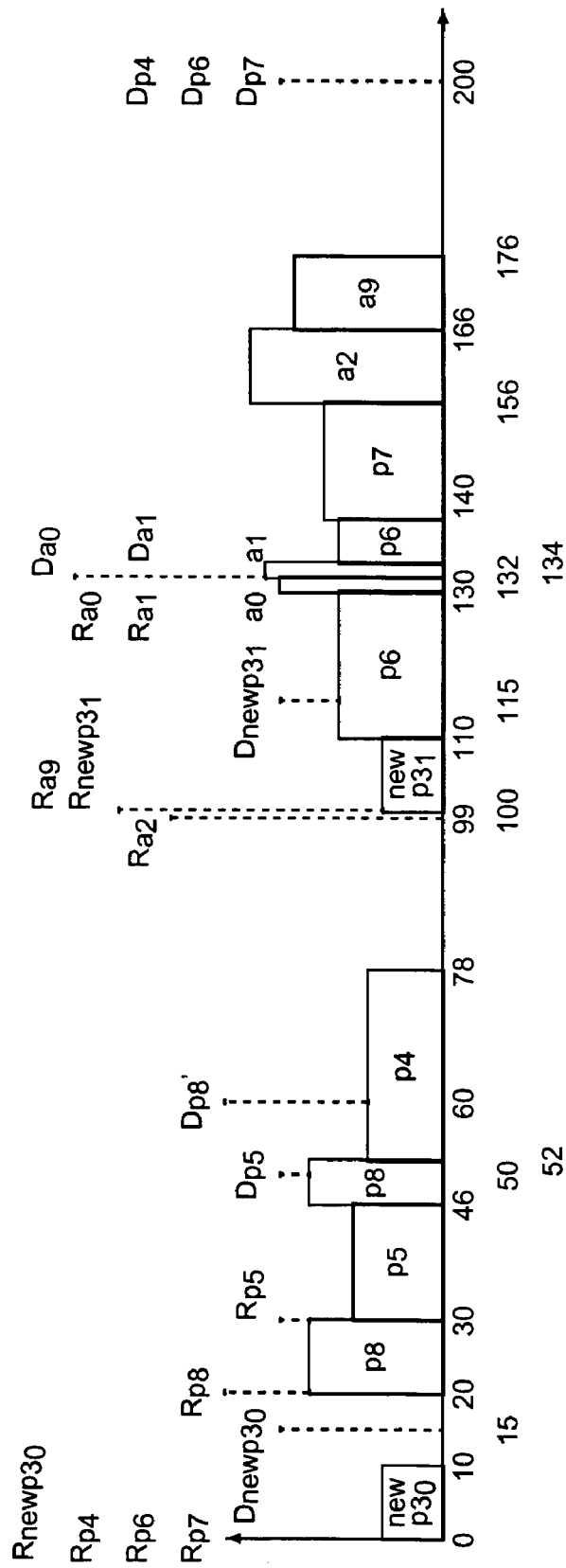
Figure 7:
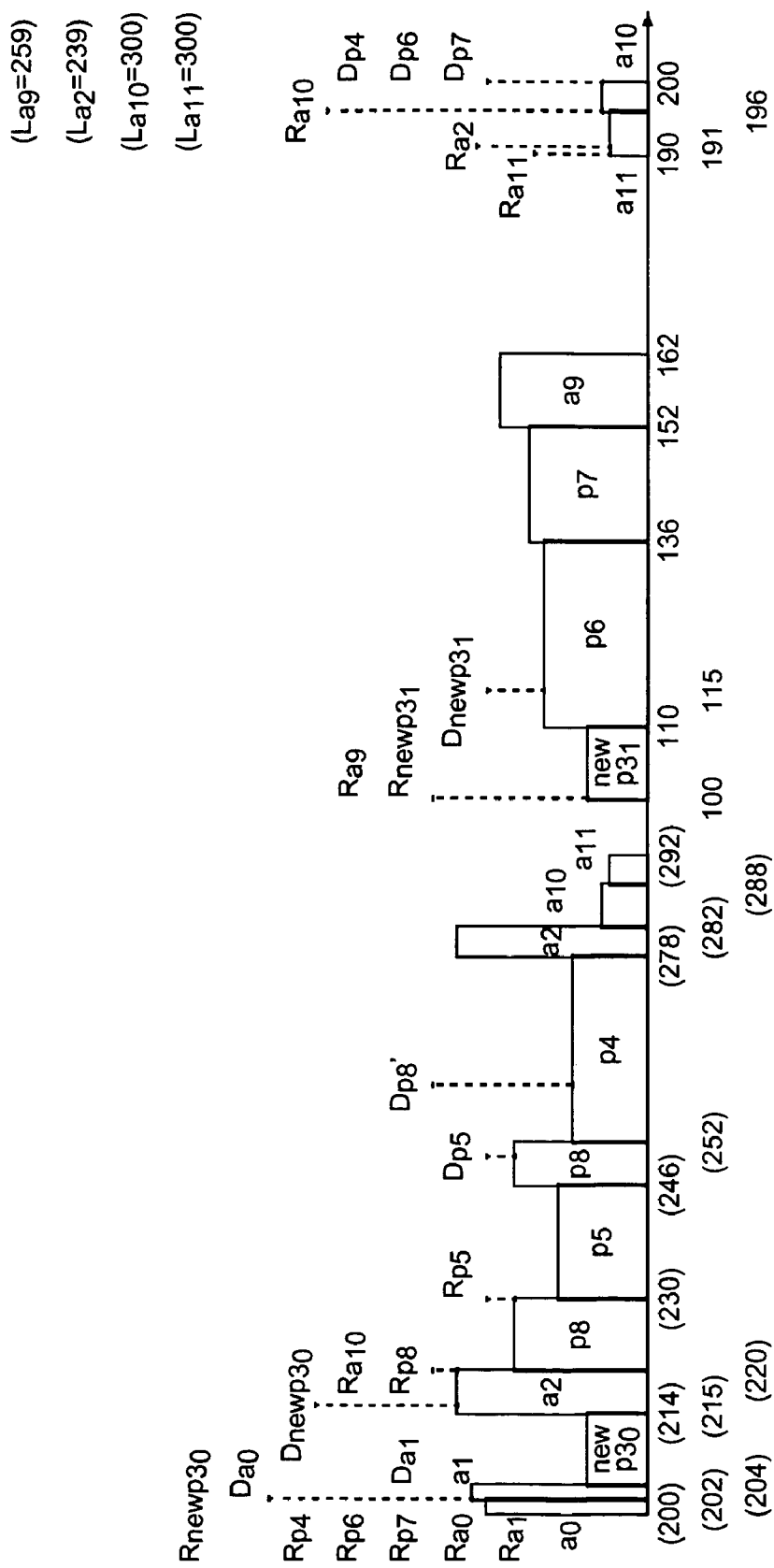
Figure 8:
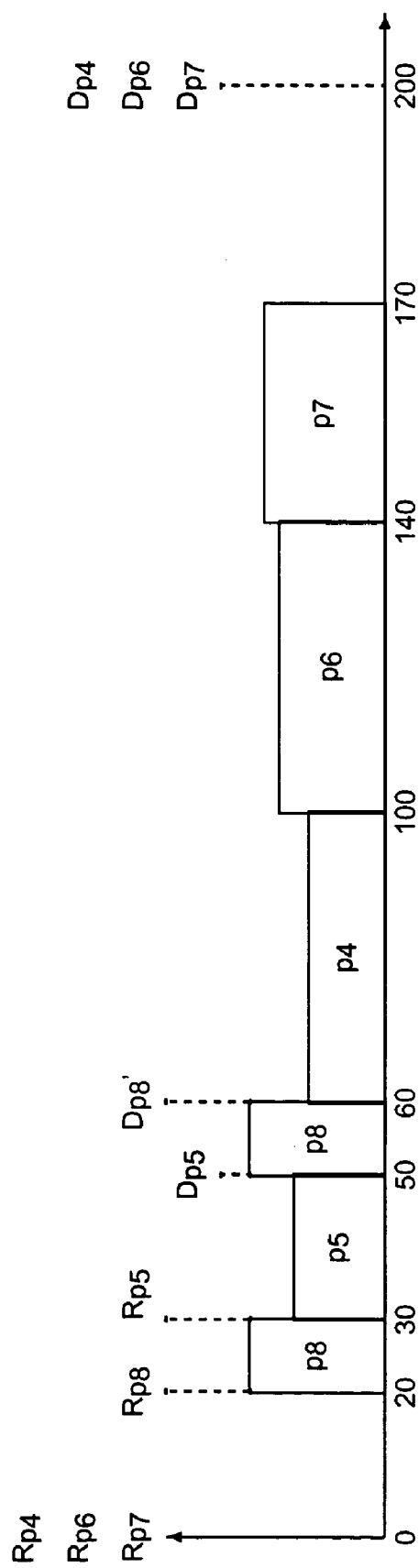
Figure 9:
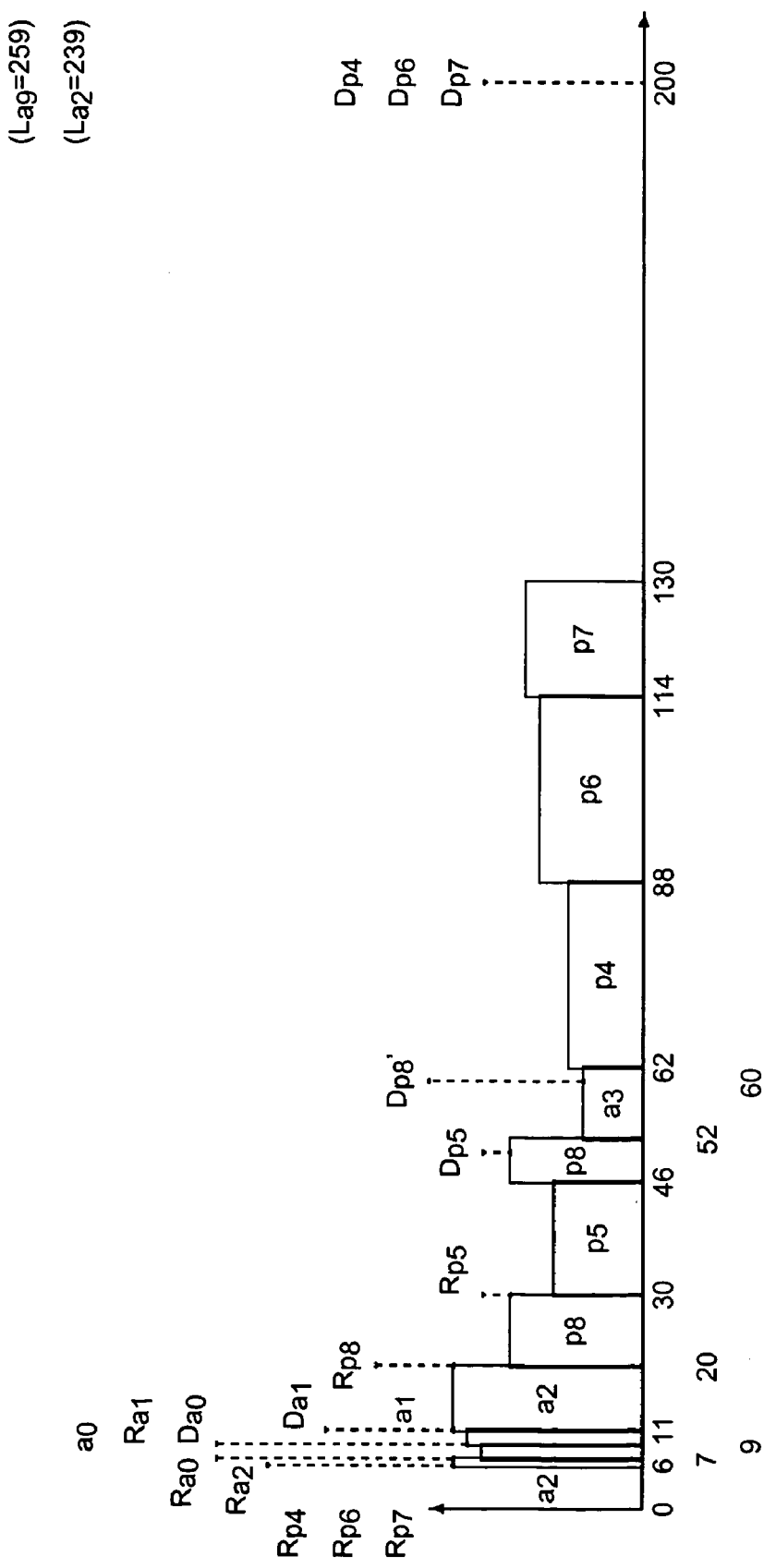
Figure 10:
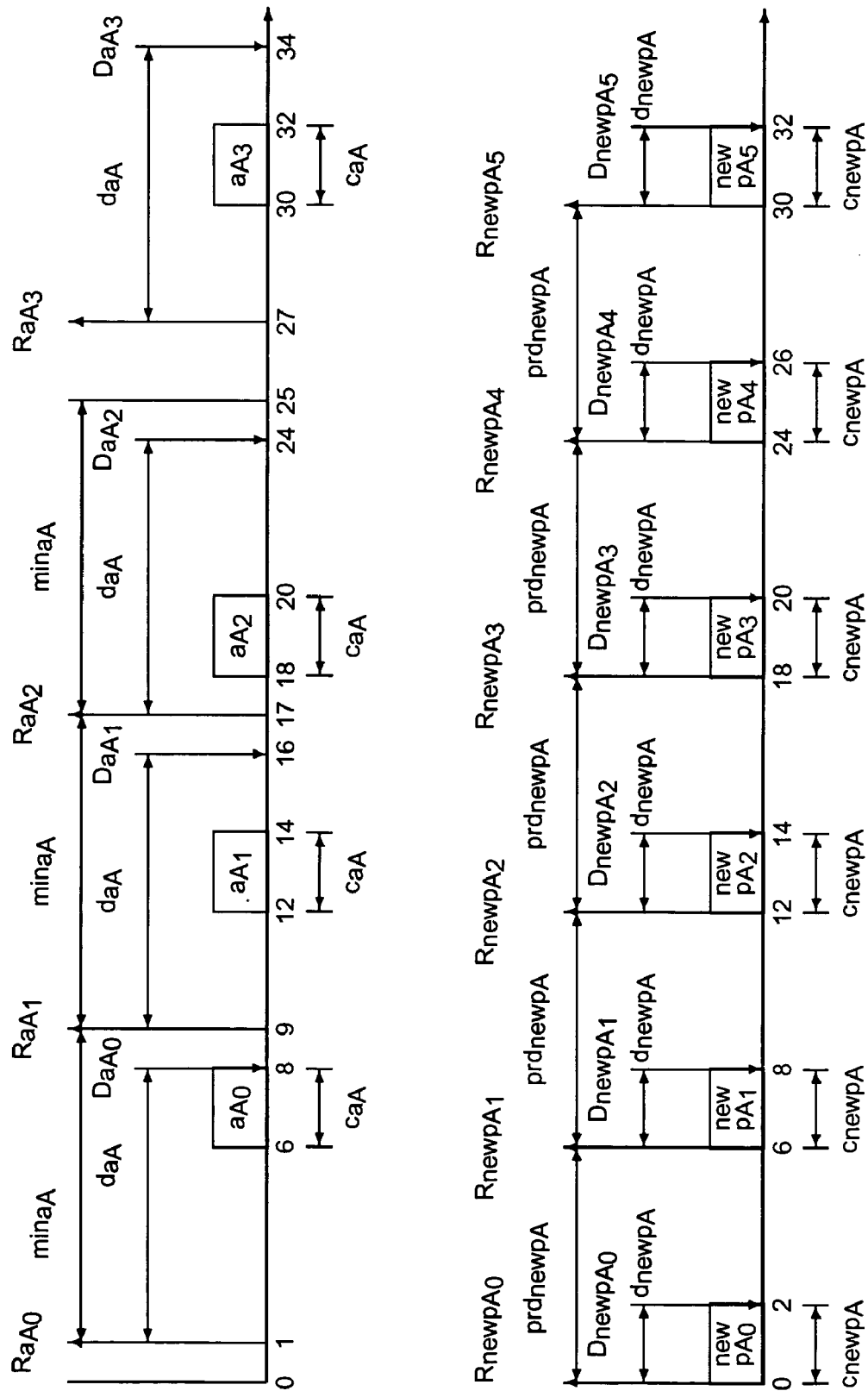
Figure 11:
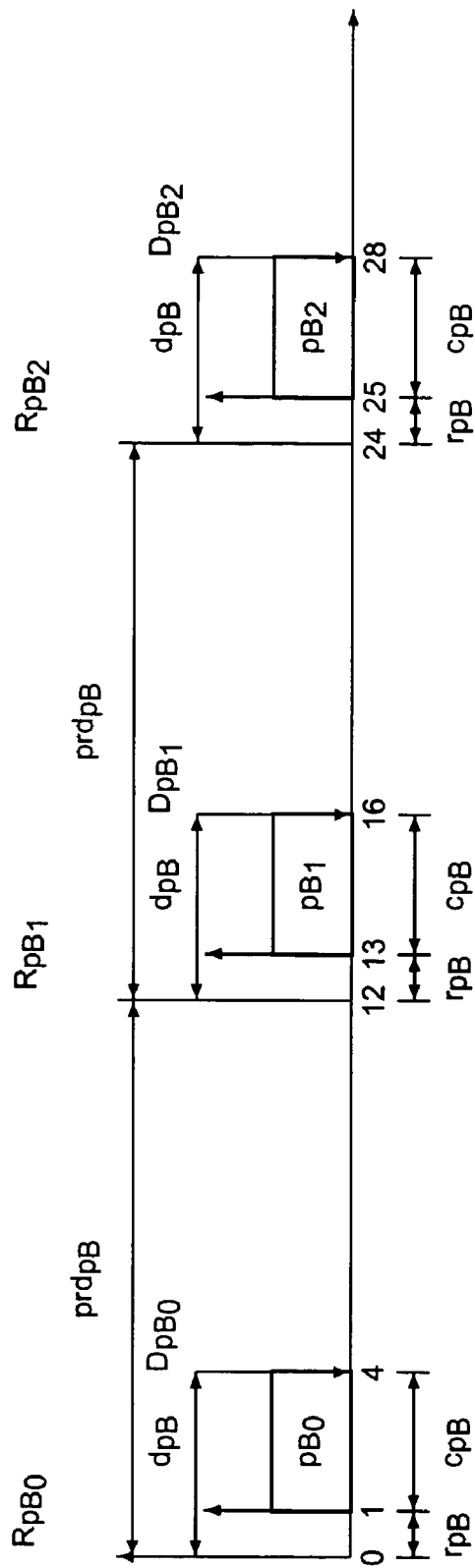
Figure 12:
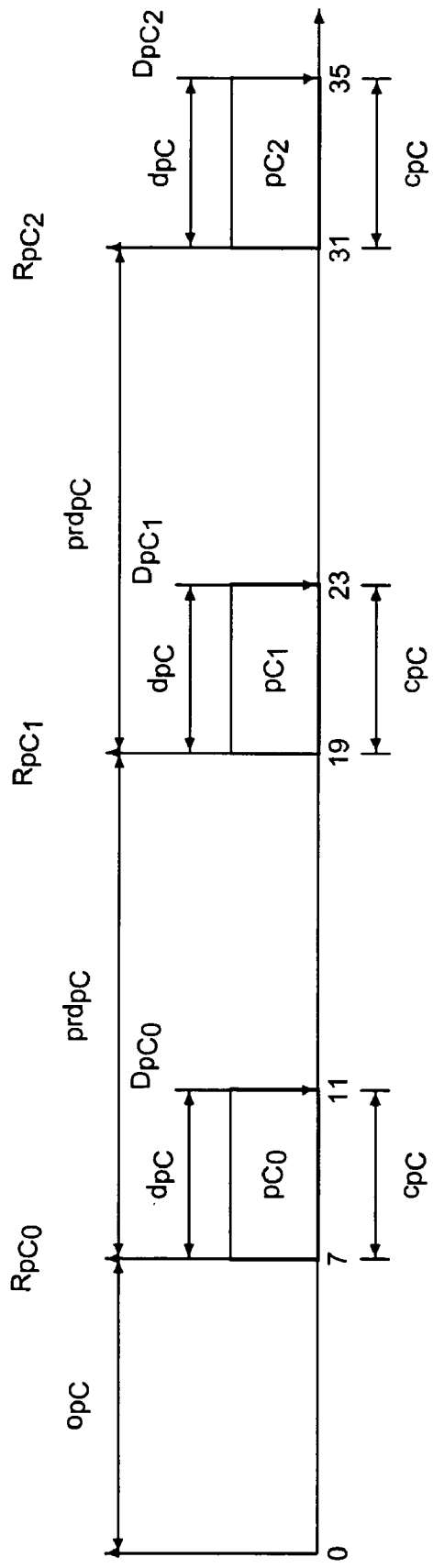
Figure 13:
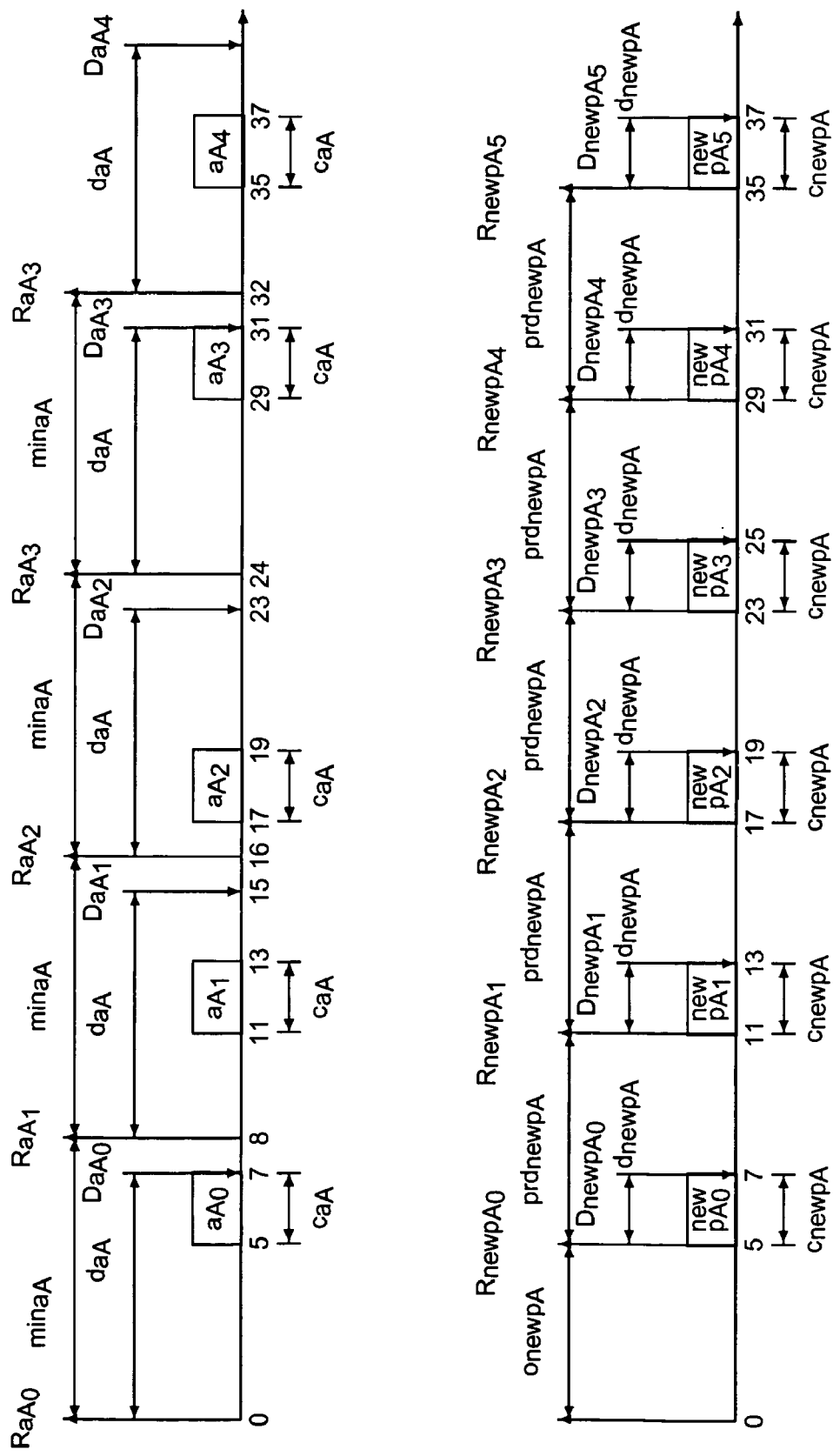
Figure 14:
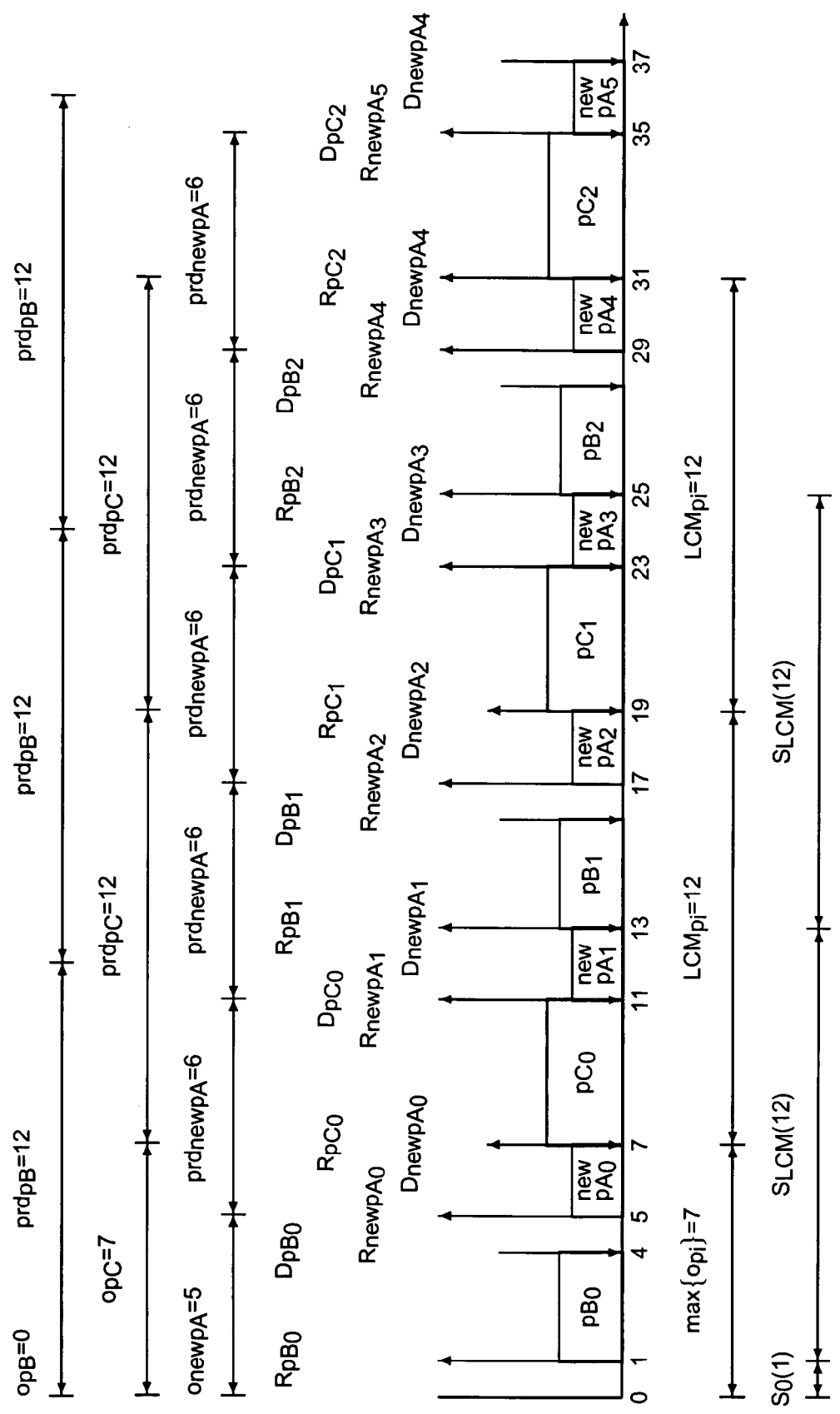
Figure 16:
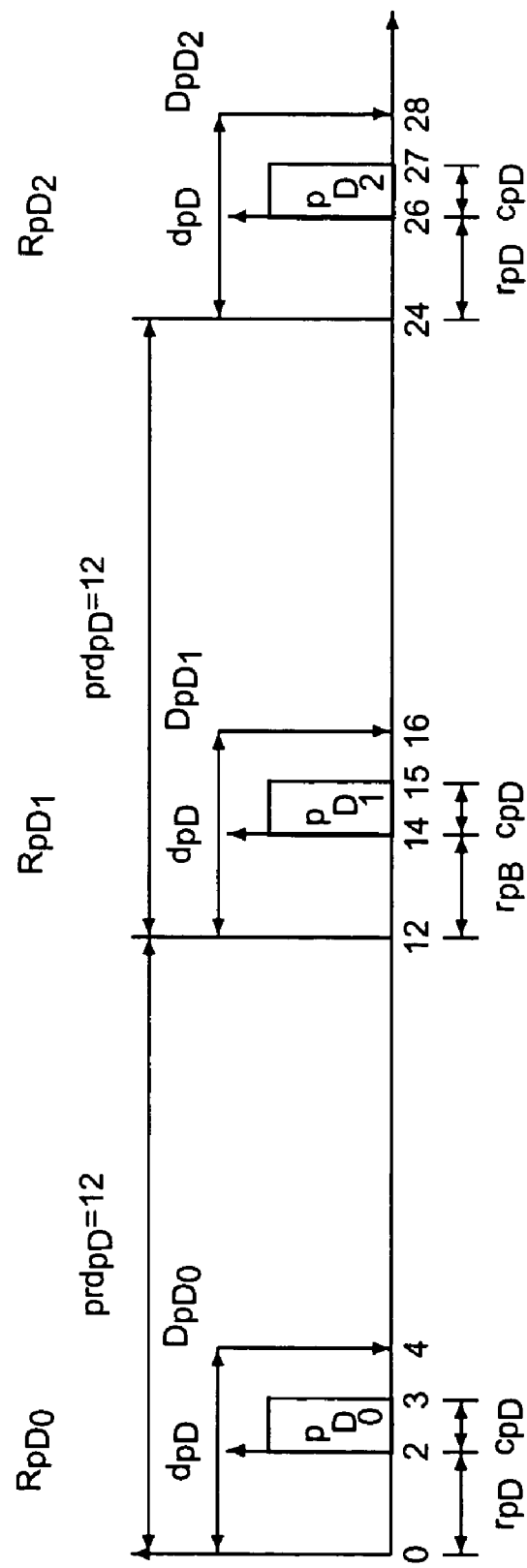
Figure 17:
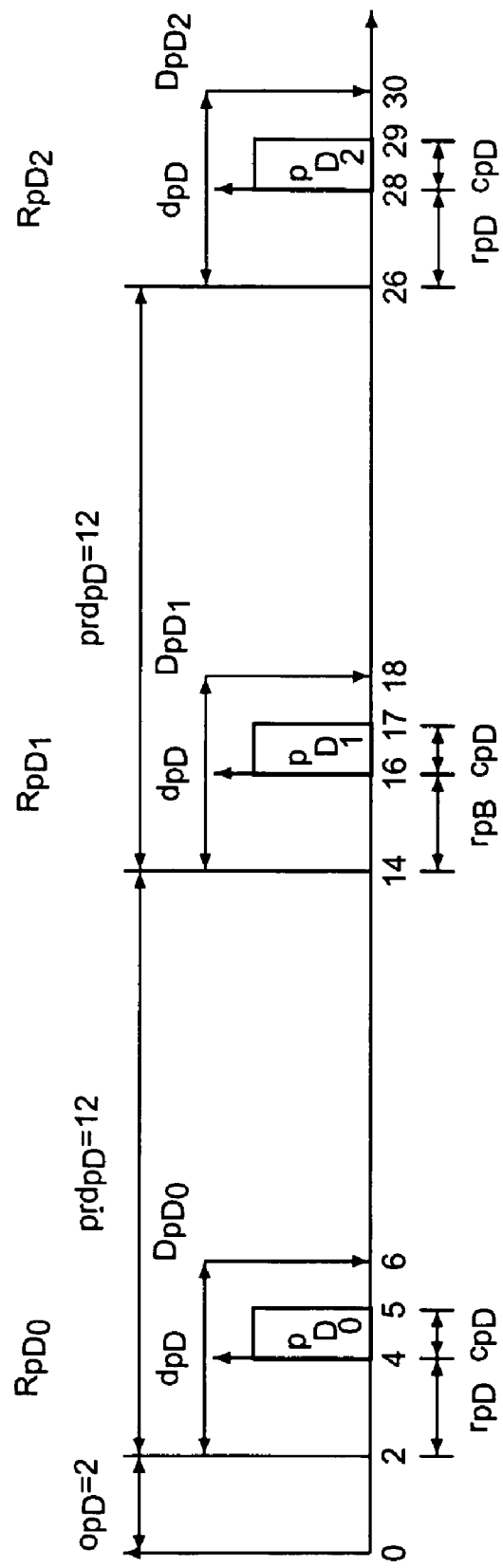
Figure 18:
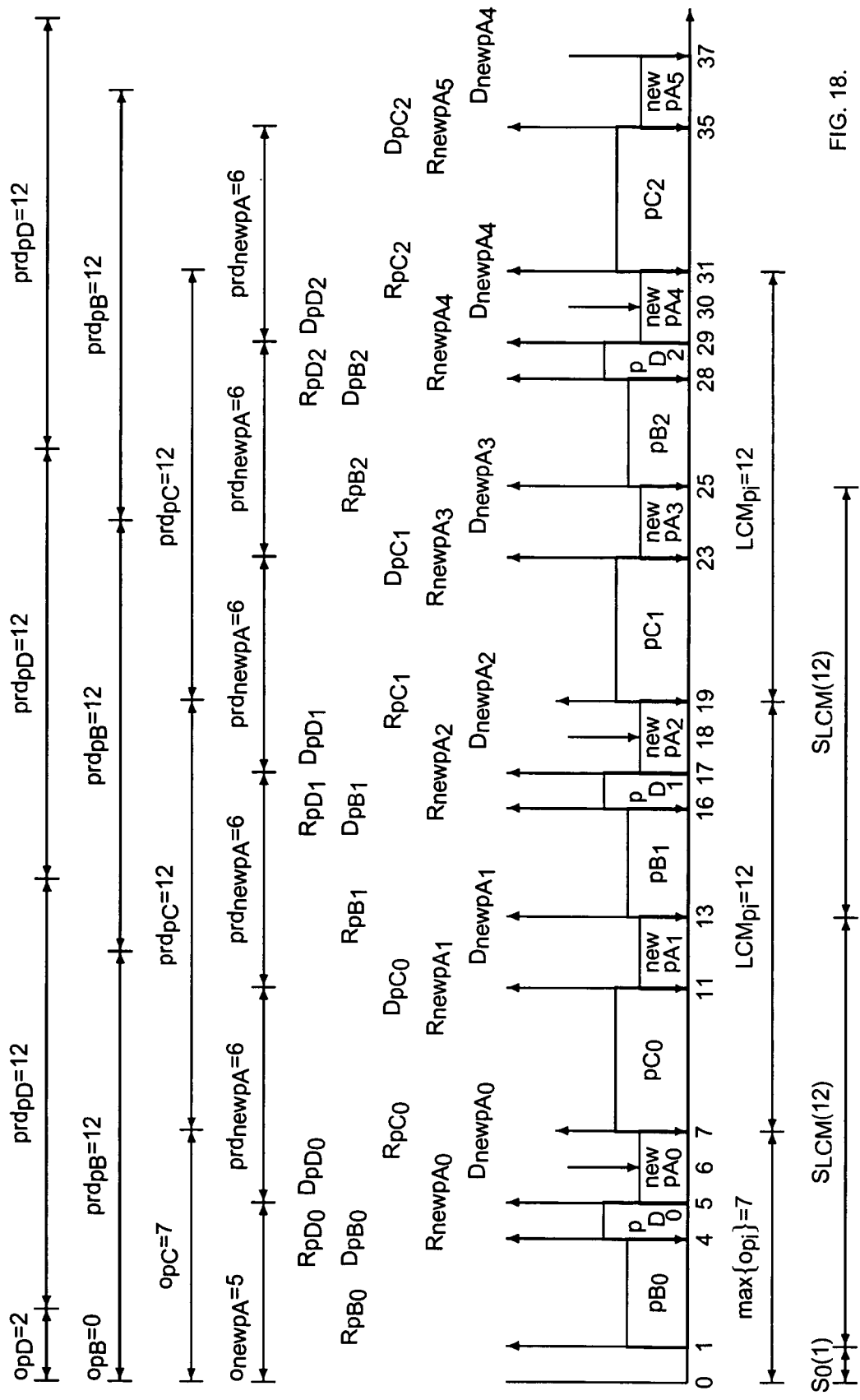
Figure 19:
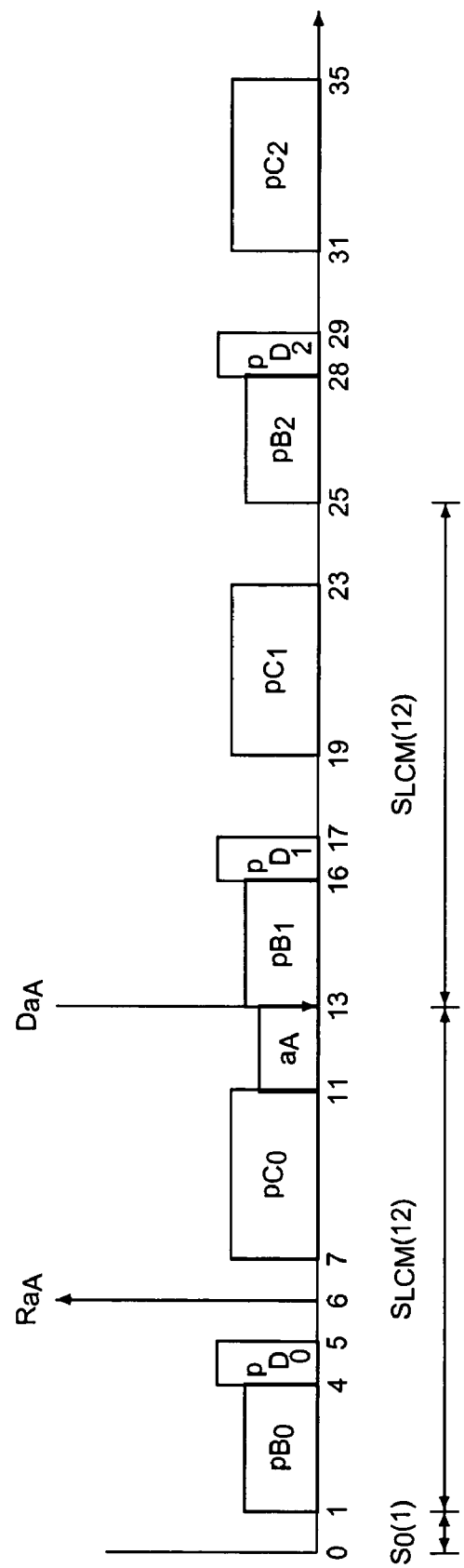
Figure 20A:
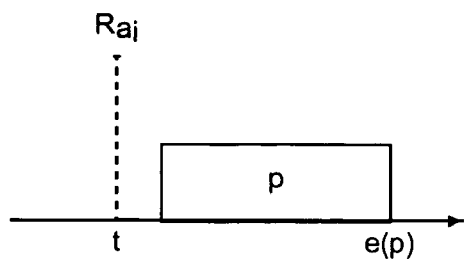
Figure 20B:
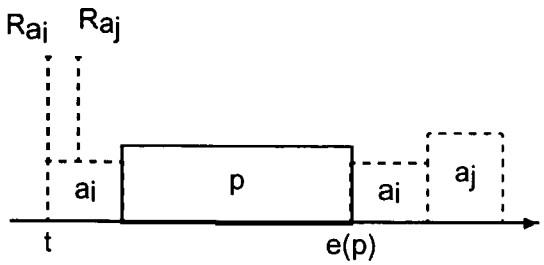
Figure 20C:
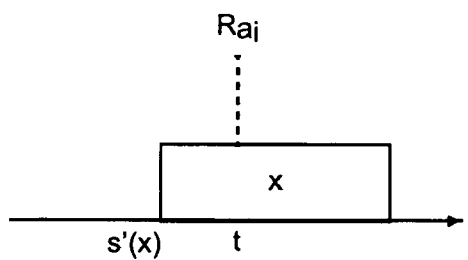
Figure 20D:
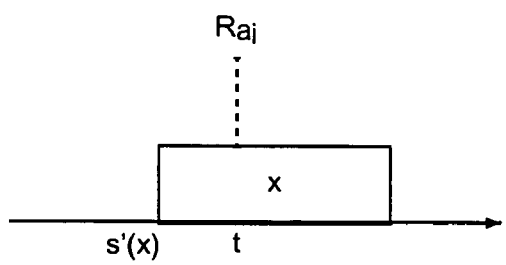
Figure 20E:
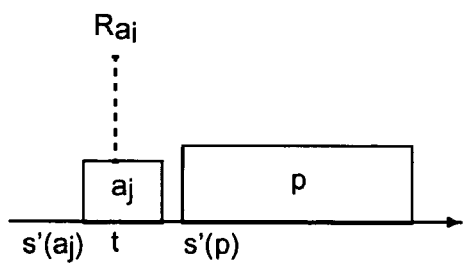
Figure 20F:
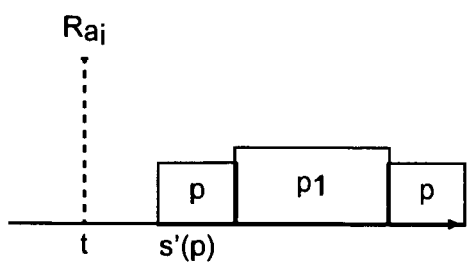
Figure 20G:
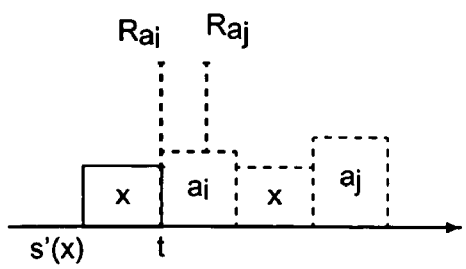
Figure 20H:
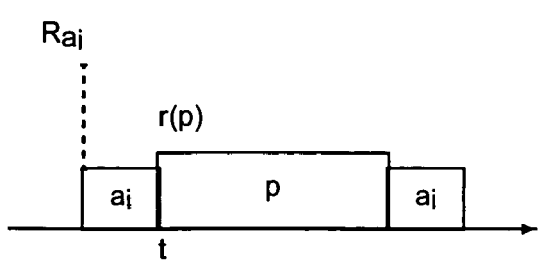
Figure 21:
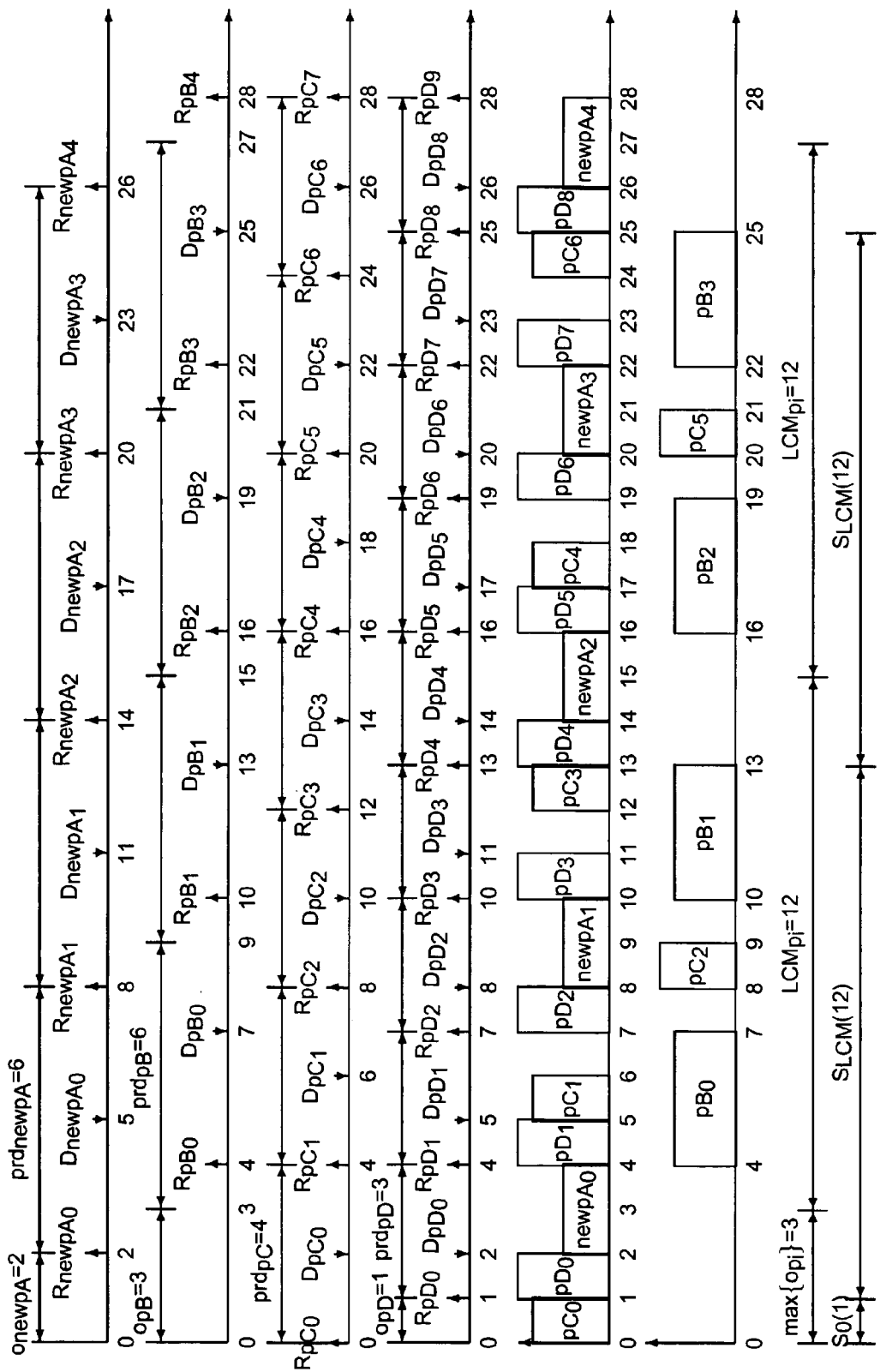
Figure 22:
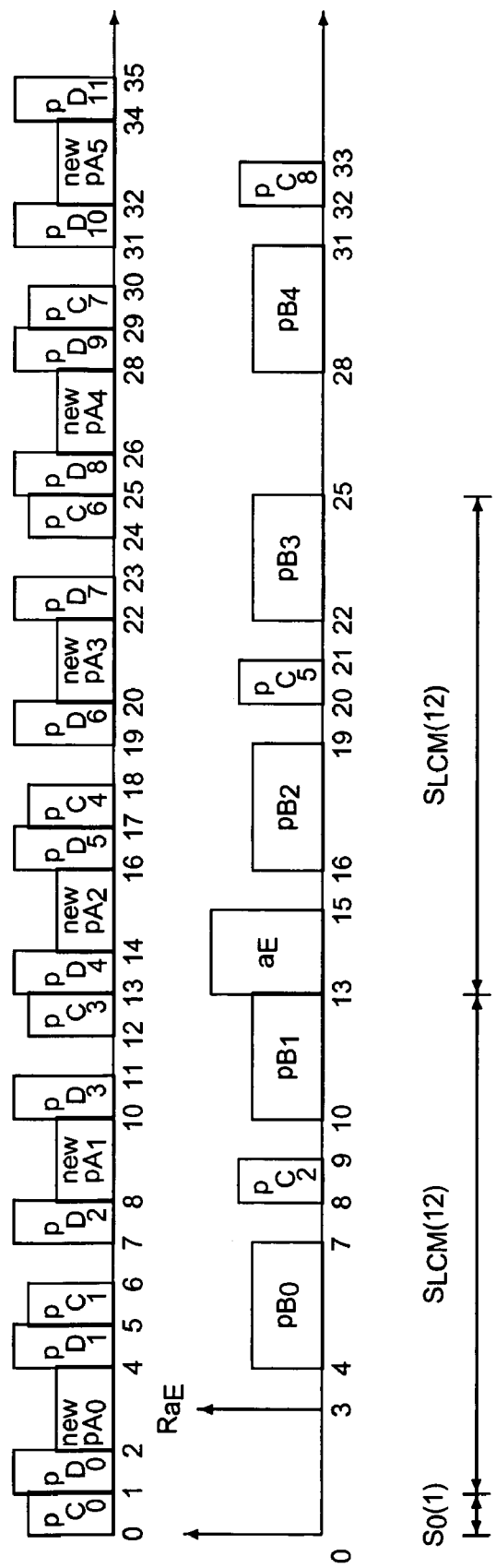
Figure 23:
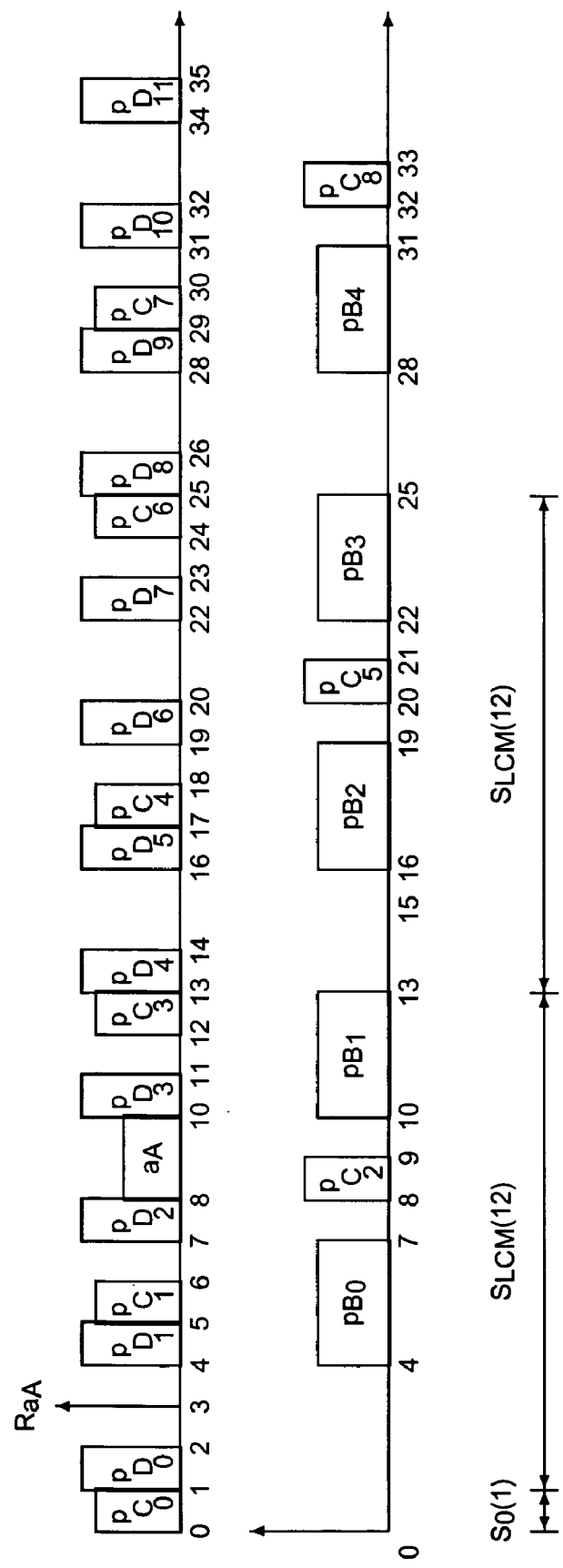
Figure 24:
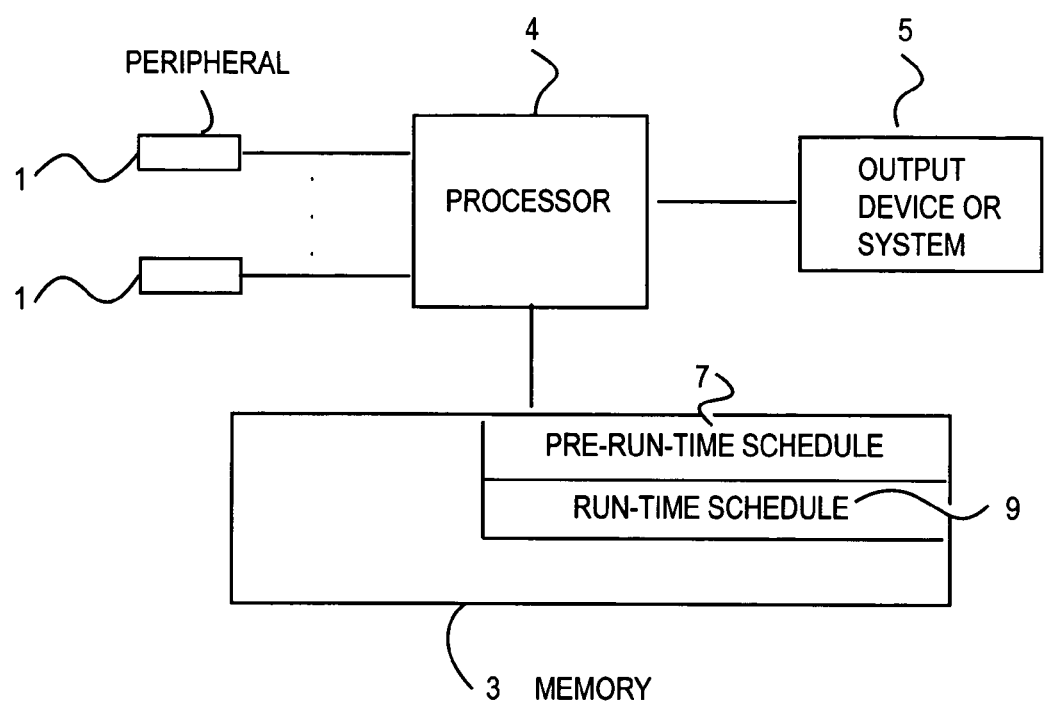
Figure 24A:
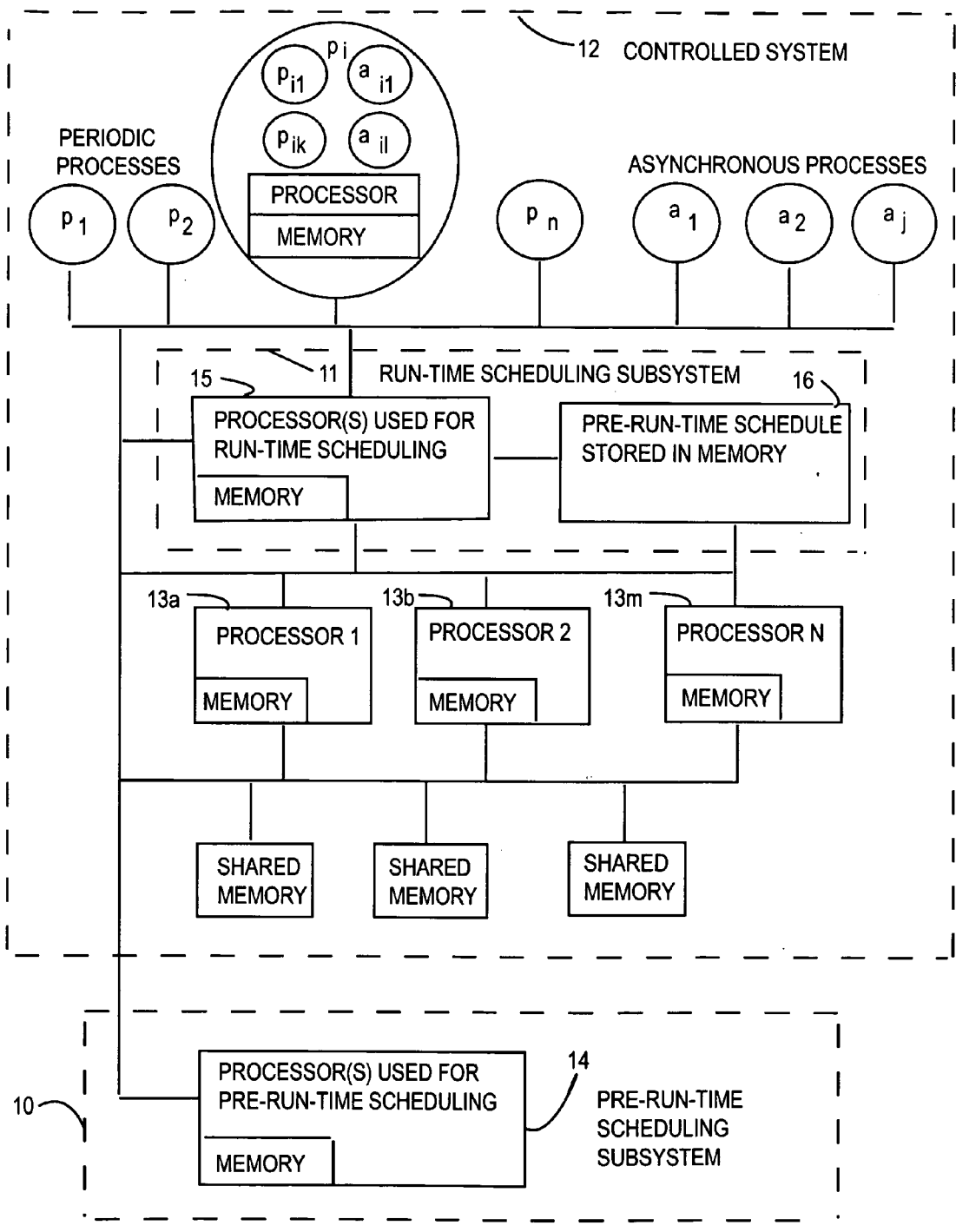
Figure 25:
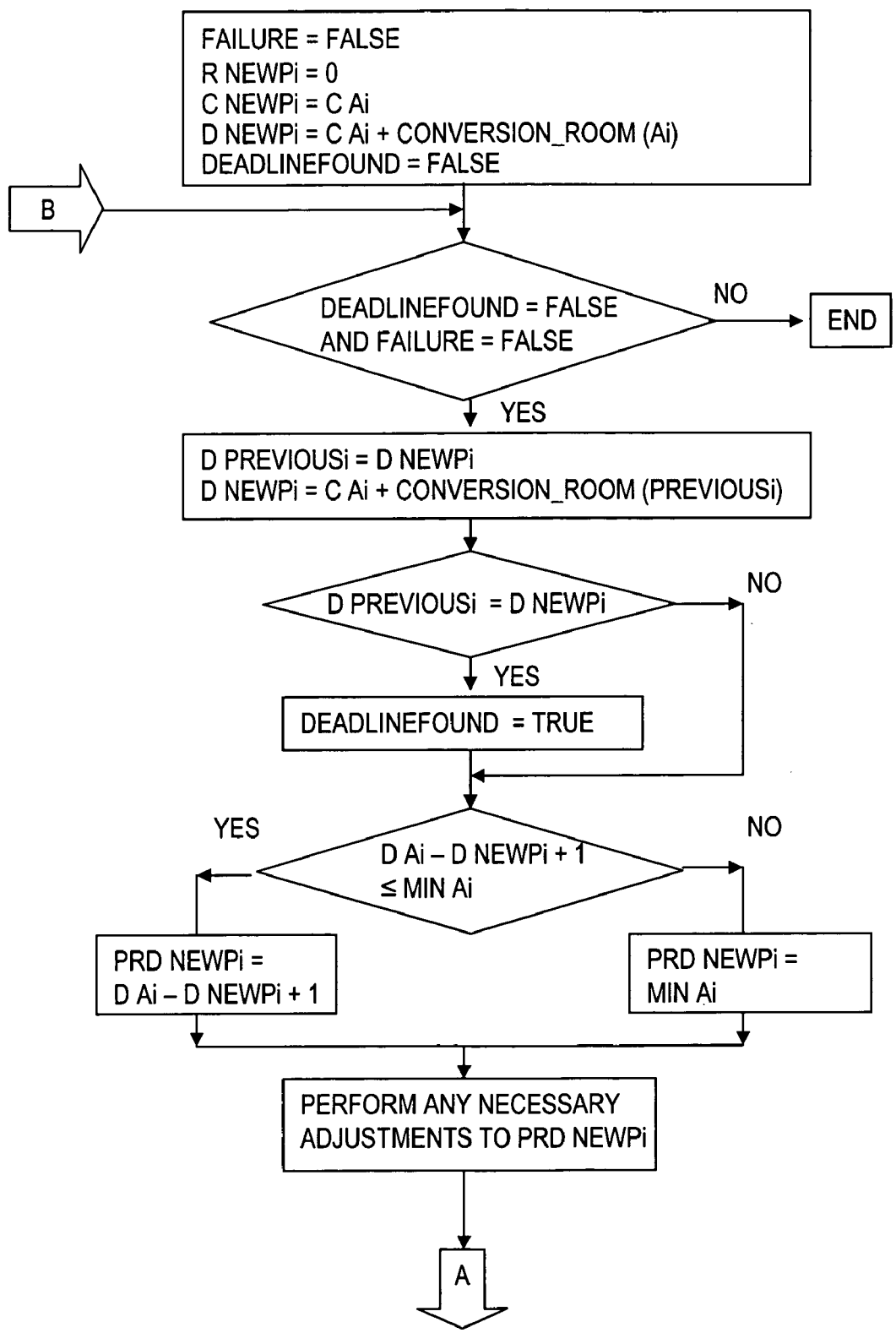
Figure 25:
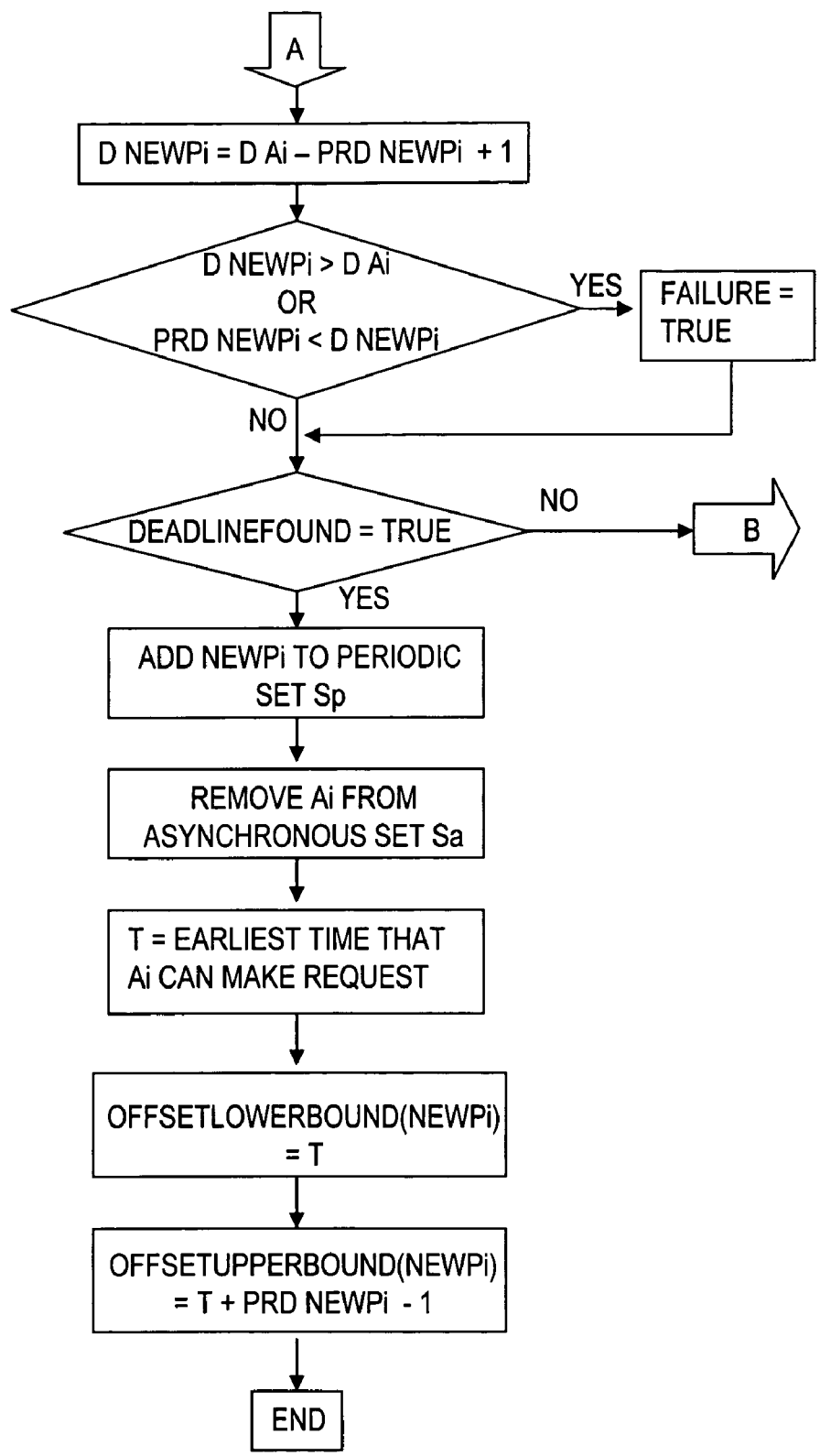
Figure 26:
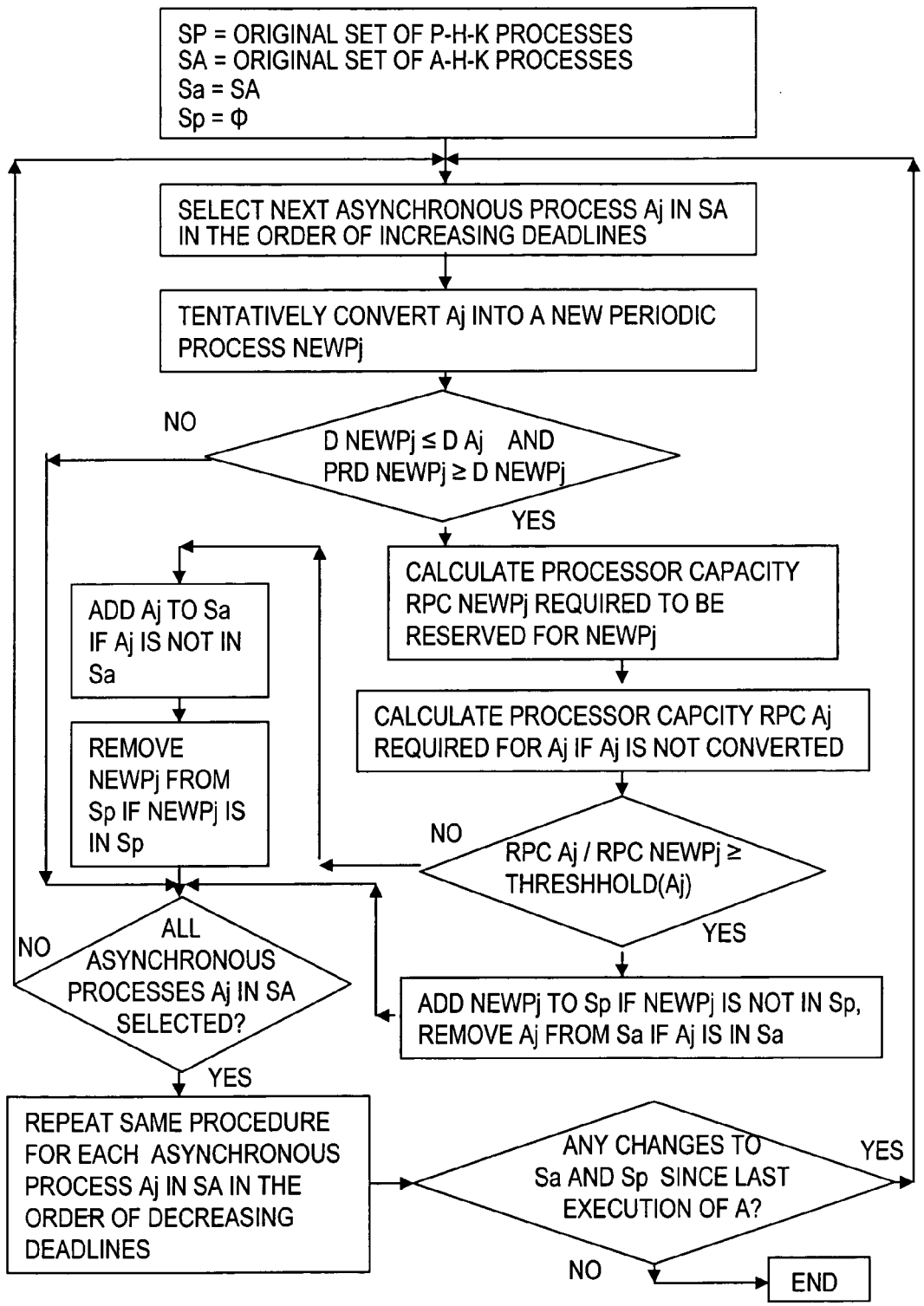
Figure 27A:
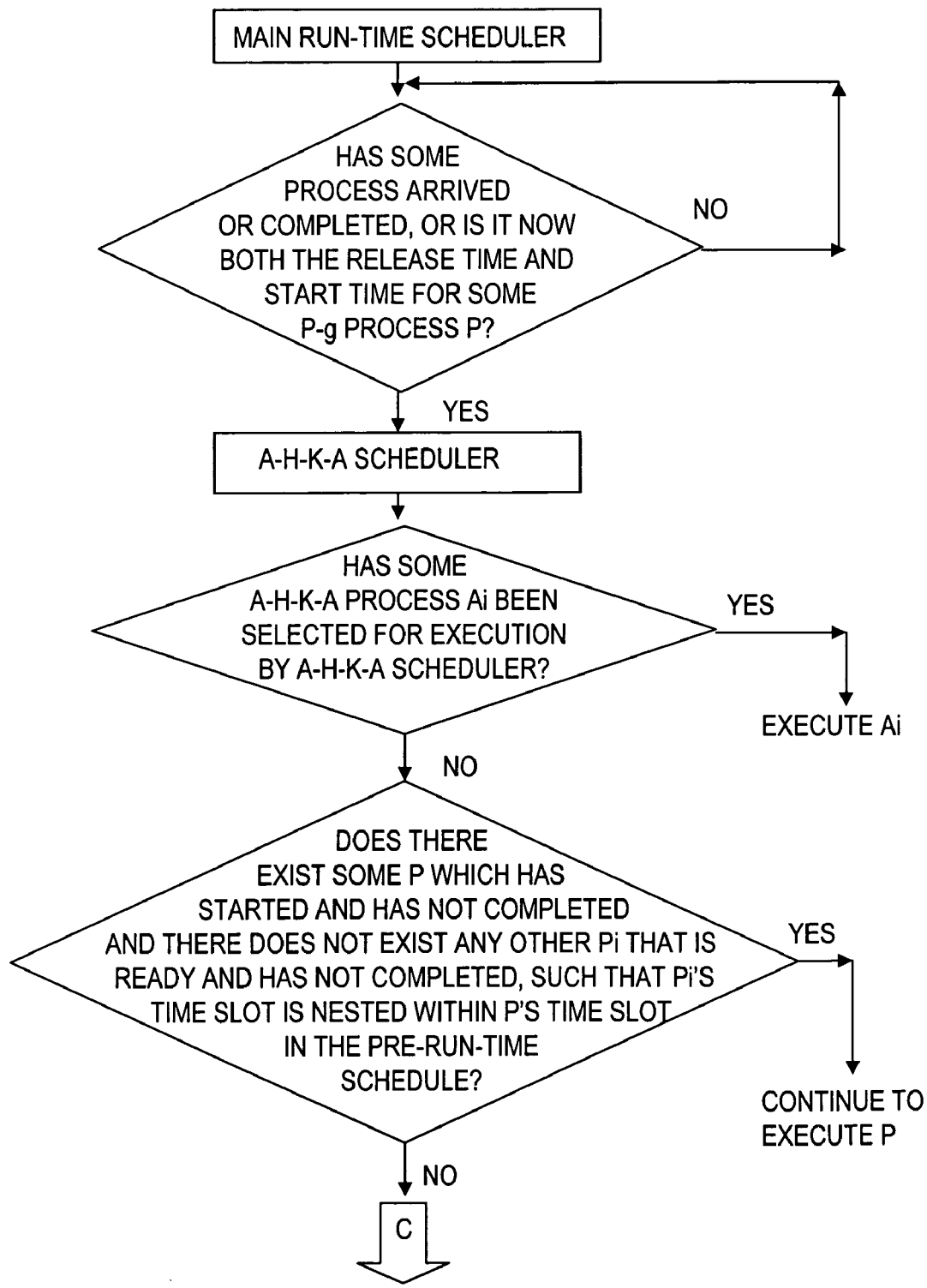
Figure 27B:
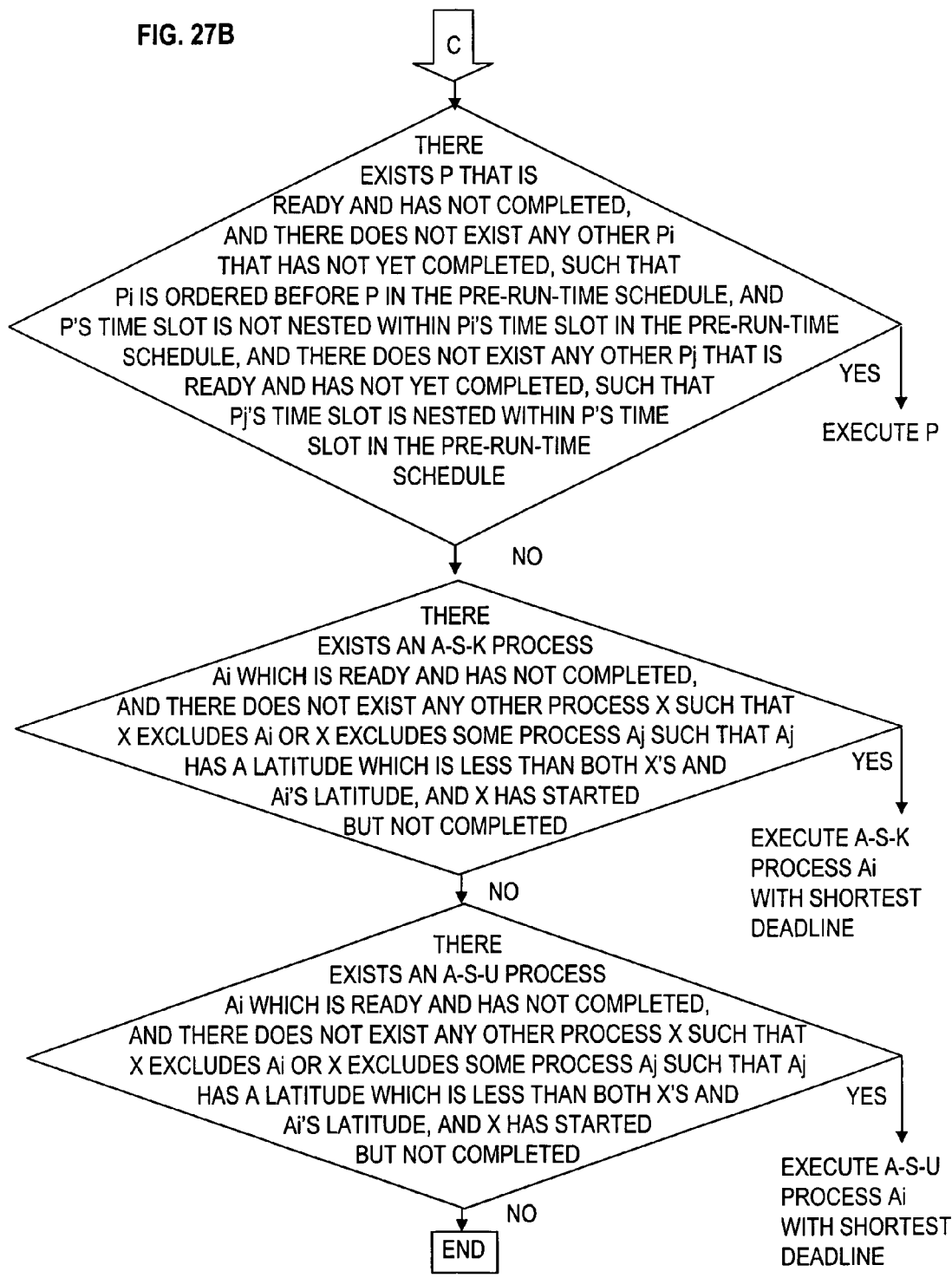

A better understanding of the invention may be obtained by reading the detailed description of the invention below, in conjunction with the following drawings, in which:

FIG. 1 is a feasible pre-run-time schedule for an embodiment of the invention,

FIG. 2 is a timing diagram of possible run-time execution of certain asynchronous and periodic processes, FIGS. 3 and 8 are feasible pre-run-time schedules for other embodiments of the invention, FIGS. 4, 5, 6, 7 and 9 are timing diagrams of possible run-time execution of other asynchronous and periodic processes, FIGS. 10 and 13 are example timing diagrams of possible timing parameters of various new periodic processes resulting from converting asynchronous processes to new periodic processes, FIG. 14 is another example of a feasible pre-run-time schedule, FIGS. 11, 12, 15, 16 and 17 are example timing diagrams of possible timing parameters of various periodic processes, FIG. 18 is another example of a feasible pre-run-time schedule, FIG. 19 is another example of a possible run-time execution of other asynchronous and periodic processes, FIGS. 20A–20H are timing diagrams used in the explanation of various example cases, and FIGS. 21 and 22 are feasible pre-run-time schedules on two processors for other embodiments of the invention, FIG. 23 is a timing diagram of a possible run-time execution of other asynchronous and periodical processes on two processors, and FIGS. 24 and 24A are block diagrams of systems on which the present invention can be carried out.

DETAILED DESCRIPTION OF PREFERRED EMBODIMENTS OF THE INVENTION

Example embodiments will now be given which illustrate operation and advantages of the present invention as compared with systems and methods that perform all scheduling activities at run-time. It should be noted that existing systems and methods that perform all scheduling activities at run-time are not able to guarantee the schedulability of the set of processes given in these examples. Some of the embodiments will be described in pseudocode, which is a shorthand form of English understandable to persons skilled in the field of this invention.

Periodic Processes

A periodic process consists of a computation that is executed repeatedly, once in each fixed period of time. A typical use of periodic processes is to read sensor data and update the current state of internal variables and outputs.

A periodic process p can be described by a quintuple ($o_p$, $r_p$, $c_p$, $d_p$, $prd_p$), wherein $prd_p$ is the period. $c_p$ is the worse case computation time required by process p, $d_p$ is the deadline, i.e., the duration of the time interval between the beginning of a period and the time by which an execution of process p must be completed in each period, $r_p$ is the release time, i.e., the duration of the time interval between the beginning of a period and the earliest time that an execution of process p can be started in each period, and $o_p$ is the offset, i.e., the duration of the time interval between the beginning of the first period and time 0.

When there exists flexibility in assigning an offset value for a periodic process, a permitted range of the offset, offsetlowerbound(p)$\leq o_p \leq$offsetupperbound(p), instead of one fixed offset, can be specified for that process. A single offset value constraint is a special case of a permitted range of offset constraint.

It is assumed that $o_p$, $r_p$, $c_p$, $d_p$, $prd_p$ as well as any other parameters expressed in time have integer values. A periodic process p can have an infinite number of periodic process executions $p_0$, $p_1$, $p_2$, . . . , with one process execution for each period. For the ith process execution $p_i$ corresponding to the ith period, $p_i$'s release time is $R_{pi}=o_p+r_p+prd_p\times(i-1)$; and $p_i$'s deadline is $D_{pi}=o_p+d_p+prd_p\times(i-1)$ The uppercase letters R and D in $R_p$ and $D_p$ are used herein to denote the release time and deadline respectively of a periodic process execution of some periodic process p.

It is noted that it is of common practice to include the system overhead in the computation time of the processes.

Reference is made to FIG. 11 and FIG. 12 for examples of periodic processes. FIG. 11 illustrates the periodic process $p_B=(o_{pB}, r_{pB}, c_{pB}, d_{pB}, prd_{pB})$ where $r_{pB}=1, c_{pB}=3, d_{pB}=4, prd_{pB}=12, o_{pB}=0$. FIG. 12 illustrates the periodic process $p_D=(o_{pC}, r_{pC}, c_{pC}, d_{pC}, prd_{pC})$ where $r_{pC}=0, c_{pC}=4, d_{pC}=4, prd_{pC}=12, o_{pC}=7$.

Asynchronous Processes

An example of an asynchronous process is one which consists of a computation that responds to internal or external events. A typical use of an asynchronous process is to respond to operator requests. Although the precise request times for executions of an asynchronous process a are not known in advance, usually the minimum amount of time between two consecutive requests $min_a$ is known in advance. An asynchronous process a can be described by a triple ($c_a$, $d_a$, $min_a$). $c_a$ is the worse case computation time required by process a. $d_a$ is the deadline, i.e., the duration of the time interval between the time when a request is made for process a and the time by which an execution of process a must be completed. An asynchronous process a can have an infinite number of asynchronous process executions $a_0$, $a_1$, $a_2$, . . . , with one process execution for each asynchronous request. For the ith asynchronous process execution $a_i$ which corresponds to the ith request, if $a_i$'s request (arrival) time is $R_{ai}$, then $a_i$'s deadline is $D_{ai}=R_{ai}+d_a$.

The uppercase letters R and D in $R_a$ and $D_a$ will be used herein to denote the request (arrival) time and deadline respectively of an asynchronous process execution of some asynchronous process a.

Schedules

If a periodic process p or an asynchronous process a has a computation time of $c_p$ or $c_a$, then it is assumed that that process execution $p_i$ or $a_i$ is composed of $c_p$ or $c_a$ process execution units. Each processor is associated with a processor time axis starting from 0 and is divided into a sequence of processor time units.

A schedule is a mapping from a possibly infinite set of process execution units to a possibly infinite set of processor time units on one or more processor time axes. The number of processor time units between 0 and the processor time unit that is mapped to by the first unit in a process execution is called the start time of that process execution. The number of time units between 0 and the time unit subsequent to the processor time unit mapped to by the last unit in a process execution is called the completion time of that process execution. A feasible schedule is a schedule in which the start time of every process execution is greater than or equal to that process execution's release time or request time, and its completion time is less than or equal to that process execution's deadline.

Reference is made to FIGS. 1–9, 14 and 18 are examples of feasible schedules, wherein the horizontal axis is the time axis, and time period segments are separated by vertical lines which represent release times and deadlines, as will be described below.

It should be noted that, in order to avoid use in this specification of an exceedingly large number of repetitions of use of the word "executions of process", or "executions of process i", these terms have been in many places herein abbreviated to the word "process", or to simply "i". Thus whenever there is a reference to the term "process" as related to a schedule, the term "process", or "process i", or "i" when i is the name of a process should be understood as meaning "process execution" or "the execution of process i".

Process Segments

Each process p may consist of a finite sequence of segments p(0), p(1), . . . , p(n(p)), where p(0) is the first segment and p(n(p)) is the last segment in process p. Given the release time $r_p$, deadline $d_p$ of process p and the computation time of each segment $\bar{p}$ in process p, one can easily compute the release time and deadline for each segment, as described in the aforenoted 1993 article by Xu and Parnas.

Parallel computations can be represented by several processes, with various types of relations defined between individual segments belonging to different processes, and processes can be executed concurrently; thus requiring each process to be a sequence of segments does not pose any significant restrictions on the amount of parallelism that can be expressed.

Precedence and Exclusion Relations

Various types of relations such as precedence relations and exclusion relations may exist between ordered pairs of processes segments. A process segment i is said to precede another process segment j if j can only start execution after i has completed its computation. Precedence relations may exist between process segments when some process segments require information that is produced by other process segments.

A process segment i is said to exclude another process segment j if no execution of j can occur between the time that i starts its computation and the time that i completes its computation. Exclusion relations may exist between process segments when some process segments must prevent simultaneous access to shared resources such as data and I/O devices by other process segments.

Latitude of a Process

The "latitude" of a process x, denoted by $L_x$, is a user defined measure of the latitude in meeting process x's deadline.

For exemplary purposes, in all the examples given in the description of the present invention, we will assume that for each process x, $L_x$ is set to the following value:

for each periodic process $p_i$, $L_{pi}=d_{pi}-r_{pi}$;
for each asynchronous process $a_i$, $L_{ai}=d_{ai}$.

It should be noted that $L_x$ can be defined differently according to some other criteria, depending on the application.

(For example, for each P-h-k process or P-s-k process $p_i$, instead of defining $L_{pi}=d_{pi}-r_{pi}-L_{pi}=d_{pi}$ could be defined, or any other criteria for defining $L_{pi}$ could be used.)

Main Types of Processes

The main types of processes that are considered herein are the following:

Set P-h-k: Periodic processes with hard deadlines and known characteristics. Each such process may consist of one or more segments, with precedence relations defined on them to enforce the proper ordering of segments belonging to the same process. It is assumed that the following characteristics are known for each such process segment before run-time:

period,
worst-case execution time,
release time,
deadline,
the set of data that each segment reads and writes,
any exclusion relationships with other process segments,
any precedence relationships with other periodic process segments.

Set A-h-k: Asynchronous processes with hard deadlines and known characteristics. It is assumed that each such process consists of a single segment and the following are known for each such process before run-time:

deadline,
worst-case execution time,
minimum time between two consecutive requests,
the set of data that the process reads and writes,
any exclusion relationships with other process segments.

Set P-s-k: Periodic processes with soft deadlines and known characteristics. Each such process consists of one or more segments, with precedence relations defined on them to enforce the proper ordering of segments belonging to the same process. It is assumed that the following are known for each such process before run-time:

period,
worst-case execution time,
release time,
deadline,
the set of data that the process reads and writes,
any exclusion relationships with other process segments,
any precedence relationships with other periodic process segments.

Set A-s-k: Asynchronous processes with soft deadlines and known characteristics. It is assumed that each such process consists of a single segment and the following are known for each such process before run-time:

deadline,
worst-case execution time,
the set of data that the process reads and writes,
any exclusion relationships with other process segments.

Set A-s-u: Asynchronous processes with soft deadlines and unknown characteristics. It is assumed that each such process consists of a single segment and nothing else is known about each such process before run-time.

In the present invention, as well as in the method described in the 1993 article by Xu and Parnas referred to above, and that can be used in the present invention, it is assumed that the basic scheduling unit is a segment. The terms "segment" and "process will also be considered as having the same meaning.

Pre-Run-Time Phase

Step 1: Conversion of A-h-k-p Processes

In this step asynchronous processes with hard-deadlines and known characteristics are referred to as A-h-k processes. The A-h-k processes are divided into two subsets. Different methods will be used to reserve processor capacity for the execution of the processes in each of the two subsets.

The processes in one of subsets, called A-h-k-p processes, should be converted into equivalent new periodic processes with hard deadlines. The remaining A-h-k processes are called A-h-k-a processes and processor capacity should be reserved for their execution before run-time.

For each A-h-k-a process, processor capacity in each hard-deadline periodic process should be reserved by the following.

Let $S_P$ be the original set of P-h-k processes;
Let $S_A$ be the original set of A-h-k processes;
Let $S_a$ be the set of A-h-k processes that have not been converted into periodic processes;
Let $S_p$ be the set of new periodic processes that were converted from A-h-k-p processes.

For each $p_i \epsilon (S_p \cup S_p)$ we calculate its "adjusted computation time" $c_{pi}'$ as follows.

$$c_{pi}'=c_{pi}+\text{adjusted\_capacity}(p_i)$$

The exact adjusted_capacity function that is used, depends on the application characteristics; for example, it may depend on the number of processors that are used, and other factors.

In the examples, it is assumed that the following simple formula is used.

$$\text{adjusted\_capacity}(p_i) = \sum_{a_j \in S_a \wedge L_{a_j} < L_{p_i}} \left\lceil \frac{d_{p_i} - r_{p_i}}{\min_{a_j}} \right\rceil c_{a_j}$$

Above, for each process $p_i$ in $S_P$ (the original set of P-h-k processes) or in $S_p$ (the new periodic processes converted from A-h-k-p processes), for every possible occurrence of any A-h-k-a process $a_j$ between $r_{pi}$ and $d_{pi}$, if $L_{aj}<L_{pi}$ then $a_j$'s computation time is added to $p_i$'s computation time.

EXAMPLE 1

Assume 4 asynchronous processes with hard deadlines and known characteristics (A-h-k processes), and 4 periodic processes with hard deadlines and known characteristics (P-h-k processes) as follows.

$a_0$: $c_{a0}=2$, $d_{a0}=2$, $min_{a0}=1,000$;

$a_1$: $c_{a1}=2$, $d_{a1}=7$, $min_{a1}=1,000$;

$a_2$: $c_{a2}=10$, $d_{a2}=239$, $min_{a2}=1,000$;

$a_9$: $c_{a9}=10$, $d_{a9}=259$, $min_{a9}=1,000$;

$p_4$: $r_{p4}=0$, $c_{p4}=26$, $d_{p4}=200$, $prd_{p4}=200$, $o_{p4}=0$;

$p_5$: $r_{p5}=30$, $c_{p5}=16$, $d_{p5}=50$, $prd_{p5}=200$, $o_{p5}=0$;

$p_6$: $r_{p6}=0$, $c_{p6}=26$, $d_{p6}=200$, $prd_{p6}=200$, $o_{p6}=0$;

$p_7$: $r_{p7}=0$, $c_{p7}=16$, $d_{p7}=200$, $prd_{p7}=200$, $o_{p7}=0$.

The adjusted computation times for $p_4$, $p_5$, $p_6$, $p_7$ will respectively be:

$c_{p4}'=c_{p4}+c_{a0}+c_{a1}=26+2+2=30$;

$c_{p5}'=c_{p5}+c_{a0}+c_{a1}=16+2+2=20$;

$c_{p6}'=c_{p6}+c_{a0}+c_{a1}=26+2+2=30$;

$c_{p7}'=c_{p7}+c_{a0}+c_{a1}=16+2+2=20$.

□

One technique for converting an asynchronous process into an equivalent periodic process is described in the aforenoted 1983 article by Mok in which an asynchronous process ($c_a$, $d_a$, $min_a$) can be converted into a periodic process ($o_p$, $r_p$, $c_p$, $d_p$, $prd_p$) which satisfies the following conditions: $c_p=c_a$, $d_a \geq d_p \geq c_a$, $prd_p \leq min(d_a-d_p+1, min_a)$, $r_p=0$, $o_p=0$.

However, as noted earlier, the technique described by Mok did not consider the case of non-zero offsets, that is, non-zero length intervals between time zero and the beginning of periods of the converted periodic processes.

As will be described below, the present invention extends this technique to allow non-zero offsets. In particular, when an asynchronous process ($c_a$, $d_a$, $min_a$) converted into a periodic process ($o_p$, $r_p$, $c_p$, $d_p$, $prd_p$) if it satisfies the following conditions: $c_p=c_a$, $d_a \geq d_p \geq c_a$, $prd_p \leq min(d_a-d_p+1, min_a)$, $r_p=0$, the converted periodic process is allowed to have offsets that range from 0 to $prd_p-1$: $0 \leq o_p \leq (prd_p-1)$.

By using non-zero offsets, one increases considerably the chances of satisfying all the given timing constraints.

Furthermore, the technique described by Mok only deals with one process. When more than one process must be converted into periodic processes, the new periodic processes may have timing conflicts with each other and with the original set of asynchronous and periodic processes. For example, a direct application of Mok's technique could result in more than one periodic process each having a release time of zero and a deadline equal to the computation time.

In order to avoid such timing conflicts, in accordance with an embodiment of the present invention a procedure is used for converting a set of asynchronous processes into periodic processes, which also takes into account the possibility of timing conflicts with other existing asynchronous and periodic processes.

First, a procedure is introduced that converts a single asynchronous process $a_i$ into a corresponding new periodic process "newp$_i$". When determining newp$_i$'s deadline $d_{newpi}$, we leave "room" for all the hard deadline processes that have a shorter or equal deadline than that process's deadline, as follows:

$d_{newpi}=c_{ai}+conversion\_room(a_i)$;

The exact conversion_room function that is used, depends on the application characteristics. In the following two examples, first assume that the following simple formula is used.

$$conversion\_room(x_i) = \sum_{p_j \in (S_p \cup S_p) \wedge d_{p_j} \leq d_{x_i}} \left\lceil \frac{d_{x_i}}{prd_{p_j}} \right\rceil * c_{p_j} + \sum_{a_j \in S_a \wedge d_{a_j} \leq d_{x_i} \wedge i \neq j} \left\lceil \frac{d_{x_i}}{min_{a_j}} \right\rceil * c_{a_j}$$

In the above relationship, the deadline of the new periodic process $d_{newp1}$ appears on both the left-hand side and right-hand side thereof. The value of $d_{newpi}$ as well as all other parameters of the new periodic process can be found with the following procedure for converting a single asynchronous process $a_i=(c_{ai}, d_{ai}, min_{ai}) \in S_a$ into a periodic process newp$_i=(o_{newpi}, r_{newpi}, c_{newpi}, d_{newpi}, prd_{newpi}) \in S_p$

```
failure:=false;
r_newpi:=0;
c_newpi:=c_ai;
d_newpi:=c_ai + conversion_room(a_i);
deadlinefound:=false;
while not(deadlinefound) and not(failure) do
begin
    d_previous_i:=d_newpi;
    d_newpi = c_ai + conversion_room(previous_i);
    if d_previous_i = d_newpi then deadlinefound:=true;
    if (d_ai - d_newpi + 1) ≤ min_ai
    then
        prd_newpi:=(d_ai - d_newpi + 1)
    else
        prd_newpi:=min_ai;
    prd_newpi:=adjustperiod(prd_newpi);
        {perform any necessary adjustments to prd_newpi}
    d_newpi:=d_ai - prd_newpi + 1;
    if (d_newpi > d_ai) or (prd_newpi < d_newpi)
    then failure:=true
    else if deadlinefound
        then
        begin
            S_p := S_p ∪ {newp_i};
            S_a := S_a - {a_i};
        end;
end
```

If it is assumed that the earliest time that asynchronous process $a_i$ can make a request for execution is time t, then the permitted range of the offset $o_{newpi}$ is $[t, t+prd_{newpi}-1]$ Reference is made to FIGS. 10 and 13 for examples of conversion of an asynchronous process into a periodic process.

In FIG. 10, the Periodic process newp$_A=(o_{newpA}, r_{newpA}, c_{newpA}, d_{newpA}, prd_{newpA})$ is translated from the asynchronous process $a_A=(c_{aA}, d_{aA}, min_{aA})=(2,7,8)$, where $r_{newpA}=0$, $c_{newpA}=c_{aA}=2$, $d_{newpA}=c_{aA}=2$, $prd_{newpA}=min(d_{aA}-d_{newpA}+1, min_{aA})=min(7-2+1,8)=6$, the permitted range of offset is:

$0 \leq o_{newpA} \leq prd_{newpA}-1=5$. If periodic process $newp_A$'s offset is set to 0, i.e., $o_{newpA}=0$, then periodic process executions $newp_{A0}$, $newp_{A1}$, $newp_{A2}$, $newp_{A3}$, $newp_{A4}$, $newp_{A5}$, ... start at the times 0, 6, 12, 18, 24, 30, ... respectively, and if the asynchronous request times $$R_{a_0}, R_{a_{A_1}}, R_{a_{A_2}}$$

are 1, 9, 17, 27, then the asynchronous process executions $a_{A0}$, $a_{A1}$, $a_{A2}$, $a_{A3}$ start at the times 6, 12, 18, 30 respectively. $a_{A0}$ executes in the time slot of $newp_{A1}$, $a_{A1}$, executes in the time slot of $newp_{A2}$, $a_{A2}$ executes in the time slot of $newp_{A3}$, $a_{A3}$ executes in the time slot of $newp_{A5}$.

In FIG. 13, the periodic process $newp_A=(o_{newpA}, r_{newpA}, c_{newpA}, d_{newpA}, prd_{newpA})$ translated from the asynchronous process $a_A=(c_{aA}, d_{aA}, min_{aA})=(2,7,8)$, where $r_{newpA}=0$, $c_{newpA}=c_{aA}=2$, $d_{newpA}=c_{aA}=2$, $prd_{newpA}=min(d_{aA}-d_{newpA}+1, min_{aA})=min(7-2+1,8)=6$, the permitted range of offset is: $0 \leq o_{newpA} \leq prd_{newpA}-1 = 5$. If periodic process $newp_A$'s offset is set to 5, i.e., $o_{newpA}=5$, then periodic process executions $newp_{A0}$, $newp_{A1}$, $newp_{A2}$, $newp_{A3}$, $newp_{A4}$, $newp_{A5}$, ... start at time 5, 11, 17, 23, 29, 35, ..., and if the asynchronous process always makes requests at the earliest possible time and at the highest possible rate, the first five asynchronous request times $$R_{a_0}, R_{a_{A_1}}, R_{a_{A_2}}, R_{a_{A_3}}, R_{a_{A_4}}$$

are 0, 8, 16, 24, 32, then the asynchronous process executions $a_{A0}$, $a_{A1}$, $a_{A2}$, $a_{A3}$, $a_{A4}$ start at the times 5, 11, 17, 29, 35 respectively. $a_{A0}$ executes in the time slot of $newp_{A0}$, $a_{A1}$ executes in the time slot of $newp_{A1}$, $a_{A2}$ executes in the time slot of $newp_{A2}$, $a_{A3}$ executes in the time slot of $newp_{A4}$, $a_{A4}$ executes in the time slot of $newp_{A5}$, etc.

In some cases, when the lengths of periods are relatively prime, the length of the LCM of the periods could become inconveniently long. A function "adjustperiod" can be used to adjust $prd_{newpi}$, whenever the LCM became inconveniently long.

(See Example A below and FIGS. 15 and 16 for an example of the use of the adjustperiod function).

The adjustperiod function will be described below in the section related to construction of a feasible pre-run-time schedule for the P-h-k processes.

EXAMPLE 2

Assuming that in addition to the processes in Example 1 above, the following A-h-k process:

$a_3$: $c_{a3}=10$, $d_{a3}=114$, $min_{a3}=114$.

If the procedure above is used to convert $a_3$ into a periodic process $newp_3$, prior to entering the while loop, $d_{newp3}=c_{a3}+c_{p5}+c_{a0}+c_{a1}=10+16+2+2=30$. In the first iteration of the while loop, $d_{previous}=d_{newp3}=30$; $d_{newp3}=c_{a3}+c_{a0}+c_{a1}=10+2+2 =14$.

Since $d_{previous} \neq d_{newp3}$, deadlinefound=false. In the second iteration of the while loop, $d_{previous}=d_{newp3}=14$; $d_{newp3}=c_{a3}+c_{a0}+c_{a1}=10+2+2=14$. Since $d_{previous}=d_{newp3}$, deadlinefound=true. $prd_{newp3}=(d_{a3}-d_{newp3}+1)=114-14+1 = 101$.

If the adjustperiod function and select_exp_upperbounds procedure described herein with reference to constructing a feasible pre-run-time schedule are used to adjust the period $prd_{newp3}$, by using $prd_{max}=prd_{p4}=200$, and the following initial exponent upperbound values: $exp2_{init}=5$, $exp3_{init}=3$, $exp5_{init}=2$, $exp7_{init}=1$, $exp11_{init}=0$, and use the value 24 for the parameters $C_m$, $C_{m11}$, $C_{m7}$, $C_{m5}$, $C_{m3}$, $C_{m2}$, and $C_d$, $C_{d7}$, $C_{d5}$, $C_{d3}$, $C_{d2}$, and the value 0 for $C_{e7}$, $C_{e5}$, $C_{e3}$, $C_{e2}$, and the values 0, 1, 2, for $C_{e57}$, $C_{e35}$, $C_{e23}$, respectively, then the select_exp_upperbounds procedure will produce the following values for the exponent upperbounds:

exp2=5, exp3=3, exp5=2, exp7=0, exp11=0.

After the generate_re f prd procedure has used the above exponent upperbounds to compute the sorted list of reference periods in re f prd, the adjustperiod function will use the sorted list of reference periods to compute the following adjusted period:

$$prd_{newp3}=\text{adjustperiod}(prd_{newp3})=\text{adjustperiod}(101)\\=100;$$

$$d_{newp3}=d_{a3}-prd_{newp3}+1=114-100+1=15.$$

The permitted range of $newp_3$'s offset is $0 \leq o_{newp3} \leq 0+prd_{newp3}-1=0+100-1=99$. In Examples 1–7, it will be assumed that all the periodic process periods are adjusted using the adjustperiod function with exactly the same parameters as was used for adjusting $newp_3$'s period.

□

The criterion for determining whether an A-h-k process should be converted into a periodic process or remain asynchronous, is based whether the ratio of the processor capacity that needs to be reserved for the new periodic process, to the processor capacity that needs to be reserved for the asynchronous process if unconverted, exceeds a specified threshold.

For each A-h-k-p process $a_j$ that is converted into a new periodic process $newp_j$, the reserved processor capacity (RPC) in the pre-run-time schedule can be calculated with the following relation:

$$RPC_{newp_j} = \frac{c_{newp'_j}}{prd_{newp_j}}$$

For each A-h-k-a process $a_j$ that remains asynchronous, the reserved processor capacity (RPC) in the pre-run-time schedule can be calculated with the following formula:

$$RPC_{aj} = \left( \sum_{p_i \in (S_P \cup S_P) / \backslash L_{a_j} \leq L_{p_i}} \frac{\left\lceil \frac{d_{pi}-r_{pi}}{min a_j} \right\rceil c_{a_j}}{prd_{p_i}} \right) + \frac{c_{a_j}}{min_{a_j}}$$

In general if an asynchronous process has a long minimum time between consecutive requests, then that asynchronous process is more likely to require less processor capacity to be reserved if it is treated as an A-h-k-a process compared with treating it as an A-h-k-p process.

A procedure for converting a set of asynchronous processes $\{(c_{ai}, d_{ai}, min_{ai})|i=0, 1, \ldots, n\} \subset S_A$ into a set of periodic processes $S_p=\{(o_{pi}, r_{pi}, c_{pi}, d_{pi}, prd_{pi})|i=0, 1, \ldots, n\}$ follows:

$S_P$:=original_set_of_P-h-k_processes;

$S_A$:=original_set_of_A-h-k_processes;

$S_a$:=$S_A$;

$S_p$:=;

numofchanges:=0;

changes:=true;

while (changes) and (numofchanges<someupperlimit) do
begin
  changes:=false;
  begin
    for each $a_j \in S_A$, in the order of increasing deadlines do
    begin
      {The procedure described earlier should be used to tentatively convert each A-h-k asynchronous process $a_j \in S_A$ into a new periodic process $newp_j \in S_p$ with the same index. Note that this conversion depends not only on $a_j$, but also on the entire set of new periodic processes in $S_p$, the original set of P-h-k processes in $S_P$, and the set of A-h-k-a processes in $S_a$}
      $newp_j$:=Tentatively convert_into_new_periodic_process($a_j$, $S_p$, $S_P$, $S_a$) if ($d_{newpj} \leq d_{aj}$) and ($prd_{newpj} \geq d_{newpj}$) then begin
  $c_{newp_j}' = c_{newp_j}$ + adjusted_capacity($newp_j$);
  $RPC_{newp_j}' := c_{newp_j}'/prd_{newp_j}$;

$$RPC_{aj} := \left( \Sigma_{p_i \in (S_p \cup S_P) \wedge L_{a_j} \leq L_{p_i}} \left\lceil \frac{\left\lceil \frac{d_{P_i} - r_{P_i}}{min_{a_j}} \right\rceil c_{a_j}}{prd_{P_i}} \right\rceil \right) + \frac{c_{a_j}}{min_{a_j}};$$

if threshold($a_j$) *$RPC_{newp_j} \leq RPC_{a_j}$
  then
  begin
    if {$newp_j$} $\in S_p$
    {or if the version of $newp_j$ in $S_p$ is different from the newly converted version of $newp_j$}
    then
    begin
      changes:=true;
      $S_p$:=$S_p \cup \{newp_j\}$;
      {add new periodic process $newp_j$ converted from $a_j$ to the periodic set $S_p$, replacing any older version of $newp_j$ in $S_p$}
    end;
    if {$a_j$} $\in S_a$ then
      $S_a$:=$S_a - \{a_j\}$;
      {remove $a_j$ from asynchronous set $S_a$}
    end
  else {threshold($a_j$) *$RPC_{newp_j} > RPC_{a_j}$}
  begin
    if {$a_j$} $\in S_a$ then
    begin
      changes:=true;
      $S_a$:=$S_a \cup \{a_j\}$;
      {add $a_j$ to asynchronous set $S_a$}
    end;
    if {$newp_j$} $\in S_p$ then
      $S_p$:=$S_p - \{newp_j\}$;
      {remove $p_j$ from periodic set $S_p$}
  end;
  end;
end;
for each $a_j \in S_A$, in the order of decreasing deadlines do
begin
  (repeat the same procedure that was done in the order of increasing deadlines for each $a_j \in S_A$ above)

end;
  if changes then
    numofchanges:=numofchanges + 1;
  end;
end;

At the end of the procedure, the final set of A-h-k-a processes is $S_a$ and the final set of new periodic processes converted from A-h-k-p processes is $S_p$ Above, the permitted range of the offset for each new periodic process $newp_i$, $o_{newpi}$ is [0,$newp_i$].

The user can decrease or increase the "threshold($a_j$)" value for each A-h-k process $a_j$ in the procedure above, to increase or decrease the likelihood that $a_j$ will be converted into a P-h-k process, depending on the application requirements. Setting the threshold value of a certain asynchronous process to a high value so that it is unlikely to be converted into a new periodic process, may in some cases increase the schedulability of that process; in other cases converting an asynchronous process into a new periodic process may increase schedulability; but increasing schedulability may not be the only objective in a particular application. In some cases, one may prefer that a certain A-h-k process be converted into a new periodic process whenever possible, to reduce scheduling overhead and/or simplify the timing analysis and make it easier to predict the system's behavior.

EXAMPLE 3

Assuming that the threshold value for each A-h-k process is set as follows: threshold($a_0$)=10, threshold($a_1$)=10, threshold($a_2$)=1, threshold($a_3$)=2.5, threshold($a_9$)=1, the procedure above will calculate the following for each of the processes in Examples 1–2.

$a_0$:

$d_{newp0}=2$; $prd_{newp0} \leq \min(d_{a0}-d_{newp0}+1, \min_{a0})=2-2+1=1 < c_{newp0}=2$ $a_0$ will NOT be converted into a new periodic process and will remain asynchronous and belong to the set A-h-k-a.

$a_1$:

$d_{newp1}=c_{a1}+\lceil d_{newp1}/\min_{a0} \rceil c_{a0}=2+\lceil 4/1000 \rceil 2=4$ $prd_{newp1}=\min(d_{a1}-d_{newp1}+1, \min_{a1})=7-4+1=4$ $RPC_{newp1}=c_{newp1}'/prd_{newp1}=4/4=1$ $RPC_{a1}=\lceil (d_{newp3}-r_{newp3})/\min_{a1} \rceil c_{a1}/prd_{newp3}+\lceil (d_{p4}-r_{p4})/\min_{a1} \rceil c_{a1}/prd_{p4}$ $+\lceil (d_{p5i}-r_{p5})/\min_{a1} \rceil c_{a1}/prd_{p5}+\lceil (d_{p6}-r_{p6})/\min_{a1} \rceil c_{a1}/prd_{p6}+\lceil (d_{p7}-r_{p7})/\min_{a1} \rceil c_{a1}/prd_{p7}$ $+c_{a1}/\min_{a1}=2/100+2/200+2/200+2/200+2/1000=0.062<$threshold($a_1$)*$RPC_{newp1}=10*1=10$ $a_1$ will NOT be converted into a periodic process, and will remain asynchronous and belong to the set A-h-k-a.

$a_3$:

$d_{newp3}=c_{a3}+\lceil d_{newp3}/\min_{a0} \rceil c_{a0}+\lceil d_{newp3}/\min_{a1} \rceil c_{a1}=10+\lceil 30/1000 \rceil 2+\lceil 30/1000 \rceil 2=14$ $prd_{newp3}=\min(d_{a3}-d_{newp3}+1, \min_{a3})=114-14+1=101$ After the adjustperiod function is applied (see Example 2):

$prd_{newp3}$=adjust period(101)=100;

$d_{newp3}=d_{a3}-prd_{newp3}+1=114-100+1=15;$ $RPC_{newp3}=c_{newp3}'/prd_{newp3}=14/100=0.14;$ $RPC_{a3}=\lceil(d_{p4}-r_{p4})/min_{a3}\rceil c_{a3}/prd_{p4}+\lceil(d_{p6}-r_{p6})/min_{a3}\rceil c_{a3}/prd_{p6}$ $+\lceil(d_{p1}-r_{p7})/min_{a3}\rceil c_{a3}/prd_{p7}+c_{a3}/min_{a3}=20/200+20/200+20/200+10/113=0.388 \geq threshold(a_3)*RPC_{newp3}=2.5*0.14=0.35$ $a_3$ will be converted into a new periodic process newp$_3$= ($r_{newp3}$, $c_{newp3}$, $d_{newp3}$, $prd_{newp3}$)=(0, 10, 14, 100).

$a_2$:

$d_{newp2}=c_{a2}+\lceil d_{newp2}/min_{a0}\rceil c_{a0}+\lceil d_{newp2}/min_{a1}\rceil c_{a1}+\lceil d_{newp2}/prd_{newp3}\rceil c_{newp3}$ $+\lceil d_{newp2}/prd_{p5}\rceil c_{p5}=10+\lceil 40/1\,000\rceil 2+\lceil 40/1000\rceil 2+\lceil 40/100\rceil 10+\lceil 40/200\rceil 16=40 prd_{newp2}=min(d_{a2}-d_{newp2}+1,min_{a2})=239-40+1=200$ $RPC_{newp2}=c_{newp2}'/prd_{newp2}=14/200=0.07$ $RPC_{a2}=c_{a2}/min_{a2}=10/1000=0.01 < threshold(a_2)*RPC_{newp2}=1*0.07=0.07$ $a_2$ will NOT be converted into a periodic process, and will remain asynchronous and belong to the set A-h-k-a.

$a_9$:

$d_{newp9}=c_{a9}+\lceil d_{newp9}/min_{a0}\rceil c_{a0}+\lceil d_{newp9}/min_{a1}\rceil c_{a1}+\lceil d_{newp9}/min_{a2}\rceil c_{a2}$ $+\lceil d_{newp9}/prd_{newp3}\rceil c_{newp3}+\lceil d_{newp9}/prd_{p5}, c_{p5}=10+\lceil 50/1000\rceil 2+\lceil 50/1000\rceil 2+\lceil 50/1000\rceil 10+\lceil 50/100\rceil 10+\lceil 50/200\rceil 16=50$ $prd_{newp9}=min(d_{a9}-d_{newp9}+1,min_{a9})=259-50+1=200$ $RPC_{newp9}=c_{newp9}'/prd_{newp9}=24/200=0.12$ $RPC_{a9}=c_{a9}/min_{a9}=10/1000=0.01<threshold(a_9)*RPC_{newp2}=1*0.12=0.$ $a_9$ will NOT be converted into a periodic process, and will remain asynchronous and belong to the set A-h-k-a.

Except for $prd_{newp3}$, that was adjusted from 101 to 100, all other periods in this example remain unchanged by the adjustperiod function.

An alternative case where threshold($a_3$) is set to an arbitrary large value, ensuring that A-h-k process $a_3$ is not converted into a periodic process, is discussed below with respect to Example 13.

☐

There exists a circular dependency relationship between the calculation of the RPC for each A-h-k-a process and the determination of the set of A-h-k-a processes. The calculation of the RPC for each A-h-k-a process depends on the original set of P-h-k processes $S_P$, the set of new periodic processes $S_p$ converted from A-h-k-p periodic processes, and the set of processes that remain asynchronous $S_a$.

However determining which A-h-k process should be converted into a new periodic process in turn depends on the calculation of the RPC amount for the corresponding A-h-k-a process. It is for this reason that an iterative procedure is used for this task.

Below, all periodic processes with hard-deadlines and known characteristics (including all new periodic processes in $S_p$ that were converted from A-h-k-p processes, and the original set of P-h-k processes in $S_P$), will be referred to as P-h-k processes.

Step 2: Construct a Feasible Pre-Run-Time Schedule for the P-h-k Processes

In this step, the schedulabiliy of the set of all periodic processes with hard deadlines and known characteristics (P-h-k processes) are determined using their adjusted computation times, and a feasible pre-run-time schedule that satisfies all the specified constraints is constructed.

In some cases, when the lengths of periods are relatively prime, the length of the LCM of the periods could become inconveniently long. One may use a function "adjust-period" to adjust the period length of each periodic process, whenever the LCM becomes inconveniently long.

Preferred function and procedures for adjusting the periods of periodic processes in order to reduce the Least Common Multiple (LCM) of the period lengths, and the pre-run-time schedule length are as follows:

```
function adjustperiod(prd);
begin
    j:=1;
    while ref prd[j] ≦ prd do
        j:=j + 1;
    adjustperiod:=refprd[j−1];
end;
procedure generatere_refprds(exp2, exp3, exp5, exp7, exp11);
begin
    count:=1;
    for i:=0 to exp2 do
    begin
        for j:=0 to exp3 do
        begin
            for k:=0 to exp5 do
            begin
                for l:=0 to exp7 do
                begin
                    for f:=0 to exp11 do
                    begin
                        refprd[count]:=2^i*3^j*5^k*7^l*11^f;
                        count:=count + 1;
                    end;
                end;
            end;
        end;
    end;
    for i:=1 to count − 2 do
    begin
        for j:=i + 1 to count − 1 do
        begin
            if refprd[i] > refprd[j]
            then
            begin
                temp:=refprd[i];
                refprd[i]:=refprd[j];
                refprd[j]:=temp;
            end;
        end;
    end;
end;
procedure select_exp_upperbounds(prd_max, exp2_init, exp3_init, exp3_init,
        exp5_init, exp7_init, exp11_init, C_m, C_m11, C_m7, C_m5,
        C_m3, C_m2, C_d, C_d7, C_d5, C_d3, C_d2,
        C_e7, C_e5, C_e3, C_e2, C_e57, C_e35, C_e23);
begin
    exp2:=exp2_init;
    exp3:=exp3_init;
    exp5:=exp5_init;
    exp7:=exp7_init;
    exp11:=exp11_init;
    n:=2^exp2 * 3^exp3 * 5^exp5 * 7^exp7 * 11^exp11;
```

-continued

```
stop:=false;
if (C_m * prd_max > n) then
begin
    while((C_m * prd_max) > n) and (not(stop))) do
    begin
        if (C_m11 * prd_max ≧ 11 * n)
            then
            begin
                n:=n * 11;
                exp11:=exp11 + 1;
            end
        else if ((C_m7 * prd_max) ≧ (7 * n))
            then
            begin
                n:=n * 7;
                exp7:=exp7 + 1;
            end
        else if ((C_m5 * prd_max) ≧ (5 * n))
            then
            begin
                n:=n * 5;
                exp5:=exp5 + 1;
            end
        else if ((C_m3 * prd_max) ≧ (3 * n))
            then
            begin
                n:=n * 3;
                exp3:=exp3 + 1;
            end
        else if ((C_m2 * prd_max) ≧ (2 * n))
            then
            begin
                n:=n *2;
                exp2:=exp2 + 1;
            end
        else
        begin
            stop:=true;
        end;
    end;
end
else
begin {C_m * prd_max ≦ n}
    while(((C_d * prd_max) < n) and (not(stop))) do
    begin
        if ((((C_d7 * prd_max) ≦ (n div 7)) and (exp_7 > C_e7) and
            ((exp5 − exp7) ≦ C_e57))
            then
            begin
                n:=n div 7;
                exp7:=exp7 − 1;
            end
        else if ((((C_d5 * prd_max) ≦ (n div 5)) and (exp5 > C_e5) and
            ((exp3 − exp5) ≦ C_e35))
            then
            begin
                n:=n div 5;
                exp5:=exp5 − 1;
            end
        else if ((((C_d3 * prd_max) ≦ (n div 3)) and (exp3 > C_e3) and
            ((exp2 − exp3) ≦ C_e23))
            then
            begin
                n:=n div 3;
                exp3:=exp3 − 1;
            end
        else if ((((C_d2 * prd_max) ≦ (n div 2)) and (exp2 > C_e2))
            then
            begin
                n:=n div 2;
                exp2:=exp2 − 1;
            end
        else
        begin
            stop:=true;
        end;
    end;
end;
```

The function adjustperiod uses a sorted list of reference periods "re f prd" to adjust the length of the period of each periodic process. It adjusts the length of the period of each periodic process "prd" to the largest reference period re f prd[x] that is smaller or equal to prd.

The procedure generate_prd creates a sorted list of reference periods "re f prd", in which each reference period re f prd[x] is equal to $2^i * 3^j * 5^k * 7^l * 11^f, \ldots$, for some integers $i, j, k, l, f, \ldots$ where $0 \leq i \leq exp2$, $0 \leq j \leq exp3$, $0 \leq k \leq exp5$, $0 \leq l \leq exp7$, $0 \leq f \leq exp11, \ldots$. $exp2, exp3, exp5, exp7, exp11, \ldots$, are the upperbounds on the exponents $i, j, k, l, f, \ldots$, that are applied to the prime numbers 2, 3, 5, 7, 11, ...

In order to avoid redundancy, we will illustrate and discuss the methods using only the first five prime numbers 2, 3, 5, 7, 11. It is possible to use more prime numbers, that is, 13, 17, 19, etc., if larger period lengths are needed. One should be able to extend the methods shown here to include any additional prime numbers should the need arise.

The procedure select_exp_upperbounds selects the exponent upperbound values exp2, exp3, exp5, exp7, exp11, based on the maximum length of the original periods $prd_{max}$, and a set of initial values $exp2_{init}$, $exp3_{init}$, $exp5_{init}$, $exp7_{init}$, $exp11_{init}$, for exp2, exp3, exp5, exp7, exp11, respectively. The Least Common Multiple (LCM) of the periods will be bounded by $2^{exp2} * 3^{exp3} * 5^{exp5} * 7^{exp7} * 11^{exp11}$.

There is a tradeoff in adjusting periods: shorter adjusted periods result in shorter LCMs of the periods, and consequently, shorter pre-run-time schedule lengths and fewer instances of new processes; but will increase the processor utilization and waste more processor capacity. This tradeoff can be fine tuned using the exponent upperbound values exp2, exp3, exp5, exp7, exp11.

In general, larger values of the exponent upperbounds will increase the chances of the adjusted period length being close to the original schedule length, and reduce wasted processor capacity but will increase the LCM of the periods and schedule length. When the exponent upperbound associated with a larger prime number, say exp11, is increased relative to the exponent upperbounds associated with smaller prime numbers, say exp7, exp5, exp3, exp2, while the exponent upperbounds associated with the smaller prime numbers are not smaller than some minimum value, e.g., min{exp7}=1, min{exp5}=2, min{exp3}=3, min{exp2}=5, respectively, it will also have the effect of reducing wasted processor capacity but increasing the LCM and schedule length.

The procedure select_exp_upperbounds, allows exp2, exp3, exp5, exp7, exp11, to be fine tuned according to specific application requirements. In this procedure, larger values of the parameters $C_m$, $C_{m11}$, $C_{m7}$, $C_{m5}$, $C_{m3}$, $C_{m2}$, $C_d$, $C_{d7}$, $C_{d5}$, $C_{d3}$, $C_{d2}$; and smaller values for the parameters $C_{e7}$, $C_{e5}$, $C_{e3}$, $C_{e2}$, $C_{e57}$, $C_{e35}$, $C_{e23}$, are more likely to result in greater values for exp11, exp7, exp5, exp3, exp2, and are more likely to result in adjusted period lengths that are closer to the original period lengths and that have less wasted processor capacity, but are also more likely to result in longer LCMs of the periods, longer schedule lengths, and a greater number of instances of new processes.

Assuming that the value of the exponent upperbounds associated with smaller prime numbers are kept greater than certain minimum values, increasing the value of the parameters $C_{mx}$ or $C_{dx}$ associated with a larger prime number x, say 11, as opposed to increasing the value of the parameters $C_{my}$ or $C_{dy}$ associated with a smaller prime number y, say 2, is more likely to have a greater effect in reducing wasted processor capacity, but is also more likely to have a greater effect in increasing the LCM of the periods and the schedule length.

If the value zero is assigned to all the parameters $C_{mx}$ or $C_{dx}$ associated with all the prime numbers x except one of the prime numbers $x_1$, then the periods will all be set to some exponential value of base $x_1$, and will result in very short LCMs of the periods but very significant amounts of wasted processor capacity, unless the original period lengths coincide with those exponential values. The parameters $C_{e7}$, $C_{e5}$, $C_{e3}$, $C_{e2}$, can be used to ensure that the periods are set to multiples of $7^{C_{e7}} * 5^{C_{e5}} * 3^{C_{e3}} * 2^{C_{e2}}$ whenever $0 \leq C_{e7} \leq \exp7_{init}$, $0 \leq C_{e5} \leq \exp5_{init}$, $0 \leq C_{e3} \leq \exp3_{init}$, $0 \leq C_{e2} \leq \exp2_{init}$, if required by the application. For example, setting $C_{e7}=0$, $C_{e5}=2$, $C_{e3}=0$, $C_{e2}=2$ will ensure that the periods are set to multiples of 100.

The objective of fine tuning the values of exp2, exp3, exp5, exp7, exp11, is to create a list of reference periods re f prd[x], that will have values that are sufficiently close to the original period lengths, to satisfy the processor utilization level required by the application, and maximize the chances of finding a feasible schedule, while at the same time the values should be as closely harmonically related to each other (having a smaller LCM value) as possible, in order to reduce the schedule length and the number of instances of new processes, and reduce storage requirements and system overhead.

For example, if the following conditions are satisfied, the difference between the original period length and the adjusted period length will never exceed 10% of the original period length:

(1) the exponent upperbounds are not smaller than the following minimum values: min{exp7}=1, min{exp5}=2, min{exp3}=3, min{exp2}=5;

(2) the maximum period length is not greater than $2^{(exp2-3)} * 3^{(exp3-1)} * 5^{exp5} * 7^{exp7} * 11^{exp11}$ (the maximum period length is not greater than the maximum LCM length divided by 24).

If the exponent upperbound exp11 is not smaller than the minimum value min{exp11}=1, then the maximum period length can be further increased, while still guaranteeing the same utilization level. For example, under the following conditions, the difference between the original period length and the adjusted period length will never exceed 10% of the original period length:

(1) the exponent upperbounds are not smaller than the following minimum values: min{exp11}=1, min{exp7}=1, min{exp5}=2, min{exp3}=3, min{exp2}=5;

(2) the maximum period length is not greater than $2^{(exp2-3)} * 3^{(exp3-1)} * 5^{exp5} * 7^{exp7} * 11^{exp11}$ (the maximum period length is not greater than the maximum LCM length divided by 18).

The described system and methods, have the useful property that, they tend to produce adjusted period lengths that are very close to the original period lengths for processes with shorter original periods, that is, those processes that are likely to constitute the largest proportion of the computation work load; while producing adjusted period lengths that are not so close to the original periods for processes whose original period lengths are large and close to the LCM of the periods, which in many applications represent the smallest work loads. In special cases where processes with periods close to the maximum period represent a significant proportion of the computation work load, one can use larger values for the parameters $C_m$, $C_{m11}$, $C_{m7}$, $C_{m5}$, $C_{m3}$, $C_{m2}$, to produce adjusted period lengths that are closer to the original schedule lengths for processes with large original period lengths.

EXAMPLE A

Assume that it is required to schedule processes corresponding to the following tasks:

(1) CD-Audio tasks, that need to be serviced at a rate of 2.75 KHz, that is, $prd_{CD\text{-}Audio}=364$ us;

(2) ISDN Channnel tasks that need to be serviced at a rate of 1.5 KHz, that is, $prd_{ISDN}=667$ us;

(3) Voice Channnel tasks that need to be serviced at a rate of 1.375 KHz, that is, $prd_{Voice}=727$ us;

(4) Keyboard/Mouse tasks that need to be serviced periodically with periods of length $prd_{Keyboard/Mouse}=100$ ms=100,000 us.

Assume that the following initial exponent upperbound values are used: $exp2_{init}=5$, $exp3_{init}=3$, $exp5_{init}=2$, $exp7_{init}=1$, $exp11_{init}=0$, and use the value 24 for the parameters $C_m$, $C_{m11}$, $C_{m7}$, $C_{m5}$, $C_{m3}$, $C_{m2}$, and $C_d$, $C_{d7}$, $C_{d5}$, $C_{d3}$, $C_{d2}$, the value 0 for $C_{e7}$, $C_{e5}$, $C_{e3}$, $C_{e2}$, and the values 0, 1, 2, for $C_{e57}$, $C_{e35}$, $C_{e23}$, respectively.

The select_exp_upperbounds procedure will produce the following values for the exponent upperbounds:

exp2=5, exp3=3, exp5=2, exp7=1, exp11=1.

After the generate_refprd procedure has used the above exponent upperbounds to compute the sorted list of reference periods in re f prd, the adjustperiod function will use the sorted list of reference periods to compute the following adjusted periods:

$prd_{CD\text{-}Audio}=360$ (original 364), $prd_{ISDN}=660$ (original 667), $prd_{Voice}=720$ (original 727), $prd_{Keyboard/Mouse}=92400$ (original 100000).

The LCM of the periods will be 277200, which is 3 times the length of the maximum adjusted process period length.

Assume now that such a high precision is not required when adjusting the periods of the processes with maximum process length, then a smaller value, say 1, may be used for the parameters $C_m$, $C_{m11}$, $C_{m7}$, $C_{m5}$, $C_{m3}$, $C_{m2}$, and $C_d$, $C_{d7}$, $C_{d5}$, $C_{d3}$, $C_{d2}$, and still use the value 0 for $C_{e7}$, $C_{e5}$, $C_{e3}$, $C_{e2}$, the values 0, 1, 2, for $C_{e57}$, $C_{e35}$, $C_{e23}$, respectively.

Assume that the same initial exponent upperbound values are used: $exp2_{init}=5$, $exp3_{init}=3$, $exp5_{init}=2$, $exp7_{init}=1$, $exp11_{init}=0$.

The select_exp_upperbounds procedure will produce the following values for the exponent upperbounds:

exp2=5, exp3=3, exp5=2, exp7=1, exp11=0.

After the generate_refprd procedure has used the above exponent upperbounds to compute the sorted list of reference periods in re f prd, the adjustperiod function will use the sorted list of reference periods to compute the following adjusted periods:

$prd_{CD\text{-}Audio}=360$ (original 364), $prd_{ISDN}=630$ (original 667), $prd_{Voice}=720$ (original 727), $prd_{Keyboard/Mouse}=75600$ (original 100000).

The LCM of the periods will be 75600, which is 1 times the length of the maximum adjusted process period length.

Note that in the second case, a smaller value for the parameters $C_m$, $C_{m11}$, $C_{m7}$, $C_{m5}$, $C_{m3}$, $C_{m2}$, and $C_d$, $C_{d7}$, $C_{d5}$, $C_{d3}$, $C_{d2}$, resulted in smaller values for the exponent upperbounds (exp11 was reduced from 1 to 0), and consequently, resulted in shorter adjusted periods, where the difference is greatest for the processes with the largest periods ($prd_{Keyboard/Mouse}$ was reduced from 92400 to 75600), and the LCM was also noticably reduced from 3 times the maximum adjusted period length to 1 times the maximum adjusted period length. □

The following description includes a procedure for constructing a feasible pre-run-time schedule for a given set of periodic processes with offsets.

Procedure for constructing a feasible pre-run-time schedule for a given set of periodic processes with offsets $S_p = \{(o_{pi}, r_{pi}, c_{pi}, d_{pi}, prd_{pi}) | i=0,1,\ldots,n\}$:

begin {procedure} success:=false;

for all $p_i$ let $prd_{pi}$:=adjustperiod($prd_{pi}$);

$prd_{LCM}$:=LCM($prd_p0, prd_p1, \ldots, prd_{pn}$);

begin {for loops} for $o_{p0}$:=offsetlowerbound($p_0$) to offsetupperbound($p_0$) do
  for $o_{p1}$:=offsetlowerbound($p_1$) to offsetupperbound($p_1$) do
. . .
    for $o_{pi}$:=offsetlowerbound($p_i$) to offsetupperbound($p_i$) do
. . .
      for $o_{pn}$:=offsetlowerbound($p_n$) to offsetupperbound($p_n$) do begin {loop body}
Construct a schedule for all occurrences of all the processes in $S_p$ within the interval [0, max$\{o_{pi}|\forall pi\}][+3* prd_{LCM}]$;
If the following conditions are satisfied, then set success:=true; and exit from the procedure:
There must exist a point t in the schedule, such that:
(1) The subschedule in the interval [t, t+$prd_{LCM}$] is equal to the subschedule in the interval [t+$prd_{LCM}$, t+2* $prd_{LCM}$];
(2) All the occurrences of all processes in $S_p$ within the interval [t, t+$prd_{LCM}$] must be included in the subschedule in [t, t+$prd_{LCM}$];
(3) All the occurrences of all processes in $S_p$ within the interval [0, t+$prd_{LCM}$] must satisfy all their respective timing constraints.
end; {loop body} end; {for loops} if success is true then set the "initial part of the pre-run-time schedule" $S_0(t)$ to be the subschedule in the interval [0, t], and set the repeating part of the pre-run-time schedule" $S_{LCM}(prd_{LCM})$ to be the subschedule in the interval [t, t+$prd_{LCM}$]; end. {procedure}

The optimal scheduling method in the aforenoted 1990 article by Xu and Parnas that constructs a feasible schedule for a set of processes with release times, deadlines, precedence and exclusion relations, can be used for this purpose. If the processes are to be scheduled on more than one processor, the optimal scheduling method as described in the [aforenoted] 1993 article by J. Xu [and Parnas] "*Multiprocessor Scheduling of Processes with Release times, Deadline, Precedence and Exclusion Relations,*" *IEEE Transactions on Software Engineering*, vol. 19, pp. 139–154, February, 1993, that constructs a non-preemptive feasible schedule for a set of processes with release times, deadlines, precedence and exclusion relations on multiple processors, can be used for this purpose. Note that, it is not strictly necessary to use the scheduling method of the 1990 or the 1993 article. One may use any method for this step, the only requirements being that the method should be capable of constructing a feasible schedule for a set of periodic processes, in which all the specified constraints and dependencies between the processes are satisfied.

EXAMPLE 4

Assume that the following precedence relations and exclusion relations must be satisfied for the processes in Examples 1–3 above:

$p_6$ precedes $p_7$; $a_2$ excludes $a_3$, $a_9$; $a_3$ excludes $a_2$, $p_4$, $p_6$; $a_9$ excludes $a_2$; $p_4$ excludes $a_3$, $p_5$, $p_6$; $p_5$, $p_6$ excludes $p_4$; $p_5$ excludes $p_6$; $p_6$ excludes $a_3$, $p_5$.

If the method in the aforenoted 1990 Xu and Parnas article is used to schedule all the P-h-k processes $newp_3$, $p_4$, $p_5$, $p_6$, $p_7$ using their adjusted computation times, the feasible schedule will be found in FIG. 1. This guarantees that all the P-h-k processes are schedulable.

□

In Example 4 above, a feasible schedule for the case where the offsets of all the periodic processes are zero was shown. Below is another example to show how the procedure given above can use existing methods to schedule a set of periodic processes together with a set of new periodic processes that were converted from asynchronous processes, where the original periodic processes and the new periodic processes may have non-zero offsets.

EXAMPLE B

Assume the following A-h-k process $a_A$ (see FIG. 10):

$a_A$: $c_{aA}$=2; $d_{aA}$=7; $min_{aA}$=8.

Assume also the following two periodic processes $p_B$ and $p_C$ (see FIG. 11 and FIG. 12):

$p_B$: $o_{pB}$=0; $r_{pB}$=1; $c_{pB}$=3; $d_{pb}$=4; $prd_{pB}$=12.

$p_C$: $o_{pC}$=7; $r_{pC}$=0; $c_{pB}$=4; $d_{pb}$=4; $prd_{pB}$=12.

Assume that the application requires $p_B$, $p_C$ to have fixed offset values of 0 and 7 respectively.

Assuming that asynchronous process $a_A$ may make its first request at time 0, the procedure for converting a set of asynchronous processes into a set of periodic processes given earlier, could convert $a_A$ into the following new periodic process:

$newp_A$: $r_{newpA}$=0; $c_{newpA}$=2; $d_{newpA}$=2; $prd_{newpA}$=6; and $0 \leq o_{newpA} \leq prd_{newpA}-1=5$. The lowerbound of the offset of $newp_A$ is 0, and the upperbound of the offset of $newp_A$ is 5 (see FIG. 10 and FIG. 13).

The procedure for constructing a feasible pre-run-time schedule for a given set of periodic processes with offsets given above will try each offset value of $o_{newpA}$ within the permitted range of $[0, prd_{newpA}-1]=[0,5]$, when trying to find a feasible schedule for $newp_A$, $p_B$, and $p_C$. When the last value in that permitted range, $o_{newpA}$=5 is used, the method in the 1990 article by Xu and Parnas would find the feasible schedule illustrated in FIG. 14. A feasible schedule is found for $newp_A$, $p_B$ and $p_C$, when $o_{newpA}$=5 and $o_{pD}$=2. It is assumed that the application requires that $o_{pC}$=7, $o_{pB}$=0 and since asynchronous process $a_A$ may make its first request at time 0, the permitted range of offset is $0 \leq o_{newpA} \leq prd_{newpA}-1$=5. The feasible schedule consists of a non-repeating initial schedule $S_0(1)$ for the interval [0,1], and a repeating schedule $S_{LCM}(12)$ that is of length equal to the Least Common Multiple of the periods of newp$_A$, p$_B$, p$_C$, and p$_D$, which is LCM(6, 12, 12, 12)=12.

Figure 15:
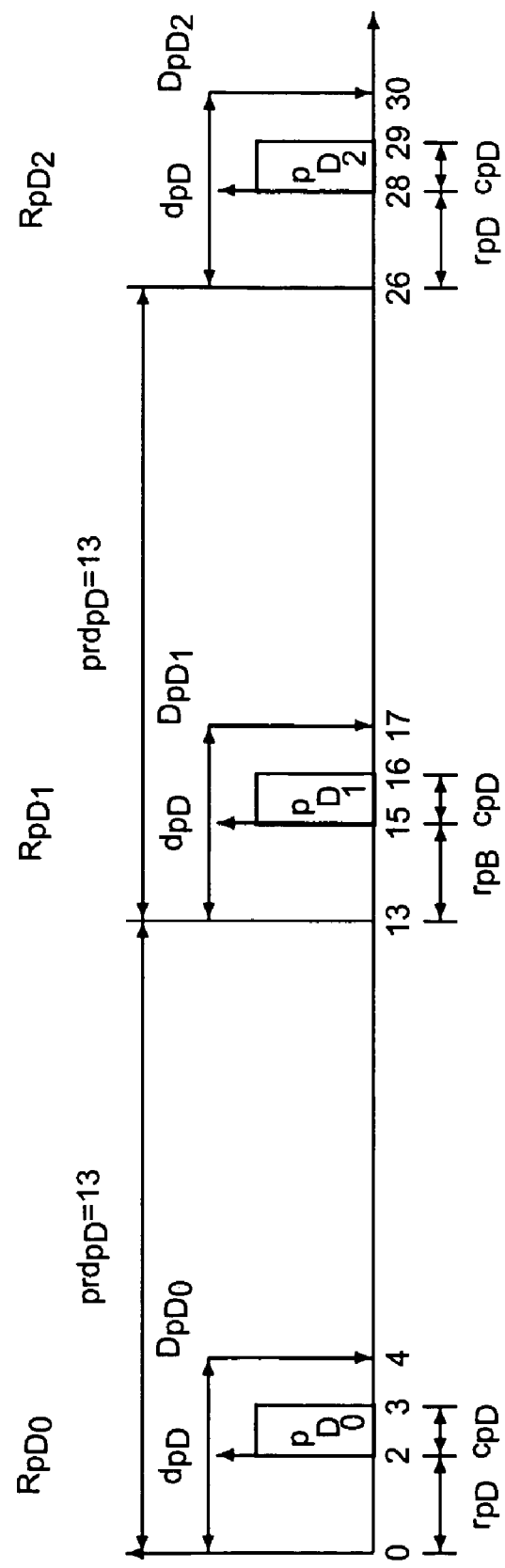

Assume that in addition to the periodic processes newp$_A$, p$_B$, p$_C$, the following periodic process p$_D$ exists (as shown in FIG. 15):

$$p_D: r_{pD}=2, c_{pD}=1, d_{pD}=4, prd_{pD}=13, 0 \leq o_{pD} \leq 4.$$

If the "adjustperiod" function is applied to the periods of newp$_A$, p$_B$, p$_C$, and p$_D$, then p$_D$'s period prd$_{pd}$ will be shortened from length 13 to length 12, resulting in the modified periodic process p$_D$=(o$_{pD}$, r$_{pD}$, c$_{pD}$, d$_{pD}$, prdpD where r$_{pD}$=2, c$_{pD}$=1, d$_{pD}$=4, prd$_{pD}$=12, $0 \leq o_{pD} \leq 4$, as shown in FIG. 16.

The other periods prd$_{newpA}$, prd$_{pB}$, and prd$_{pC}$ remain unchanged after the adjust-period procedure is applied.

Assuming that the application allows the offset of p$_D$ to be in the permitted range of [0,4], the procedure for constructing a feasible pre-run-time schedule for a given set of periodic processes with offsets given above will try each offset value of o$_{newpA}$ within the permitted range of [0, prd$_{newpA}$−1]=[0,5], and try each offset value of o$_{pD}$ within the specified permitted range of [0, 4], when trying to find a feasible schedule for newp$_A$, p$_B$, p$_C$, and p$_D$. When the offset values o$_{newpA}$=5, and o$_{pD}$=2 as shown in FIG. 17 are used, the method descibed in the 1990 Xu and Parnas article would find the feasible schedule illustrated in FIG. 18.

As shown in FIG. 17, the periodic process p$_D$=(o$_{pD}$, r$_{pD}$, c$_{pD}$, d$_{pD}$, prd$_{pD}$ where r$_{pD}$=2, c$_{pD}$=1, d$_{pD}$=4, prd$_{pD}$=12, $0 \leq o_{pD} \leq 4$, where the offset of p$_D$ is set to a fixed value o$_{pD}$=2 by the procedure for constructing a feasible pre-run-time schedule for a given set of periodic processes with offsets when it attempts to construct a feasible pre-run-time schedule for newp$_A$, p$_B$, p$_C$, p$_D$.

As shown in FIG. 18, a feasible schedule is found for newp$_A$, p$_B$, p$_C$, and p$_D$, when o$_{newpA}$=5, and o$_{pD}$=2. It is assumed that the application requires that o$_{pC}$=7, o$_{pB}$=0, and $0 \leq o_{pD} \leq 4$, and asynchronous process a$_A$ may make its first request at time 0. The feasible schedule consists of a non-repeating initial schedule $S_0(1)$ for the interval [0,1], and a repeating schedule $S_{LCM}(12)$ that is of length equal to the Least Common Multiple of the periods of newp$_A$, p$_B$, p$_C$, and p$_D$, which is LCM(6, 12, 12, 12)=12.

The feasible schedule consists of a non-repeating initial schedule $S_0(1)$ for the interval [0,1], and a repeating schedule $S_{LCM}(12)$ that is of length equal to the Least Common Multiple of the periods of newp$_A$, p$_B$, p$_C$, and p$_D$, which is LCM(6, 12, 12, 12)=12.

☐

The following notation is used below to denote the beginning and end of the time slot of each process in a pre-run-time schedule, the actual start time and actual completion time of each process, and the most recent actual arrival time of an asynchronous process at run-time. This notation will be used extensively below.

s(p): s(p) is the time of the beginning of the time slot that was reserved for periodic process p in the pre-run-time schedule.

s'(x): s'(x) is the actual time that periodic process or asynchronous process x was/will be put into execution at run-time. At any time t, if periodic or asynchronous process x has been put into execution after or at time t, then $t \leq s'(x)$ is true, otherwise $\neg(t \leq s'(x))$ is true.

s'(p) depends on the arrival times of asynchronous processes a$_j$ and whether and at what time they preempt periodic processes. s'(p) also depends on the actual execution times of other processes that are executed prior to p's execution at run-time.

e(p): e(p) is the time of the end of the time slot that was reserved for periodic process p in the pre-run-time schedule.

e'(x): e'(x) is the actual time at which asynchronous or periodic process x's execution ends at run-time. At any time t, if periodic or asynchronous process x's execution has ended after or at time t, then $t \leq e'(x)$ is true, otherwise if x's execution has not ended before or at time t, then $\neg(t \leq e'(x))$ is true.

R'(a): R'(a) is the most recent actual arrival time of asynchronous process a at run-time. At any time t, if asynchronous process a has arrived before or at time t, then $R'(a) \leq t$ is true, otherwise $\neg(R'(a) < t)$ is true. At any time t, if asynchronous process a has arrived at least once before time t and after or at time 0, then $0 \leq R'(a)$ is true, otherwise if a has never arrived before or at time t, then $\neg(0 \leq R'(a))$ is true.

EXAMPLE 5

In FIG. 1, the time slot that is assigned to the P-h-k process p$_6$ in the feasible pre-run-time schedule begins at time 114, and ends at time 144, so s(p$_6$)=114, e(p$_5$)=144. The length of the time slot assigned to p$_6$ in the pre-run-time schedule is equal to the adjusted computation time of p$_6$, i.e., c'$_p$6, which includes the time reserved in case p$_6$ is preempted by A-h-k-a processes with less latitude in an actual execution.

FIG. 2 shows a possible actual execution of the P-h-k processes when they are scheduled at run-time together with the A-h-k-a processes a$_0$, a$_1$, a$_2$, a$_9$, (the details are explained in Example 7 below, see particlarly step 3).

Note that in FIG. 2 the relative order in which P-h-k processes are executed at run-time, is kept the same as the relative order of the time slots that are assigned to those periodic processes in the feasible pre-run-time schedule in FIG. 1. Note also that the length of the computation time indicated for each P-h-k process is its original computation time, not its adjusted computation time. For example, in FIG. 2, s'(p$_6$)=114, e'(p$_6$)=140.

☐

Step 3: Determine the Worst-Case Response Times of the A-h-k-a Processes

A-h-k-a processes are scheduled at run-time by the A-h-k-a Scheduler Subroutine (see the description later which describes scheduling A-h-k-a processes), but their worst-case response times are determined before run-time in this step. Verification that each A-h-k-a process a$_i$ is schedulable is performed by checking the condition that a$_i$'s latitude must be greater than or equal to its response time.

Two different methods of determining the response time of an A-h-k-a process will now be described. The first method uses a mathematical formula to calculate the worst-case response time. The second method uses simulation to determine the worst-case response time. The second method gives tighter response times that can guarantee the schedulability of a larger number of cases, but requires a longer computation time. The first method, while not as accurate as the second method, is faster. In practice time can be saved by applying the first method first, and only applying the second method if the worst-case response time of some A-h-k-a process calculated by the first method exceeds the latitude of that process.

"P-g" is the set of guaranteed periodic processes. In this step, P-g includes all the P-h-k processes, including those A-h-k-p processes that were translated into periodic processes. Later on, in Step 4, P-g is expanded to include all P-h-k and P-s-k processes.

The worst-case response time of an A-h-k-a process $a_i$ can be determined in accordance with the following method:

For all $a_i \epsilon$ A-h-k-a:

$$RE_{ai} = c_{ai} + \text{Delay}A(a_i, RE_{ai}) + \text{Delay}P(a_i, RE_{ai}) + B(a_i) + GT(a_i, RE_{ai})$$

where $$\text{Delay } A(a_i, RE_{a_i}) = \sum\nolimits_{a_j \in A\text{-}h\text{-}k\text{-}a \bigwedge L_{a_j} \leq L_{a_i} \bigwedge j \neq i} \left\lceil \frac{RE_{a_i}}{\min_{a_j}} \right\rceil \cdot c_{a_j}$$

and $$\text{Delay } P(a_i, RE_{a_i}) = \sum\nolimits_{p_j \in P\text{-}g \bigwedge L_{p_j} \leq L_{a_i}} \left\lceil \frac{RE_{a_i}}{prd_{p_j}} \right\rceil \cdot c_{p_j}$$

and $B(a_i) = \max\{c_{aj}, e(p_l) - s(p_l) | (a_j \epsilon A\text{-}h\text{-}k\text{-}a \wedge L_{aj} > L_{ai}$ $\wedge \exists x_k, x_k \epsilon A\text{-}h\text{-}k\text{-}a \vee x_k \epsilon P\text{-}g: a_j$ excludes $x_k$ $\wedge L_{xk} \leq L_{ai}) \vee (p_l \epsilon P\text{-}g \wedge L_{pl} \geq L_{ai}$ $\wedge \exists x_k, x_k \epsilon A\text{-}h\text{-}k\text{-}a \vee x_k \epsilon P\text{-}g: p_l$ excludes $x_k$ $\wedge L_{xk} \leq L_{ai})\}$ and $$GT(a_i, RE_{a_i}) = \sum\nolimits_{p_l \in SG1(a_i)} \left\lceil \frac{RE_{a_i}}{prd_{p_l}} \right\rceil \cdot c_{a_i} + \sum\nolimits_{p_l \in SG2(a_i)} \left\lceil \frac{RE_{a_i}}{prd_{p_l}} \right\rceil \cdot c_{a_i}$$

where $SG1(a_i) = \{p_l | p_l \epsilon P\text{-}g \wedge L_{pl} \leq L_{ai} \wedge (a_i$ excludes $p_l)\}$; and $SG2(a_i) = \{p_l | p_l \epsilon P\text{-}g \wedge L_{pl} \leq L_{ai} \wedge (\exists a_j \epsilon A\text{-}h\text{-}k\text{-}a: a_i$ excludes $a_j \wedge L_{aj} \leq L_{pl})\}$;

It should be noted that in the above method, the value of $c_{pj}$ is the original computation time of $p_j$ (it does not include the time reserved for A-h-k-a processes with less latitude).

In a first assumption, for each A-h-k-a process $a_i$, for each $RE_{ai}$ computed by the above formula, if $RE_{ai} \leq L_{ai}$, $a_i$ will always meet its deadline at run-time.

The following procedure can be used to compute the worst-case response time of each A-h-k-a process:

```
i:=0;
failure:=false;
while i ≤ number-of-A-h-k-a-processes and not(failure) do
begin
    if a_i ∈ A-h-k-a
    then
    begin
        RE_new_i:=c_a_i;
        responsetimefound:=false;
        while not(responsetimefound) and not(failure) do
        begin
            RE_previous_i:=RE_new_i;
            RE_new_i:=c_a_i + DelayA(a_i,RE_previous_i) + DelayP(a_i,RE_previous_i)
                        + B(a_i) + GT(a_i,RE_previous_i);
            if RE_previous_i = RE_new_i
            then
            begin
                RE_a_i := RE_new_i;
                responsetimefound:=true;
            end
            if (RE_new_i > L_a_i)
                then failure:=true;
        end;
    end;
    i:=i + 1;
end—
```

EXAMPLE 6

If the procedure and formula described in this specification is used to calculate the worst-case response times of the A-h-k-a processes in Examples 1–5 above, the following should be computed:

$RE_{a0} = c_{a0} = 2 \leq L_{a0} = 2$ $RE_{a1} = c_{a1} + \lceil RE_{a1}/\min_{a0} \rceil c_{a0} = 2 + \lceil 7/1000 \rceil 2 = 4 \leq L_{a1} = 7$ $\text{Delay}A(a_2, RE_{a2}) = \lceil RE_{a2}/\min_{a0} \rceil c_{a0} + \lceil RE_{a2}/\min_{a1} \rceil c_{a1} = 2 + 2 = 4$ $\text{Delay}P(a_2, RE_{a2}) = \lceil RE_{a2}/prd_{newp3} \rceil c_{newp3} + \lceil RE_{a2}/prd_{p4} \rceil c_{p4} + \lceil RE_{a2}/prd_{p5} \rceil c_{p5} + \lceil RE_{a2}/prd_{p6} \rceil c_{p6} + \lceil RE_{a2}/prd_{p7} \rceil c_{p7} = 20 + 26 + 16 + 26 + 16 = 104$ $B(a_2) = c_{a9} = 10$ $GT(a_2, RE_{a2}) = \lceil RE_{a2}/prd_{newp3} \rceil c_{a2} = 20$ $RE_{a2} = c_{a2} + \text{Delay}A(a_2, RE_{a2}) + \text{Delay}P(a_2, RE_{a2}) + B(a_2) + GT(a_2, RE_{a2}) = 10 + 4 + 104 + 10 + 20 = 148 \leq L_{a2} = 239$ $\text{Delay}A(a_9, RE_{a9}) = \lceil RE_{a9}/\min_{a0} \rceil c_{a0} + \lceil RE_{a9}/\min_{a1} \rceil c_{a1} + \lceil RE_{a9}/\min_{a9} \rceil c_{a9} = 2 + 2 + 10 = 14$ $\text{Delay}P(a_9, RE_{a9}) = \lceil RE_{a9}/prd_{newp3} \rceil c_{newp3} + \lceil RE_{a9}/prd_{p4} \rceil c_{p4} + \lceil RE_{a9}/prd_{p5} \rceil c_{p5} + \lceil RE_{a9}/prd_{p6} \rceil c_{p6} + \lceil RE_{a9} \rceil prd_{p7} \lceil c_{p7} = 20 + 26 + 16 + 26 + 16 = 104$ $B(a_9) = 0$ $GT(a_9, RE_{a9}) = 0$ $RE_{a9} = c_{a9} + \text{Delay}A(a_9, RE_{a9}) + \text{Delay}P(a_9, RE_{a9}) + B(a_9) + GT(a_9, RE_{a9}) = 10 + 14 + 104 = 128 \leq L_{a2} = 259$ Since the worst-case response time of every A-h-k-a process is less than or equal to its deadline, it is thus guaranteed that they are all schedulable.

Below, the second method which uses simulation will be described to determine the worst-case response time of an A-h-k-a process in a feasible pre-run-time schedule of guaranteed periodic processes, which consists of an initial part of the pre-run-time schedule $S_0(t_0)$, which is a sub-schedule in the interval $[0, t_0]$; and a repeating part of the pre-run-time schedule $S_{LCM}(prd_{LCM})$, which is a subschedule in the interval $[t_0, t_0+prd_{LCM}]$.

This method uses the functions of the A-h-k-a Scheduler and the Main Run-Time Scheduler, which are described below in the section related to the run-time phase.

A method for computing the worst-case response time of an A-h-k-a process $a_i$ corresponding to a feasible pre-run-time schedule of guaranteed periodic processes consisting of an initial part of the pre-run-time schedule $S_0(t_0)$, in the interval $[0, t_0]$; and a repeating part of the pre-run-time schedule $S_{LCM}(prd_{LCM})$, in the interval $[t_0, t_0+prd_{LCM}]$ follows.

fail:=false;

for $t_s:=0$ to $t_0+prd_{LCM}-1$ do begin

For each A-h-k-a process $a_b$, such that $a_b \epsilon$ A-h-k-a $\wedge L_{ab} > L_{ai} \wedge \exists x_k, x_k \epsilon$ A-h-k-a $\vee x_k \epsilon$ P-g: ab excludes $x_k$ $\wedge L_{xk} \leq L_{ai}$, do the following:

let $a_b$ arrive at time $t_s-1$, and use the A-h-k-a Scheduler and Main Run-Time Scheduler to schedule $a_b$ and $a_i$ to obtain a response time of $a_i$, called $RE_1(a_i, t_s, a_b)$, corresponding to each ab according to the assumptions (1)–(6) below, with the additional assumption that $a_b$ can always start its execution at time $t_s-1$ (including when $t_s=0$) except if at time $t_s-1$ there exists some periodic process p, such that $t_s < s(p)$ and ($a_b$ cannot-_the_preempted_by p)$\wedge L_{ab} \geq L_p$, and executing $a_b$ at time $t_s-1$ may cause p to miss its deadline, that is, $a_b$ is delayed by the conditions in either Case 1 or Case 5 of the A-h-k-a Scheduler. At time $t=t_s-1$, assume that the condition "$s'(p) \geq t$" is true for every periodic process p such that $t_s < s(p)$ when checking whether ab should be delayed by the conditions of Case 1 or Case 5 of the A-h-k-a Scheduler. When computing $RE_1(a_i, t_s, a_b)$, if $\exists p_l, p_l \epsilon$ P-g $\wedge s(p_l) \leq t_s < e(p_l)$, then assume that $p_l$ has already completed at time $t_s-1$, that is, this instance of $p_l$ will not have any effect on $a_b$, $a_i$, or any other process in the system.

{Let each A-h-k-a process $a_b$ that can possibly block $a_i$, arrive at time $t_s-1$ and determine which one among them will block $a_i$ for the greatest amount of time.}

After obtaining $RE_1(a_i, t_s, a_b)$ for every such $a_b$, use the A-h-k-a Scheduler and Main Run-Time Scheduler to schedule $a_i$ to obtain another response time of $a_i$, called $RE_2(a_i, t_s)$, according to the assumptions (1)–(6) below, with the additional assumption that no A-h-k-a process $a_b$, such that $a_b \epsilon$ A-h-k-a $\wedge L_{ab} > L_{ai} \wedge \exists x_k, x_k \epsilon$ A-h-k-a $\vee x_k \epsilon$ P-g: $a_b$ excludes $x_k \wedge L_{xk} \leq L_{ai}$ had ever arrived. When computing $RE_2(a_i, t_s)$, if $\exists p_l, p_l \epsilon$ P-g $\wedge s(p_l) \leq t_s < e(p_l)$, then assume that $s'(p_l)=s(p_l) \wedge e'(p_l)=e(p_l)$; {i.e., $p_l$ started at the beginning of its time slot and will complete its computation at the end of its time slot in the pre-run-time schedule that was computed using adjusted computation times}.

(1) $a_i$ arrives in the system at time $t_s$.

(2) Unless $a_i$ is delayed because of the conditions in Case 1 or Case 5 of the A-h-k-a Scheduler, (see (3) below), let every other A-h-k-a process $a_j$, such that $L_{aj} \leq L_{ai}$ arrive at the following instants in time:

$$R_{a_j}(k) = t_s + k * \min_{a_j}, k = 0, 1, 2, \ldots, \left\lfloor \frac{d_{a_j}}{\min_{a_j}} \right\rfloor,$$

and be scheduled before $a_i$ whenever $a_i$ and $a_j$ have both arrived and $a_i$ has not yet started. If $a_j$ is delayed by any of the conditions in Cases 1–7 of the A-h-k-a Scheduler, then let $a_i$ be delayed by the same amount of time.

{all other A-h-k-a processes whose deadlines are shorter or equal to $a_i$'s deadline arrive at the same time as $a_i$ at time $t_s$, and are put into execution before $a_i$.}

(3) Whenever the conditions in Case 1 or Case 5 of the A-h-k-a Scheduler become true for $a_i$ and some P-h-k process p at some time t, i.e.: if $\exists p, p \epsilon$ P-g:

$$s'(p) \geq t \bigwedge (a_i \text{ cannot\_be\_preempted\_by } p) \bigwedge L_{a_i} \geq L_p \bigwedge$$

$$(\nexists\ p_l, p_l \in P-g: s(p_l) < s(p) < e(p) < e(p_l) \wedge L_{p_l} \leq L_{a_i}) \bigwedge$$

$$(\nexists\ p_l, p_l \in P-g: s(p) < s(p_l) < e(p_l) < e(p) \wedge (a_i \text{ cannot\_be\_preempted\_by } p_l)) \bigwedge$$

$$(\nexists\ p_m, p_m \in P-g: t < s'(p_m) \wedge e(p_m) \leq s(p) \wedge L_{a_i} < L_{p_m}) \bigwedge$$

$$(e(p) - t) < c_{a_i} + \sum\nolimits_{p_l \in P-g \wedge t \leq s(p_l) < e(p) \wedge \neg(e'(p_l) \leq t) \wedge L_{p_l} \leq L_{a_i}} c_{p_l} +$$

$$\sum\nolimits_{a_k \in A-h-k-a \wedge d_{a_k} < d_p \wedge (\neg(0 \leq R'(a_k)) \vee (R'(a_k) \leq t \wedge \neg(e'(a_k) \leq t)) \vee (R'(a_k) + \min_{a_k} < e(p)))}$$

$$\left\lceil \frac{e(p) - t}{\min_{a_k}} \right\rceil \cdot c_{a_k}$$

or if $\exists p, p_1, p, p_1 \in P-g$:

$$s'(p) \geq t \bigwedge s(p) < s(p_l) < e(p_l) < e(p) \bigwedge (a_i \text{ cannot\_be\_preempted\_by } p_l) \bigwedge L_{a_i} \geq L_p \bigwedge$$

$$(\nexists \ p_m, p_m \in P-g: t < s'(p_m) \bigwedge e(p_m) \leq s(p) \bigwedge L_{a_i} < L_{p_m}) \bigwedge$$

$$(s(p) - t) < c_{a_i} + \sum\nolimits_{p_l \in P-g \wedge \neg(e'(p_l) \leq t) \wedge t \leq s(p_l) < e(p_l) \leq s(p)} c_{p_l} +$$

$$\sum\nolimits_{a_k \in A-h-k-a \wedge L_{a_k} < L_p \wedge (\neg(0 \leq R'(a_k)) \vee (R'(a_k) \leq t \wedge \neg(e'(a_k) \leq t)) \vee (R'(a_k) + \min_{a_k} < e(p)))}$$

$$\left\lceil \frac{s(p) - t}{\min_{a_k}} \right\rceil \cdot c_{a_k}$$

let t also be the earliest time that the conditions in Case 1 or Case 5 become true for that instance of p and $a_i$, then for every other A-h-k-a process $a_j$ that belongs to the following set:

{$a_j$|$a_j \in$ A-h-k-a $\wedge j \neq i \wedge L_{aj} \leq L_{ai} \wedge$ (($\neg (0 \leq R'(a_j)) \vee (R'(a_j) \leq \wedge \neg(e'(a_j) \leq t)) \vee (R'(a_j) + \min_{aj} < e(p)))$ $\vee (s'(a_b) \leq t_s \wedge t-1 \leq e'(a_b) \wedge s'(a_j) < t))$}

($a_j$ has a deadline that is shorter than or equal to $a_i$'s deadline and, either $a_j$ has never arrived; or $a_j$ has arrived but has not completed its computation; or $a_j$ may arrive again before time s(p); or at time t−1 $a_i$ was blocked by $a_b$ and $a_j$ started its execution before t), "delay" $a_j$'s arrival time to occur at time s(p); if at time s(p) the conditions in Case 1 or Case 5 of the A-h-k-a Scheduler continue to be true for some other periodic process p', then $a_i$ should be delayed again, and the A-h-k processes $a'_j$ that satisfy the conditions of the formula for p' should also be delayed again until s(p'); otherwise assume that $a_j$ arrives at s(p), and is scheduled before $a_i$; and assume that p starts executing at time $s(p) + \Sigma_{a_k \in A-h-k-a \wedge L_{ak} < L_p} c_{ak}$.

For each such $a_j$, let only a single instance of $a_j$ arrive at time s(p), even if originally there could be several instances of a same process $a_j$ that satisfy the conditions above.

For each such $a_j$'s subsequent arrival times after s(p), use the same arrival times that were determined in (2), i.e., $a_j$'s subsequent arrival times after s(p) will be: $R_{aj}(k) = t_s + k \cdot \min_{aj}$ such that $R_{aj}(k) > s(p)$.

(If at time t there exists more than one process p for which the conditions of either Case 1 or Case 5 are true for p and $a_i$, then let the above apply to the process p among them that has the latest s(p) time in the pre-run-time schedule.)

{if $a_i$ is delayed due to the conditions in Case 1 or Case 5, then an A-h-k-a process $a_j$ could delay $a_i$ by a maximum amount by arriving at s(p).}

(4) If the end of the current instance of the repeating part of the pre-run-time schedule is reached, continue at the beginning of the next instance of the repeating part of the pre-run-time schedule.

(5) If $a_i$'s deadline $d_{ai}$ is reached but $a_i$ has not yet completed its computation, then set fail:=true and exit from the procedure.

(6) If $a_i$'s computation is completed before its deadline $d_{ai}$, then record the completion time of $a_i$ as the response time of $a_i$ (either $RE_1(a_i, t_s, a_b)$ for the current $a_b$, or $RE_2(a_i, t_s)$ when no such $a_b$ is assumed to have arrived at time $t_s-1$).

After the response time $RE_1(a_i, t_s, a_b)$ corresponding to every $a_b$ that may block $a_i$ has been computed, and the response time $RE_2(a_i, t_s)$ that assumed that no such $a_b$ had arrived and blocked $a_i$ has also been computed, set the response time of $a_i$ with arrival time $t_s$, $RE(a_i, t_s)$ to be equal to the greatest among them, i.e., $RE(a_i, t_s) = \max\{RE_1(a_i, t_s, a_b), RE_2(a_i, t_s)\}$, and exit from the current iteration of the loop for this value of $t_s$, and start the next iteration for $t_s := t_s + 1$.

end;

if not fail then $RE_{ai} := \max\{RE(a_i, t_s) | t_s = 0, 1, \ldots, LCM-1\}$;

(A description will be found below of scheduling of the A-h-k-a processes, of the A-h-k-a Scheduler and of definitions of the terms used above.)

it is assumed in a second assumption that for each A-h-k-a process $a_i$, for each $RE_{ai}$ determined in the above procedure, if $RE_{ai} \leq L_{ai}$, $a_i$ will always meet its deadline at run-time.

EXAMPLE 7

If the second method is used, that is, the simulation procedure above, to determine the worst-case response times of the A-h-k-a processes in Examples 1–6 above, the procedure will find the following.

$RE_{a0}$: The maximum value of $RE(a_0, t_s)$ will happen when $a_0$ arrives at time $t_s = 0$. Since no process excludes $a_0$, and $a_0$ has the minimum latitude among all processes, $a_0$ will always be put into execution immediately after it arrives, thus $a_0$'s response time $RE_{a0} = RE(a_0, 0) = \max\{RE(a_0, t_s)\} = c_{a0=2} \leq L_{a0=2}$.

$RE_{a1}$: The maximum value of $RE(a_1, t_s)$ will happen when $a_1$ arrives at time $t_s = 0$. Since no process excludes $a_1$, and only one process $a_0$ has less latitude compared with $a_1$'s latitude, when $a_1$ arrives at time $t_s = 0$, assuming that $a_0$ will also arrive at time $t_s = 0$, $a_1$ will only be delayed by $a_0$'s execution time, thus $a_1$'s response time $RE_{a_i} = \max\{RE(a_1, t_s)\} = RE(a_1, 0) = c_{a0} + c_{a1=2+2=4} \leq L_{a1=7}$.

$RE_{a2}$: The maximum value of $RE(a_2, t_s)$ will happen when $a_2$ arrives at time $t_s = 82$ but $a_9$ arrived one time unit earlier at $t_s - 1 = 81$, so $a_9$ blocks $a_2$ at time 82. According to rule (2) in the simulation procedure, it is first assumed that $a_0$ and $a_1$ will also arrive at time $t_s = 82$, and will be put into execution from time 82 to 86, preempting $a_9$. After $a_0$ and $a_1$'s completion, $a_9$ will resume at time 86 and complete its computation at time 95. At time 95, $a_2$ will be delayed by the conditions of Case 1 of the A-h-k-a Scheduler, because $e(new_p 31)-t)=114-95=19<c_{a2}+c_{newp}3=10+10=20$. According to rule (3) in the simulation procedure, since at time 95 $a_0$ and $a_1$ belong to the set:

$\{a_j | a_j \in A\text{-}h\text{-}k\text{-}a \wedge j \neq i \wedge L_{aj} \leq L_{ai} \wedge \quad ((\neg(0 \leq R'(a_j)) \vee (R'(a_j) \leq t \wedge \neg(e'(a_j) \leq t)) \vee (R'(a_j) + \min_{a_j < e(p)}) \vee (s'(a_b) \leq t_S \wedge t-1 \leq e'(a_b) \wedge s'(a_j) < t))\}$ because $a_0 \in$ A-h-k-a $\wedge a_0 \neq a_2 \wedge d_{a0} \leq d_{a2} \wedge (s'(a_9) \leq t_s = 82 \wedge t-1=95-1=94 \leq e'(a_9)=95 \wedge s'(a_0)=82<t=95$.

(at time $t-1=95-1=94$ $a_2$ was blocked by $a_9$ ("$a_b$"), and $a_0$ ("$a_j$") started its execution before t=95). $a_1$ also meets the above conditions similar to $a_0$. According to rule (3) in the simulation procedure, $a_0$ and $a_1$'s arrival times are "delayed" to occur at time $s(newp_{31})=100$ and are scheduled before $a_2$ to execute from time 100 to 104; $newp_3$ starts executing at time $s(newp_{31})+c_{a0}+c_{a1}=100+2+2=104$, and completes its execution at time 114. As $L_p6=200<L_{a2=239}$ and $L_p7=200<L_{a2=239}$, $p_6$ will execute from 114 to 140; $p_7$ will execute from 140 to 156; $a_2$ will execute from 156 to 166. Thus $a_2$'s response time $RE_{a2}=\max\{RE(a_2,t_s)\}=RE(a_2,t_s)=e'(a_2)-R_{a2=166-82=84}<L_{a2=239}$.

In effect, the simulation procedure computes a response time of $a_2$ that is equal to $a_2$'s response time in the case that is illustrated in FIG. 2 in Appendix 1, where $a_9$ arrives at time 81, $a_2$ arrives at time 82 and is blocked by $a_9$ until time 91; at time 91 $a_2$ is delayed by the conditions of Case 1 of the A-h-k-a Scheduler, because $e(newp_{31})-t)=114-91 = 23<c_{a2}+c_{newp3}+c_{a0}+c_{a1}=10+10+2+2=24$. $a_0$ and $a_1$ arrive at time $s(newp_{31})=100$.

$RE_{a9}$: The maximum value of $RE(a_9,t_s)$ will happen when $a_9$ arrives at time $t_s=100$; $a_0$ and $a_1$ also arrive at time 100 and execute from time 100 to 104; $newp_3$ executes from time 104 to 114; As $L_{p6}=200<L_{a2}=239$ and $L_p7=200<L_{a2}=239$, $p_6$ will execute from 114 to 140; $p_7$ will execute from 140 to 156; $a_2$ will execute from 156 to 166. Finally $a_9$ will execute from time 166 to 176. Thus $a_9$'s response time $RE_{a9}=\max\{RE(a_9,t_s)\}=RE(a_9, 100)=e'(a_9)-R_{a9}=176-100 = 76<L_{a9}=259$.

Since the worst-case response time of every A-h-k-a process is less than or equal to its deadline, it is possible to guarantee that they are all schedulable. Note that the worst-case response time of $a_2$ determined by the simulation procedure is 84 and is tighter than the worst-case response time of 148 determined by the formula in the first method. The worst-case response time of $a_9$ determined by the simulation procedure is 76 and is also tighter than the worst-case response time of 128 determined by the formula in the first method.

□

In Example 1, none of the processes had offsets; consequently the length of the initial part of the pre-run-time schedule was 0. Below, another example is described in which the periodic processes have offsets, and the initial part of the pre-run-time schedule is of non-zero length.

Example C

Assume it is desired to schedule the same set of processes $a_A$, $p_B$, $p_C$, $p_D$ given in Example B. The user can control the probability of each asynchronous process being converted into a periodic process or remaining asynchronous, by setting the threshold values in the procedure for converting a set of asynchronous processes into periodic processes given earlier.

Assume that the value chosen for the threshold for $a_A$ was large and asynchronous process $a_A$ was not converted into a new periodic process. The procedure for scheduling a set of periodic processes with offsets will construct the pre-run-time schedule for the processes $p_B$, $p_C$, $p_D$ illustrated in FIG. 19. Assuming $a_A$ is to be scheduled by the A-h-k-a Scheduler using the information in the pre-run-time schedule, the simulation procedure will determine that $a_A$'s worst-case response time will happen when $a_A$ makes a request at time 6. At time 6, $a_A$ will be delayed by the conditions in Case 1 of the A-h-k-a Scheduler. $a_A$ will be executed from time 11 to time 13 after $p_C$ has completed. $a_A$'s response time is $RE(a_A,t_s)=RE(a_A,6)=e'(a_A)-s'(a_A)=13-6=7 \leq d_{aA}=7$. In this case $a_A$ is also guaranteed to always meet its deadline. □

The simulation procedure above, is more accurate than the formula given earlier for determining the worst case response times of A-h-k-a processes, because the simulation procedure takes into account knowledge about the positions of the periodic processes in the pre-run-time schedule. In contrast, the earlier formula does not take into account such knowledge, and assumes that in the worst case, all periodic processes may arrive at the same time. Note that currently, none of the algorithms and protocols in the prior art that perform all scheduling activities at run-time, can avoid making the latter overly pessimistic assumption in their schedulability tests.

If it is determined that the deadline of some hard deadline process cannot be met, that is, if a feasible pre-run-time schedule does not exist for the given set of P-h-k processes, or if the worst-case response time of some A-h-k-a process exceeds its deadline, then one may have to modify the characteristics of or remove one or more P-h-k or A-h-k-a processes.

In the first case, the pre-run-time scheduling algorithm [24] will identify the critical set, that is, the subset of P-h-k processes for which either modifying the characteristics of one or more processes in that set, or removing one or more processes from that set is necessary to meet the deadlines of all the P-h-k processes.

In the second case, the formula or simulation procedure for calculating the worst-case response time of each A-h-k-a process can be used to identify which processes should be modified or removed, in order to meet the deadlines of all the A-h-k-a processes.

After the user has modified the characteristics of, or removed one or more P-h-k or A-h-k-a processes, the method will be applied again. The initial determination and any subsequent modification of process characteristics by the user depends on the specific user application requirements and is outside the scope of this specification. This process must be repeated until there exists a feasible schedule for all the hard-deadline processes.

Step 4: A Feasible Pre-Run-Time Schedule for the P-s-k and P-h-k Processes is Constructed.

After guaranteeing the schedulability of all the processes with hard deadlines, the set of periodic processes with soft deadlines and known characteristics (P-s-k processes) is scheduled together with the set of all periodic processes with hard deadlines and known characteristics (P-h-k processes), and a feasible pre-run-time schedule for these processes is constructed.

Each P-s-k process is assigned an integer, called its "criticality level." Each P-s-k process is also assigned, in addition to its normal deadline, a "deadline upper-limit."

The computation times of the soft-deadline periodic P-s-k processes are modified in the same way as for the hard-deadline periodic P-h-k processes.

If it is determined that a feasible schedule does not exist, then the method will identify the soft critical set, that is, the subset of soft-deadline processes for which either modifying the characteristics of one or more processes in that set, or removing one or more processes from that set, is necessary to meet the deadlines of all hard-deadline processes. The method will select one process that has the lowest criticality level among the processes in the soft-critical set and increase the deadline of that process by an amount that does not exceed the deadline upper-limit of that process and attempt to find a feasible schedule again. The deadline of the process with the lowest criticality level will be incremented until one of the following happens: either a) a feasible schedule is found; or b) the previously selected process does not belong to the newly computed critical set; or c) the revised deadline of that process cannot be further increased without exceeding the deadline upper-limit. In the latter two cases, the method will select another process that has the lowest criticality level among all processes in the soft critical set and for which the deadline has not yet been revised, increment its deadline, and attempt to find a feasible schedule again.

If it is determined that a feasible schedule still does not exist after the deadlines of all the processes in the soft critical set have been revised and their deadline upper-limits have been reached, the method will provide the user with the list of soft-deadline processes in the soft critical set for which modifying the characteristics of one or more processes in that set or removing one or more processes in that set is necessary to meet the deadlines of all hard-deadline processes. After the user has modified the characteristics of one or more processes in the soft critical set, or removed one or more processes in that set, the method will be applied again. The procedure will be repeated until there exists a feasible schedule for all the P-h-k and P-s-k processes. Again, the initial determination and any subsequent modification of process characteristics by the user depends on the specific user application requirements and is outside the scope of this specification.

After a feasible schedule has been found for all the P-h-k and P-s-k processes, the worst-case response times for all the A-h-k-a processes are recomputed with the set of P-s-k processes included in the set of guaranteed periodic processes P-g. If the worst-case response time of any A-h-k-a process $a_i$ exceeds its deadline, the method will select one process that has the lowest criticality level among all P-s-k processes that contribute to $a_i$'s worst-case response time and increase the deadline of that P-s-k process by an amount that does not exceed its deadline upper-limit and recompute the worst-case response time. The deadline of the process with the lowest criticality level will be incremented until one of the following happens: either a) the worst-case response time of every A-h-k-a process is less than or equal to its deadline; or b) the previously selected process does not belong to the newly computed set of P-s-k processes that contribute to $a_i$'s worst-case response time; or c) the revised deadline of that process cannot be further increased without exceeding the deadline upper-limit. In the latter two cases, the method will select another process that has the lowest criticality level among all P-s-k processes that contribute to $a_i$'s worst-case response time and for which the deadline has not yet been revised, increment its deadline, and compute the worst-case response time again for each A-h-k-a process.

If it is determined that the worst-case response time of some A-h-k-a process still exceeds its deadline after the deadlines of all the processes that contribute to $a_i$'s worst-case response time have been revised and their deadline upper-limits have been reached, the method will provide the user with the list of soft-deadline processes in the set that contribute to $a_i$'s worst-case response time for which modifying the characteristics of one or more processes in that set or removing one or more processes in that set is necessary to meet the deadlines of all the A-h-k-a processes. After the user has modified the characteristics of one or more processes that contribute to $a_i$'s worst-case response time, or removed one or more processes in that set, the method will be applied again. The procedure will be repeated until the worst-case response time of every A-h-k-a process is less than or equal to its deadline.

At the end of Step 4 the method will generate a feasible pre-run-time schedule for all the P-h-k, and P-s-k processes, while guaranteeing that the worst-case response times of all the A-h-k-a processes will be less than or equal to their deadlines. The set of P-h-k and P-s-k processes will be referred to as the set of guaranteed periodic processes (P-g). A simplified procedure for implementing Step 4 will be described later.

Example 8.

Assume that in addition to the hard deadline processes described in Examples 1–7 above, the following periodic process has a soft deadline and known characteristics (P-s-k process).

$p_8$: $R_{p8}=20$, $c_{p8}=16$, $d_{p8}=5$, $prd_{p8}=200$, $o_{p8}=0$;

Assume further that $p_8$'s criticality is 3, its deadline upper-limit is 100.

$p_8$'s adjusted computation time is:

$c_{p8}'=c_{p8}+c_{a0}+c_{a1}=16+2+2=20.$

Firstly it will be determined that no feasible schedule exists for the given set of process parameters. The optimal schedule for the given set of parameters is the same as the schedule shown in FIG. 3, except that $d_{p8}=55$ and $p_8$ is late by 5 time units. The soft critical set contains one process $p_8$. The simplified procedure for Step 4 referred to above will increase the deadline of $p_8$ until $d_{p8}'=60$, at which point the feasible schedule is obtained, as shown in FIG. 3.

If the formula in the first method is used to calculate the worst-case response times of the A-h-k-a processes the following is obtaained:

$RE_{a0}RE_{ai}$ remain the same as in Step 3, and are less than $L_{a0}$ and $L_{a1}$ respectively.

$DelayA(a_2,RE_{a2})=\lceil E_{a2}/min_{a0}\rceil c_{a0}+\lceil E_{a2}/min_{a0}\rceil c_{a1}=2+2=4$ $DelayP(a_2, RE_{a2}) = [RE_{a2}/prd_{newp3}]c_{newp3} + [RE_{a2}/prd_{p4}]c_{p4} + [RE_{a2}/prd_{p5}]c_{p5} + [RE_{a2}/prd_{p6}]c_{p6} + [RE_{a2}/prd_{p7}]c_{p7} + [RE_{a2}/prd_{p8}i]c_{p8} = 20 + 26 + 16 + 26 + 16 + 16 = 120$ $B(a_2) = c_{a9} = 10;$ $GT(a_2, RE_{a2}) = [RE_{a2}/prd_{newp3}]c_{a2} = 20$ $RE_{a2} = c_{a2} + DelayA(a_2, RE_{a2}) + DelayP(a_2, RE_{a2}) + B(a_2) + GT(a_2, RE_{a2}) = 10 + 4 + 120 + 10 + 20 = 164 \leq L_{a2} = 239$ $DelayA(a_9, RE_{a9}) = [RE_{a9}/min_{a0}]c_{a0} + [RE_{a9}/min_{a1}]c_{a1} + [RE_{a9}/min_{a2}]c_{a2} = 2 + 2 + 10 =$ $DelayP(a_9, RE_{a9}) = [RE_{a9}/prdnew_{p3}]cnew_{p3} + [RE_{a9}/prd_{p4}]c_{p4} + RE_{a9}/prd_{p5}c_{p5} + [RE_{a9}/prd_{p6}]c_{p6} + [RE_{a9}/prd_{p7}, c_{p7}] + RE_{a9}/prd_{p8}, c_{p8} = 20 + 26 + 16 + 26 + 16 + 16 = 120$ $B(a_9) = 0;$ $GT(a_9, RE_{a9}) = 0;$ $RE_{a9} = c_{a9} + DelayA(a_9, RE_{a9}) + DelayP(a_9, RE_{a9}) + B(a_9) + GT(a_9, RE_{a9}) = 10 + 14 + 120 = 144 \leq L_{a9} = 239$ if the second method is used, that is, the simulation procedure above to calculate the worst-case response times of the A-h-k-a processes in the examples above, the procedure will find the following.

Figure 4:
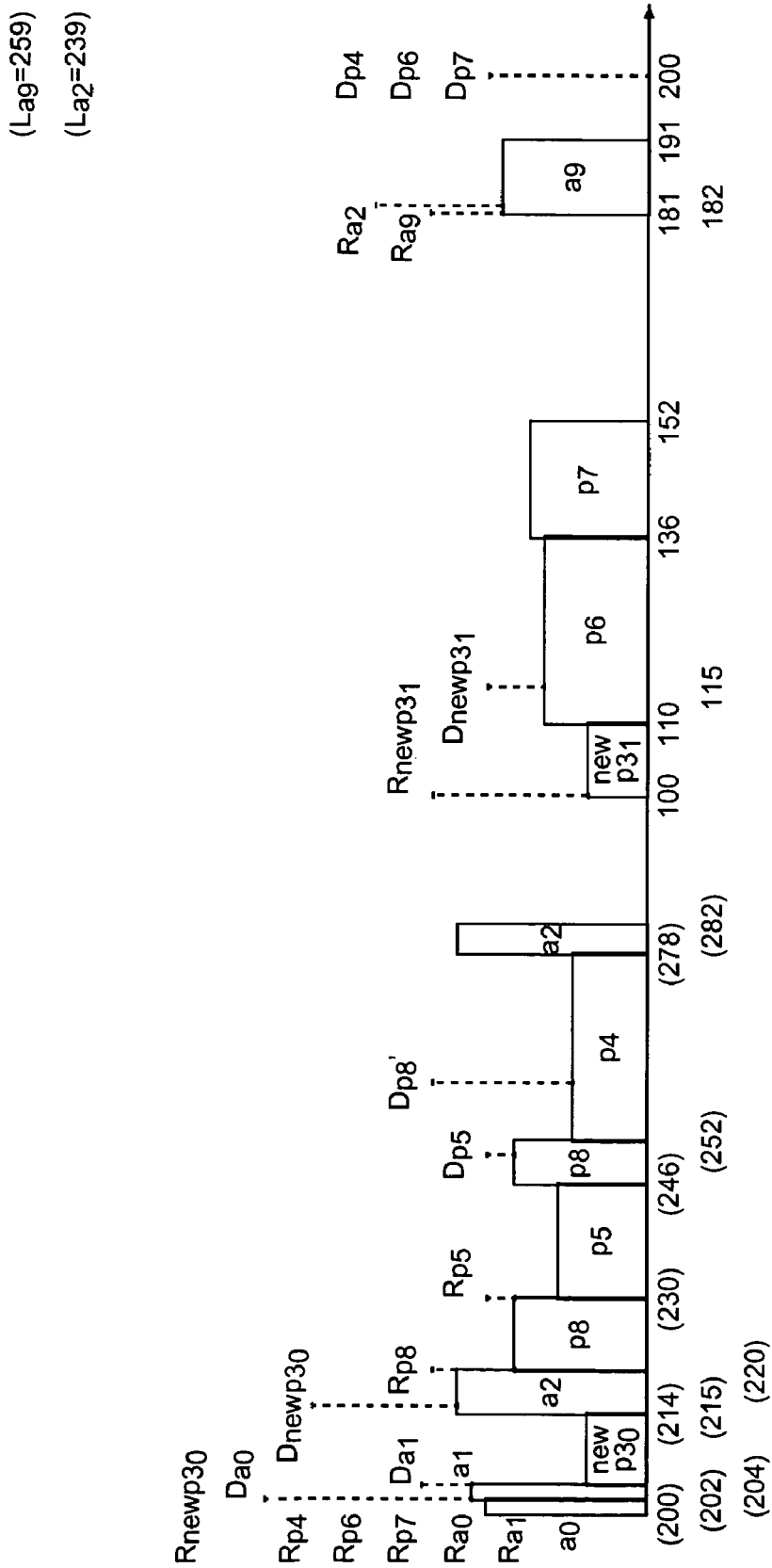

$a_0$'s response time $RE_{a0}$ and $a_1$'s response time $RE_{ai}$ will remain the same as in Example 6, that is:

$RE_{a0} = RE(a0,0) = \max\{RE(a_0, t_s)\} = c_{a0} = 2 \leq d_{a0} = 2.$ $RE_{ai} = \max\{RE(a_1, t_s)\} = RE(a_1, 0) = c_{a0} + c_{a1} = 2 + 2 = 4 \leq d_{a1} = 7.$ $RE_{a2}$: The maximum value of $RE(a_2, t_s)$ will happen when $a_2$ arrives at time $t_s = 182$ but $a_9$ arrived one time unit earlier at $t_s - 1 = 181$, so $a_9$ blocks $a_2$ at time 182. According to rule (2) in the simulation procedure, it is first assumed that $a_0$ and $a_1$ will also arrive at time $t_s = 182$, and will be put into execution from time 182 to 186, preempting $a_9$. After $a_0$ and $a_1$'s completion, $a_9$ will resume at time 186 and complete its computation at time 195. At time 195, $a_2$ will be delayed by the conditions of Case 1 of the A-h-k-a Scheduler, because $e(newp_{30}) - t = 214 - 195 = 19 < c_{a2} + c_{newp3} = 10 + 10 = 20.$
According to rule (3) in the simulation procedure, since at time 195 $a_0$ and $a_1$ belong to the set:

$\{a_j | a_j \in \text{A-h-k-a} \wedge j \neq I \wedge L_{aj} \leq L_{ai} \wedge$ $((\neg(0 < R'(a_j)) \vee (R'(a_j) \leq t \wedge \neg e'(a_j) < t)) \vee (R'(a_j) + min_{ai} < e(p)))$ $\vee (s'(a_b) \leq t_s \wedge t - 1 \leq e'(a_b) \wedge s'(a_j) < t))\}$ because $a_0 \in \text{A-h-k-a} \wedge a_0 \approx a_2 \wedge L_{a0} \leq L_{a2} \wedge (s'(a_9) \leq t_s = 182 \wedge t - 1 = 195 - 1 = 194$ $\leq e'(a_9) = 195 \wedge s'(a_0) = 182 < t = 195.$ (at time $t - 1 = 195 - 1 = 194$ $a_2$ was blocked by $a_9$ ("$a_b$") and $a_0$ ("$a_j$") started its execution before $t = 195$). $a_1$ also meets the above conditions similar to $a_0$. According to rule (3) in the simulation procedure, $a_0$ and $a_1$'s arrival times are "delayed" to occur at time $s(newp_{30}) = 200$ and are scheduled before $a_2$ to execute from time 200 to 204; $new_{p3}$ starts executing at time $s(newp_{30}) + C_{a0} + C_{a1} = 200 + 2 + 2 = 204$, and completes its execution at time 214; $a_2$ starts at time 214 and executes until time 220. As $L_{p8} = d'_{p8} - r_{p8} = 260 - 220 = 40 < L_{a2} = d_{a2} = 239,$ $L_{p5} = d_{p5} - r_{p5} = 250 - 230 = 20 < L_{a2} = d_{a2} = 239,$ and $L_{p4} = d_{p4} - r_{p4} = 200 - 0 = 200 < L_{a2} = d_{a2} = 239;$ $p_8$ will preempt $a_2$ at time 220; $p_8, p_5, p_4$ will execute from time 220 to 278; $a_2$ will resume execution from time 278 to 282; Thus $a_2$'s response time $RE_{a2} = \max\{RE(a_2, t_s)\} = RE(a_2, 182) = e'(a_2) - R_{a2} = 282 - 182 = 100 < L_{a2} = 239.$ FIG. 4 illustrates a possible run-time execution of the A-h-k-a processes $a_0, a_1, a_2, a_9$, together with the P-h-k and P-s-k processes of FIG. 3. The worst-case response time of A-h-k-a process $a_2$ is $RE_{a2} = \max\{RE(a_2, t_s)\} = RE(a_2, 182) = e'(a_2) - R_{a2} = 282 - 182 = 100,$ as computed in Step 4.

In effect, the simulation procedure computes a worst-case response time of $a_2$ that is equal to the response time of $a_2$ in the case that is illustrated in FIG. 4, where $a_9$ arrives at time 181, $a_2$ arrives at time 182 and is blocked by $a_9$ until time 191; at time 191 $a_2$ is delayed by the conditions of Case 1 of the A-h-k-a Scheduler, because $e(newp_{30}) - t = 214 - 191 = 23 < c_{a2} + c_{newp3} + c_{a0} + c_{a1} = 10 + 10 + 2 + 2 = 24.$ $a_0$ and $a_1$ arrive at time $s(newp_{30}) = 200.$ $RE_{a9}$: The maximum value of $RE(a_9, t_s)$ will happen when $a_9$ arrives at time $t_s = 200$; $a_0$ and $a_1$ also arrive at time 200 and execute from time 200 to 204; $newp_3$ executes from time 204 to 214; $a_2$ starts at time 214 and executes until time 220. As $L_{p8} < L_{a2}, L_{p5} < L_{a2},$ and $L_{p4} < L_{a2}$; $p_8$ will preempt $a_2$ at time 220; $p_8, p_5, p_4$ will execute from time 220 to 278; $a_2$ will resume execution from time 278 to 282; Finally $a_9$ will execute from time 282 to 292. Thus $a_9$'s response time $RE_{a9} = \max\{RE(a_9, t_s)\} = RE(a_9, 100) = e'(a_9) - R_{a9} = 292 - 200 = 92 < L_{a9} = 259.$ Since the worst-case response time of every A-h-k-a process is less than or equal to its deadline, it thus can be guaranteed that they are all schedulable. Note again that the worst-case response time of $a_2$ determined by the simulation procedure is 100 and is tighter than the worst-case response time of 164 determined by the formula in the first method. The worst-case response time of $a_9$ determined by the simulation procedure is 92 and also is tighter than the worst-case response time of 144 determined by the formula in the first method.

FIG. 3 illustrates the feasible pre-run-time schedule in which each guaranteed periodic process reserves a time frame that includes reserved processor capacity for any A-h-k-a process that has a shorter deadline than that guaranteed periodic process's deadline.

☐

Step 5: Determine the Worst-Case Response Times of the A-s-k Processes

A-s-k processes are scheduled at run-time by the Main Run-Time Scheduler, but their worst-case response times are determined before run-time in this step. A-s-k processes are scheduled at a lower priority than the A-h-k-a, P-h-k, P-s-k processes. That is, A-s-k processes are executed only when there does not exist any A-h-k-a, P-h-k, or P-s-k process that is ready for execution. If more than one A-s-k process are competing for execution, the process with the shortest deadline will be chosen for execution. An A-s-k process is not allowed to have any precedence relation with any other process. An A-s-k process $a_i$ is also not allowed to have any exclusion relation of the form $a_i$ excludes x where x is an A-h-k-a, P-h-k, or P-s-k process. These restrictions are imposed in order to prevent A-s-k processes from causing any delay to A-h-k-a, P-h-k, or P-s-k processes, so that one can guarantee that all the hard deadlines will be satisfied, and also provide firm response time guarantees for all the processes with known characteristics.

Two different methods of determining the worst-case response time of an A-s-k process will now be described. The first method uses a mathematical formula to calculate the worst-case response time, and is very similar to the formula described in Step 3 for determining the worst-case response time of an A-h-k-a process, except that:

(a) all A-h-k-a, P-h-k and P-s-k processes have higher priority than any A-s-k process $a_i$, so their execution times are included together with the execution times of A-s-k processes that have shorter deadlines than $a_i$ in the terms Delay($a_i$,$RE_{ai}$) and Delay($a_i$,$RE_{ai}$);

(b) because an A-s-k process cannot exclude a P-h-k, P-s-k, or A-h-k-a process, the term GT($a_i$,$RE_{ai}$) is not required in the formula; and (c) the term B($a_i$) only needs to consider the blocking time due to A-s-k processes that have greater deadlines than $a_i$. Because the rest of the formula in Step 3 is basically the same as the formula used here, to avoid repetition, the complete definition of the formula used here is provided later in this specification.

Example 9.

Assume the following asynchronous process with a soft deadline and known characteristics (A-s-k process):

$a_{10}$: $c_{a10}$=10, $d_{a10}$=300, $min_{a10}$=300.

The procedure to be described below for determining the response time of the A-s-k processes is used to determine the worst-case response time of the A-s-k process $a_{10}$:

$DelayA(a_{10}, RE_{a10})=\lceil RE_{a10}/min_{a0}\rceil c_{a0}+\lceil RE_{a10}/min_{a1}\rceil c_{a1}+\lceil RE_{a10}/min_{a2}\rceil c_{a2}$ $+\lceil RE_{a10}/min_{a9}\rceil c_{a9}=2+2+10+10=24$ $DelayP(a_{10},RE_{a10})=\lceil RE_{a10}/prd_{newp3}\rceil c_{newp3}+\lceil RE_{a10}/prd_{p4}\rceil c_{p4}+\lceil RE_{a10}/prd_{p5}\rceil c_{p5}$ $+\lceil RE_{a10}/prd_{p6}\rceil c_{p6}+\lceil RE_{a10}/prd_{p7}\rceil c_{p7}+\lceil RE_{a10}/prd_{p8}\rceil c_{p8}=20+26+16+26+16+16=120$ $B(a_{10})=0$ $RE_{a10}=c_{a10}+DelayA(a_{10},RE_{a10})+DelayP(a_{10},RE_{a10})$
$=10+24+120=154<L_{a10}=300$

□

The second method uses a simulation procedure to determine the worst-case response time of each A-s-k process. The simulation procedure used here is also very similar to the simulation procedure described in Step 3 for determining the worst-case response time of an A-h-k-a process, except that, (a) because all A-h-k-a processes have higher priority than any A-s-k process $a_i$, they are all assumed to arrive at the same time as $a_i$, together with all A-s-k processes that have shorter deadlines compared with $a_i$; (b) because an A-s-k process cannot exclude a P-h-k, P-s-k or A-h-k-a process, there is no need for an A-s-k process to avoid blocking a P-h-k, P-s-k or A-h-k-a process such as in Case 1 and Case 5 of the A-h-k-a Scheduler; consequently there is no need for a rule in the simulation procedure for A-s-k processes that is similar to the rule (5) in the simulation procedure in Step 3. Because the rest of the simulation procedure in Step 3 is basically the same as the simulation procedure used here, to avoid repetition, the complete definition of the simulation procedure used here is given later in this specification.

Similar to the case in Step 3, compared with the formula, the simulation procedure gives tighter response times that can guarantee the schedulability of a larger number of cases, but requires a longer computation time.

The simulation procedure used here also uses the functions of the A-h-k-a Scheduler and the Main Run-Time Scheduler, which are described later.

Example 10.

This example is a description of the use of this simulation procedure. Assume that the second method, that is, the simulation procedure described later, is used to calculate the worst-case response time of the A-s-k process $a_{10}$ in Example 9 above, the procedure will find the following.

Figure 5:
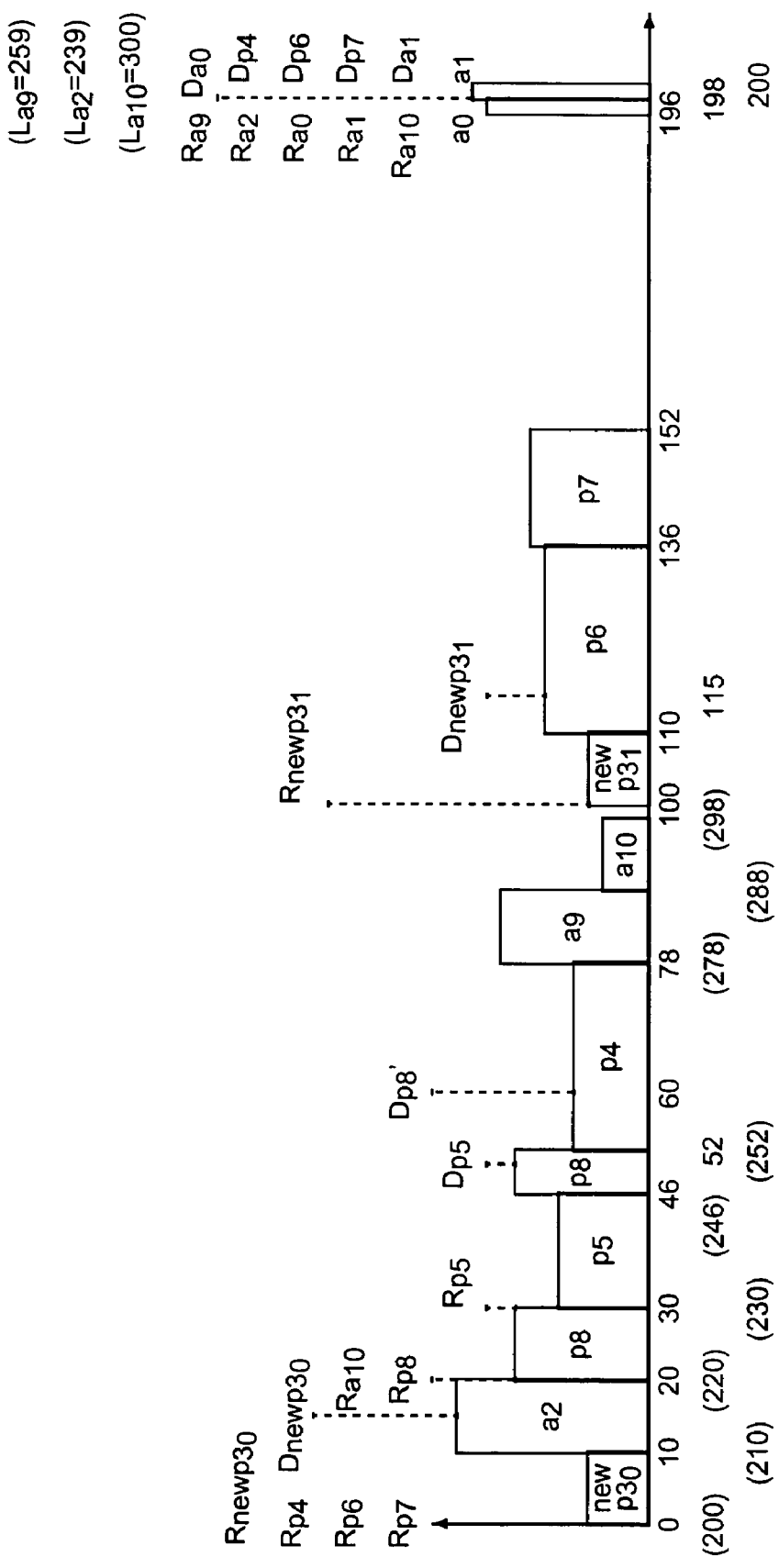

The maximum value of $RE(a_{10},t_s)$ will happen when $a_{10}$ arrives at time $t_s$=196. FIG. 5 is an illustration of this case, showing a run-time execution of the A-s-k process $a_{10}$, together with the A-h-k-a processes $a_0$, $a_1$, $a_2$, $a_9$, and the P-h-k and P-s-k processes in FIG. 3. The simulation procedure will simulate this execution in which $a_{10}$'s worst-case response time $RE_{a10}$=max$\{RE(a_{10},t_s)\}$=$RE(a_{10},196)$=e'$(a_{10})$−$R_{a10}$=298−196=102 as determined in Step 5.

At time 196, the simulation procedure assumes that $a_0$, $a_1$, $a_2$, $a_9$ will arrive at the same time as $a_{10}$, so $a_0$ will execute from time 196 to 198, and $a_1$ will execute from time 198 to 200. $newp_3$ will execute from time 200 to 210. $a_2$ will execute from time 210 to 220. $p_8$, $p_5$, $p_4$ will execute from time 220 to time 278. $a_9$ will execute from time 278 to 288. $a_{10}$ will execute from time 288 to 298. Thus $a_{10}$'s worst-case response time will be $RE_{a10}$=max$\{RE(a_{10},t_s)\}$=$RE(a_{10}, 196)$ =e'$(a_{10})$−$R_{a10}$=298−196=102<$L_{a10}$=300.

□

Run-Time Phase

During run-time, the processor capacity that is left unused by guaranteed periodic processes (the set of P-h-k and P-s-k processes P-g) in the pre-run-time schedule generated in Step 4 will be used to schedule the processes that are asynchronous and for which the characteristics are either known before run-time (A-s-k and A-h-k-a processes) or unknown before run-time but known as soon as the process arrives in the system (A-s-u processes).

In the previous step, a time slot in the feasible pre-run-time schedule was reserved for each guaranteed periodic process. However, at run-time each periodic process may not necessarily execute within its time slot in a pre-run-time schedule, because provided that it can be guaranteed that all the constraints will be satisfied, it is preferred that each process should execute as early as possible at run-time, in order to minimize the worst-case response times. Nevertheless, the beginning and end times of the time slots are important parameters that will be used by the run-time scheduler to determine, at each point in time, whether each asynchronous or periodic process can be safely put into execution while guaranteeing that all the constraints will be satisfied. In particular, the run-time scheduler will always guarantee that, (1) the actual execution order of each pair of "guaranteed" periodic processes $p_1$ and $p_2$ will be the same as the relative ordering of their time slots in the pre-run-time schedule, that is, if $e(p_1) \leq s(p_2)$, then $e'(p_1) < s'(p_2)$; and (2) the actual completion time $e'(p)$ of each "guaranteed" periodic process p will never exceed the end of p's time slot $e(p)$ in the pre-run-time schedule.

Scheduling A-h-k-a Processes

Each time the Run-Time Scheduler is executed, it will first try to schedule A-h-k-a processes according to the procedure below.

For any A-h-k-a process $a_i$ and any P-g process $p_l$, the following should hold: "$a_i$ cannot_be_preempted_by $p_l$", if the following conditions hold:

($a_i$ excludes $p_l$) $\vee$ ($\exists a_j, a_j \in$ A-h-k-a: $L_{aj} < L_{pl} \wedge a_i$ excludes $a_j$)

A-h-k-a Scheduler Method

The A-h-k-a Scheduler Method functions as part of the Main-Run-Time Scheduler to be described below.

At any time t:

if some A-h-k-a process $a_i$ has arrived at time t, or if some process $x_i$ completes its computation at time t or if t is both the release time and start time in the pre-run-time schedule for some P-g process p, i.e., $t = R_p = s(p)$ then begin for each A-h-k-a process $a_i$ that has already arrived and not yet completed, i.e., $R'(a_i) \leq t \wedge \neg(e'(a_i) \leq t)$, if $a_i$ satisfies any of the following conditions, then Delay $a_i$:

Case 1:

then Delay $a_i$;

{-in Case 1: $a_i$ is delayed either if there exists the possibility that the immediate execution of $a_i$ may cause a P-g process p with less latitude to be delayed (an example is shown in FIG. 20A); or, if there exists the possibility that it may cause some A-h-k-a process $a_j$ to be blocked for the duration of two processes $a_i$ and p which both have greater latitude compared with $a_j$'s latitude. An example is shown in FIG. 20B.}

Case 2:

if $\exists x, x \in$ P-g $\vee$ x $\in$ A-h-k-a:

$s'(x) < t \wedge \neg(e'(x) \leq t) \wedge$ x excludes $a_i$ then Delay $a_i$;

{-in Case 2: $a_i$ is delayed because it is not allowed to preempt any process x that excludes $a_i$. An example of this case is shown in FIG. 20C.}

Case 3:

if $\exists x, x \in$ P-g $\vee$ x $\in$ A-h-k-a:

$s'(x) < t \wedge \neg(e'(x) \leq t) \wedge L_x \leq L_{ai}$ then Delay $a_i$;

{-in Case 3: $a_i$ is delayed because it is not allowed to preempt any process x that has less or the same latitude as $a_i$. An example of this case is shown in FIG. 20D.}

Case 4:

if $\exists a_j, p, a_j \in$ A-h-k-a, p $\in$ P-g:

$s'(p) \geq t \wedge s'(a_j) < t \wedge \neg(e'(a_j) \leq t)$ $\wedge\ a_j$ excludes p $\wedge L_p \leq L_{ai}$ then Delay $a_i$ {-in Case 4: $a_i$ is delayed because it is not allowed to preempt any A-h-k-a process $a_j$ which excludes a P-g process p with less or equal latitude compared with $a_i$'s latitude. An example of this case is shown in FIG. 20E.}

Case 5:

if $\exists p, p_l, p, p_l \in$ P-g:

$s'(p) \geq t \bigwedge (a_i \text{ cannot\_be\_preempted\_by } p) \bigwedge L_{a_i} \geq L_p \bigwedge$ $(\exists\ p_l, p_l \in P-g: s(p_l) < s(p) < e(p) < e(p_l) \wedge L_{p_l} \leq L_{a_i}) \bigwedge$ $(\exists\ p_l, p_l \in P-g: s(p) < s(p_l) < e(p_l) < e(p) \wedge (a_i \text{ cannot\_be\_preempted\_by } p_l)) \bigwedge$ $(\exists\ p_m, p_m \in P-g: t < s'(p_m) \wedge e(p_m) \leq s(p) \wedge L_{a_i} < L_{p_m}) \bigwedge$ $(e(p) - t) < c_{a_i} + \sum_{p_l \in P-g \wedge t \leq s(p_l) < e(p) \wedge \neg(e'(p_l) \leq t) \wedge L_{p_l} \leq L_{a_i}} c_{p_l} +$ $\sum_{a_k \in A-h-k-a \wedge L_{a_k} < L_p \wedge (\neg(0 \leq R'(a_k)) \vee (R'(a_k) \leq t \wedge \neg(e'(a_k) \leq t)) \vee (R'(a_k) + \min_{a_k} < e(p)))} \left\lceil \frac{e(p) - t}{\min_{a_k}} \right\rceil \cdot c_{a_k}$ $$s'(p) \geq t \bigwedge s(p) < s(p_l) < e(p_l) < e(p) \bigwedge (a_i \text{ cannot\_be\_preempted\_by } p_l) \bigwedge L_{a_i} \geq L_p \bigwedge$$

$$(\not\exists \ p_m, p_m \in P-g: t < s'(p_m) \bigwedge e(p_m) \leq s(p) \bigwedge L_{a_i} < L_{p_m}) \bigwedge$$

$$(s(p) - t) < c_{a_i} + \sum\nolimits_{p_l \in P-g \wedge \neg(e'(p_l) \leq t) \wedge t \leq s(p_l) < e(p_l) \leq s(p)} c_{p_l} +$$

$$\sum\nolimits_{a_k \in A-h-k-a \wedge L_{a_k} < L_p \wedge \left(\neg(0 \leq R'(a_k)) \vee (R'(a_k) \leq t \wedge \neg(e'(a_k) \leq t)) \vee (R'(a_k) + \min_{a_k} < e(p))\right)} \left\lceil \frac{s(p)-t}{\min_{a_k}} \right\rceil \cdot c_{a_k}$$

then Delay $a_i$;

{- in Case 5: $a_i$ is delayed if there exists the possibility that the immediate execution of $a_i$ may cause a P-g process $p$ with less or equal latitude to be delayed, when $p$ may be preempted by some other periodic process $p_1$, and $a_i$ cannot be preempted by $p_1$. An example of this case is shown in FIG. 20F.}

Case 6:

if $\exists x, a_j, x \in A\text{-}h\text{-}k\text{-}a \vee x \in P\text{-}g$, $a_j \in A\text{-}h\text{-}k\text{-}a$:

$s'(x) < t \wedge \neg (e'(x) \leq t)$ $\wedge$ $x$ excludes $a_j$ $\wedge L_{aj} < L_x \wedge L_{aj} < L_{ai}$ then Delay $a_i$.

{-in Case 6: $a_i$ is delayed because it is not allowed to preempt any process $x$ that excludes some other A-h-k-a process $a_j$ which has a latitude that is less than both $x$ and $a_i$'s latitude, because that may cause $a_j$ to be blocked by the duration of more than one process with greater latitude. An example of this case is shown in FIG. 20G.}

Case 7:

if $\exists p, p \in P\text{-}g$:

$R_p \leq t \wedge \neg(e'(p) \leq t) \wedge L_p \leq L_{ai}$ $\wedge \neg (s'(a_i) < t \wedge (a_i \text{ cannot\_be\_preempted\_by } p))$ $\wedge \not\exists p_i, _{pi} \in P\text{-}g: s(p_i) \leq s(p) \wedge \neg(e'(p_i) < t)$ $\wedge \neg(s(p_i) < s(p) \wedge e(p) < e(p_i))$ then Delay $a_i$;

{-in Case 7: $a_i$ is delayed so that it can be preempted by a P-g process $p$ that has a latitude that is less than or equal to $a_i$'s latitude, when $a_i$ does not exclude $p$ and does not exclude any A-h-k-a process with a latitude that is shorter than $p$'s latitude, and there does not exist any P-g process $p_i$ that has not completed such that $p_i$ is ordered before $p$ and $p$ does not preempt $p_i$ in the pre-run-time schedule. An example of this case is shown in FIG. 20H.} end{if}

Select, among all processes $a_i \in A\text{-}h\text{-}k\text{-}a$, such that $a_i$ as already arrived and not yet completed, and $a_i$ is NOT Delayed, the process which has the shortest deadline. If more than one process is thus selected, select among them the process that has the smallest index. end;

return to Main Run-Time Scheduler;

The A-h-k-a Scheduler has the following properties:

Property 1. Each P-g process $p$'s execution can only be delayed by A-h-k-a processes that have less latitude than $p$'s latitude. A P-g process will never be delayed by any A-h-k-a process that has a greater or equal latitude.

Property 2. Any A-h-k-a process $a_i$ cannot be blocked by more than one critical section belonging to A-h-k-a processes that have deadlines greater than $a_i$'s deadline.

Property 3. No deadlocks can ever occur.

Property 4. Each P-g process $p$ will always be completed on or before $e(p)$, that is, the end of the time slot allocated to $p$ in the pre-run-time schedule.

Example 11.

Continuing with the set of processes in Examples 1–10 above, suppose that A-h-k-a process $a_2$ makes a request at time 99. FIG. 6 is an illustration of this case, showing a possible run-time execution of the A-h-k-a processes $a_0$, $a_1$, $a_2$, $a_9$, scheduled by the A-h-k-a Scheduler Subroutine together with the P-h-k and P-s-k processes described in FIG. 3, during the run-time phase.

Because $s(\text{newp}_{31}) = 100 \geq t = 99$ $\wedge$ $a_2$ excludes $\text{newp}_3 \wedge L_{a2} = d_{a2} = 239 \geq L_{newp3} = d_{newp3} - r_{newp3} = 115 - 100 = 15$
$\wedge e(p_3) - t = 114 - 99 = 15 < c_{a2} + c_{p3} + c_{a0} + C_{a1} = 10 + 10 + 2 + 2 = 24$, the conditions in Case 1 of the A-h-k-a Scheduler Subroutine are true, so $a_2$ is delayed.

(If $a_2$ is allowed to start at time 99, then $\text{newp}_3$ would miss its deadline. This is because $a_2$ excludes $\text{newp}_3$, once it starts, it cannot be preempted by $\text{newp}_3$, thus its execution will occupy a portion of the time frame reserved by $\text{newp}_3$ in the pre-run-time schedule which only includes reserved processor capacity for itself and A-h-k-a processes with shorter deadlines, which are $a_0$ and $a_1$.)

Suppose that both $a_0$ and $a_1$ make requests at time 130, then $a_0$ will execute from time 130 to 132, and $a_1$ will execute from time 132 to 134, both using processor capacity that was reserved for them in $p_6$'s reserved time frame.

$a_2$ will be executed after $\text{newp}_3$, $p_6$, $p_7$, as it's latitude $L_{a2} = d_{a2} = 239$ is greater than the latitudes of $\text{newp}_3$, $p_6$, $p_7$.

□

Note that an A-h-k-a process $a_i$ may be blocked from the start time to the end time of some critical section of a P-g process in the pre-run-time schedule.

One can easily determine the maximum time that any A-h-k-a process can be delayed by any P-g process with a simple inspection of the pre-run-time schedule. One can also easily make changes to a pre-run-time schedule in order to avoid any excessive delay of an A-h-k-a process $a_i$ that may be caused by preemptions of a P-g process's critical section by other P-g processes.

Above, a P-g process $p_1$ has been allowed to be preempted by some other P-g process $p_2$, even if this may cause some A-h-k-a process a to be blocked by the duration of two critical sections belonging to two P-g processes $p_1$ and $p_2$ which both have latitudes that are greater than a's latitude. This provides greater flexibility to the scheduling of P-g processes.

However, it is easy to guarantee that any A-h-k-a process a cannot be blocked by the duration of two critical sections belonging to two P-g processes $p_1$ and $p_2$ which both have latitudes that are greater than a's latitude. To guarantee this, all one needs to do is the following, for all pairs of P-g processes $p_1$ and $p_2$, if $p_1$ excludes some A-h-k-a process a, and $L_{p2} \geq L_a$, then add the exclusion relation $p_1$ excludes $p_2$.

If the potential run-time overhead of the A-h-k-a Scheduler in the integration approach is compared with the overhead of methodss that schedule all the tasks at run-time, the following may be noticed:

(a) With the integration approach, the number of processes that the A-h-k-a Scheduler needs to handle, should be very small. This is because, in most real-time systems, the bulk of the computation is performed by periodic processes, while the number of asynchronous processes with hard deadlines is usually very small. In addition a significant portion of the asynchronous processes will be transformed into periodic processes when using this approach.

(b) The interarrival times of A-h-k-a processes that are not converted into new P-h-k processes are likely to be long.

(c) A significant portion of the parameters used by the A-h-k-a Scheduler to make scheduling decisions, are known before run-time, so one can pre-compute major portions of the conditions that are used for decision making, hence the amount of computation that needs to be performed for scheduling purposes at run-time can be minimized.

Thus the run-time overhead of the A-h-k-a Scheduler is believed to be by far smaller than the overhead of methods that schedule all the tasks at run-time.

The Main Run-Time Scheduler

At run-time, the order of the execution of any pair of guaranteed periodic processes, i.e., P-h-k or P-s-k processes is kept consistent with the order of that pair of processes in the pre-run-time schedule.

A-s-u processes are scheduled at a lower priority than the A-h-k-a, P-h-k, P-s-k, and A-s-k processes. That is, A-s-u processes are executed only when there does not exist any process with known characteristics, i.e., A-h-k-a, P-h-k, P-s-k, or A-s-k process, that is ready for execution. If more than one A-s-u process are competing for execution, the process with the shortest deadline will be chosen for execution. An A-s-u process is not allowed to have any precedence relation with any other process. An A-s-u process $a_i$ is not allowed to have any exclusion relation of the form $a_i$ excludes x where x is an A-h-k-a, P-h-k, P-s-k or A-s-k process. These restrictions are imposed in order to prevent A-s-u processes from causing any delay to processes with known characteristics; so that one can guarantee that all the hard deadlines will be satisfied, and also provide firm response time guarantees for all the processes with known characteristics.

For any P-g process $p_1$ and any P-g process $p_2$, if $s(p_1) < s(p_2) < e(p_2) < e(p_1)$, then $p_2$'s time slot is nested within $p_1$'s time slot in the pre-run-time schedule.

Main-Run-Time-Scheduler Method:

At any time t:

if some process x has arrived at time t, or has completed at time t, or if t is both the release time and start time in the pre-run-time schedule for some P-g process p, i.e., $t = R_p = s(p)$ then execute the Main-Run-Time-Scheduler as follows:

execute the A-h-k-a-Scheduler-Subroutine;

{the A-h-k-a Scheduler-Subroutine was defined earlier} if some A-h-k-a process $a_i$ is selected for execution at time t by the A-h-k-a Scheduler then execute $a_i$ else begin if $\exists p, p \in P - g : s'(p) \leq t \wedge \neg(e'(p) \leq t) \wedge \not\exists p_i,$ $p_i \in P - g : R_{p_i} \leq t \wedge \neg(e'(p_i) \leq t) \wedge s(p) \leq s(p_i) \wedge e(p_i) < e(p)$ {there exists p that has started and has not completed, and there does not exist any other $p_i$ that is ready and has not completed, such that $p_i$'s time slot is nested within p's time slot in the pre-run-time schedule} then continue to execute p.

else if $\exists p,$ $p \in P - g : R_p \leq t \wedge \neg(e'(p) \leq t) \wedge \not\exists p_i, p_i \in P - g : \neg(e'(p_i) \leq t) \wedge$ $s(p_i) \leq s(p) \wedge \neg(s(pi) \leq s(p) \wedge e(p) < e(p_i)) \wedge \not\exists p_j, p_j \in$ $P - g : R_{p_j} \leq t \wedge \neg(e'(p_j) \leq t) \wedge s(p) \leq s(p_j) \wedge e(p_j) < e(p)$ {there exists p that is ready and has not completed, and there does not exist any other $p_i$ that has not yet completed, such that $p_i$ is ordered before p in the pre-run-time schedule, and p's time slot is not nested within $p_i$'s time slot in the pre-run-time schedule, and there does not exist any other $p_j$ that is ready and has not completed, such that $p_j$'s time slot is nested within p's time slot in the pre-run-time schedule} then execute p else if $\exists a_i, a_i \in A - s - k : R_{a_i} \leq$ $t \wedge \neg(e'(a_i) \leq t) \wedge \not\exists x : (s'(x) < t \wedge \neg(e'(x) \leq t) \wedge ((x \text{ excludes } a_i) \vee$ $(\exists a_j, a_j \in A - s - k : s'(x) < t \wedge \neg(e'(x) \leq t) \wedge$ $x \text{ excludes } a_j \wedge L_{a_j} < L_x \wedge L_{a_j} < L_{a_i}))$ {there exists A-s-k process $a_i$ that is ready and has not completed, and there does not exist any other process x such that x excludes $a_i$ or x excludes some process $a_j$ such that $a_j$ has a latitude that is less than both x's and $a_i$'s latitude, and x has started but not completed} then select among them, a process $a_i$ that has the shortest deadline;

if among such processes there are some that have already started, then choose a process that has already started; and execute $a_i$;

else if $\exists a_i, a_i \in A - s - u : R_{a_i} \leq$ $t \wedge \neg(e'(a_i) \leq t) \wedge \not\exists x : (s'(x) < t \wedge \neg(e'(x) \leq t) \wedge ((x \text{ excludes } a_i) \vee$ $(\exists a_j, a_j \in A - s - u : s'(x) < t \wedge \neg(e'(x) \leq t) \wedge$ $x \text{ excludes } a_j \wedge L_{a_j} < L_x \wedge L_{a_j} < L_{a_i}))$ {there exists A-s-u process $a_i$ that is ready and has not completed, and there does not exist any other process x such that x excludes $a_i$ or x excludes some process $a_j$ such that $a_j$ has a latitude that is less than both x's and $a_i$'s latitude, and x has started but not completed} then select among them, a process $a_i$ that has the shortest deadline;

if among such processes there are some that have already started, then choose a process that has already started; and execute $a_i$;

end;

Example 12

Continuing with the set of processes in Examples 1–11 above, assume the following asynchronous process all with a soft deadline and unknown characteristics (A-s-u process). (all's characteristics are only known after its arrival.)

$a_{11}$: $c_{a11}$=0, $d_{a11}$=300.

Assume also that A-s-u process $a_{11}$ makes a request at time 190; A-h-k-a process $a_2$ makes a request at time 191; A-s-k process $a_{10}$ makes a request at time 196; and A-h-k-a processes $a_0$ and $a_1$ make requests at time 200 FIG. 7 illustrates an example of this case, in particular a possible run-time execution of the A-s-u process all, and the A-s-k process $a_{10}$, scheduled by the Main Run-Time Scheduler together with the A-h-k-a processes $a_0$, $a_1$, $a_2$, and the P-h-k and P-s-k processes described with regard to FIG. 3, [in Example 12,] during the run-time phase.

At time 190 $a_{11}$ will be put into execution as there are no other processes that are ready for execution. At time 191 $a_2$ will be delayed because the conditions of Case 1 of the A-h-k-a Scheduler will be true. Note that a2 excludes newp3, and $L_{newp3}$<$L_{a2}$; if a2 is allowed to execute at time 191, it will cause newp3 to miss its deadline if $a_0$ and $a_1$ also preempt newp3. At time 196 $a_{10}$ will preempt $a_{11}$ as A-s-k processes are scheduled before A-s-u processes. At time 200 $a_0$ will preempt alo as A-h-k-a processes are scheduled before A-s-k processes. all will execute from time 190 to 196; alo will execute from time 196 to 200; $a_0$ will execute from time 200 to 202; al will execute from time 202 to 204; $newp_3$ will execute from time 204 to 214. As $L_{p8}$<$L_{a2}$, $L_{p5}$<$L_{a2}$, and $L_{p4}$<$L_{a2}$; $p_8$ will preempt $a_2$ at time 220; $p_8$, $p_5$, $p_4$ will execute from time 220 to 278; $a_2$ will resume execution from time 278 to 282; $a_{10}$ will resume execution from time 282 to 288; all will resume execution from time 288 to 292. □

Note that each process may be completed earlier than the time indicated in the pre-run-time schedule, since the time that is reserved for each asynchronous process with a shorter deadline in a guaranteed periodic process's time frame in the pre-run-time schedule will not be used by that asynchronous process if it does not arrive during that time frame.

Example 13.

In Example 3, when using the procedure for converting a set of asynchronous processes into a set of new periodic processes, threshold($a_3$) was set to 2.5, resulting in the A-h-k process $a_3$ being converted into a new periodic process $newp_3$.

Now assume that threshold($a_3$) is set to an arbitrary large value, say 50, that would guarantee that $a_3$ will not be converted into a periodic process.

In the case that A-h-k process $a_3$ remains asynchronous, because the latitude of $a_3$, $L_{a3}$=$d_{a3}$=114, as well as the latitudes of $a_0$ and $a_1$ are greater than the latitudes of the periodic processes $p_4, p_6, p_7$ in meeting their respective deadlines, the worst-case computation times of $p_4$, $p_6$, $p_7$ should be adjusted to leave "room" for $a_0$, $a_1$ and $a_3$'s worst-case computation time as follows:

$c'_{p4}=c_{p4}c_{a0}+c_{a1}+c_{a3}=26+2+2+10=40$ $c=c_{p6}c_{a0}+c_{a1}+c_{a3}=26+2+2+10=40$ $c'_{p7}=c_{p7}c_{a0}+c_{a1}+c_{a3}=16+2+2+10=30$

The pre-run-time scheduler will first construct the feasible pre-run-time schedule illustrated in FIG. 8 for the set of P-g processes $p_4, p_5, p_6, p_7$. Then the simulation procedure for determining the worst-case response time of an A-h-k-a process can be used to determine $a_0$, $a_1$, $a_2$, $a_3$, $a_9$'s worst-case response time. A-h-k-a process $a_3$'s worst-case response time happens when $a_3$ arrives at time 7, while $a_2$ which excludes $a_3$ arrived one time unit before $a_3$ at time 6. If $a_0$, $a_1$ which have less latitude than $a_3$ in meeting their respective deadlines, arrive at the same time 6, $a_0$ will preempt $a_2$ and execute from time 7 to time 9, $a_1$ will execute from time 9 to time 11, $a_2$ will continue its execution from time 11 to time 20, $p_8$ will first execute from time 20 to time 30; at time 30 $p_8$ will be preempted by $p_5$ which executes from time 30 to time 46; at time 46 $p_8$ will continue its execution from time 46 to time 52. At time 52, because $L_{a3}$=$d_{a3}$=114<$L_{p4}$=$d_{p4}$-$r_{p4}$=200-0=200, $a_3$ will execute from time 52 to time 62. A-h-k-a process $a_3$'s worst-case response time $RE_{a3}$={$RE(a_3, t_s)$}=$RE(a_3, 7)$=e'($a_3$)−$R_{a3}$=62−7=45≤$d_{a3}$=114. Similarly, one can verify that the worst-case response times of all the other asynchronous processes are all less than or equal to their respective deadlines, as shown in FIG. 8.

The embodiments described herein are advantageous methods of the integration approach compared with methods that perform all scheduling activities at run-time. It should be noted that existing methods or protocols that perform all scheduling activities at run-time are not able to guarantee the schedulability of the set of processes given in these examples. There are many reasons for this, including:

1. Prior art run-time scheduling methods are not capable of finding optimal schedules involving critical sections, except for the simplest problem instances, because not enough time is available to the scheduler at run-time.

2. Prior art run-time scheduling methods cannot handle precedence constraints, release time and exclusion constraints simultaneously in an efficient way.

3. Prior art run-time scheduling methods are unable to take full advantage of the knowledge about processes characteristics that is available before run-time. For example, no prior art run-time scheduling method can completely avoid blocking of a periodic process with less latitude by a asynchronous process with greater latitude, which the integration approach is capable of doing, as shown in the examples above. As another example, when determining the worst-case response times of asynchronous processes, no prior art run-time scheduling method can completely avoid making the overly pessimistic assumption that, for each process, all the periodic processes with shorter deadlines can arrive at the same time to delay that process. In contrast, the integration method in accordance with the present invention can avoid making such an overly pessimistic assumption, as shown in the examples where a simulation procedure can obtain tighter worst-case response times for asynchronous processes, by taking advantage of the knowledge of the positions of the periodic processes in the pre-run-time schedule.

If the potential run-time overhead of the Main Run-Time Scheduler in the integration method is compared with with the overhead of methods that schedule all the tasks at run-time, the following will be noticed:

(a) The Main Run-Time Scheduler is much simpler, and the amount of computation needed for scheduling purposes is much smaller, compared with most methods that schedule all the tasks at run-time. This is because most of the important scheduling decisions have already been made before run-time. In particular, the relative ordering of P-h-k and P-s-k processes that usually form the bulk of the computation in most real-time applications, was determined before run-time when the pre-run-time schedule was computed.

(b) Since at run-time, the execution order of P-h-k and P-s-k processes is the same as the relative ordering of those processes in the pre-run-time schedule, one would know exactly which guaranteed periodic process may preempt which other guaranteed periodic process at run-time. Thus one can use this information to minimize the amount of context switching. Thus it is believed that the run-time overhead of the Main Run-Time Scheduler should be by far smaller than the overhead of methods that schedule all the tasks at run-time.

Using the Present Invention With Multiple Processors

The methods described above can be used for scheduling processes with exclusion relations, precedence relations, and offset constraints, release time, worst-case computation time, deadline constraints, on more than one processor.

There are many possible ways that would allow one to use the methods with more than one processor. The following is just one possible set of changes to the procedures described earlier that would allow one to use the methods for scheduling processes on more than one processor. The use of the methods with multiple processors is illustrated in Example 14.

As stated earlier, instead of using a single processor method such as the method in the aforenoted 1990 article by Xu and Parnas in the procedure for constructing a feasible pre-run-time schedule for a given set of periodic processes with offsets, one should use a multiple processor scheduling method, such as the method in the aforenoted 1993 article by Xu in that procedure.

One simple strategy, that will be used in the embodiment described below, is to set the release time $r_{pi}$ of every periodic process $p_i$ to be equal to the beginning time of its time slot in the pre-run-time schedule, i.e., $r_{pi}=s(p_i)$. This ensures that every periodic process' actual execution will not start earlier than the beginning time of its time slot, i.e., $r_{pi} \leq s'(p_i)$. This could prevent multiple processor anomalies that could be caused by the following situation. Some processes end earlier, and a first process that excludes a second process with a relatively short deadline is executed earlier, resulting in the first process' execution combining with the execution of a third process on another processor that also excludes the second process to increase the time interval in which the second process is blocked from execution. It is not difficult to design alternative methods that would allow each periodic process to start execution at a time earlier than the beginning of its time slot, while preventing such anomalies. Likewise, in the design of the Multiple Processor A-h-k-a Scheduler described below, there are many possible alternative strategies that would allow some more flexibility in scheduling the processes, however, this disclosure would be of too great length if every possible improvement is described.

The Multiple Processor A-h-k-a Scheduler and Multiple Processor Main-Run-Time Scheduler can be designed as follows.

Each time the Multiple Processor Run-Time Scheduler is executed, it will first try to schedule A-h-k-a processes according to the procedure below.

For any A-h-k-a process $a_i$ and any P-g process pi, it will be said that "$a_i$ cannot be preempted by $p_i$", if the following conditions should hold: ($a_i$ excludes $p_i$)∨ (∃$a_j$,$a_j$ ∈A-h-k-a: $L_{aj}<L_{pi}$∧ $a_i$ excludes $a_j$)

For any pair of P-g processes $p_1$ and $p_2$, it will be said that "the time slot of $p_1$ overlaps with the time slot of $p_2$", if the following conditions should hold: $(s(p_1) \leq s(p_2) < e(p_1)) \vee (s(p_2) \leq s(p_1) < e(p_2))$ The Multiple Processor A-h-k-a Scheduler Method functions as part of the Multiple Processor Main-Run-Time Scheduler to be described below.

Multiple Processor A-h-k-a-Scheduler Method:

At any time t:

if some A-h-k-a process $a_i$ has arrived at time t, or if some process $x_i$ completes its computation at time t or if t is both the release time and start time in the pre-run-time schedule for some P-g process p, i.e., $t=R_p=s(p)$ then for every processor k:

begin for each A-h-k-a process $a_i$ that has already arrived and not yet completed, i.e., $R'(a_i) \leq t \wedge \neg(e'(a_i) \leq t)$, check if $a_i$ satisfies the following conditions, Case 1: if on any processor k, ∃p,p ∈P-g:

$s'(p) \leq t \wedge$ ($a_i$ cannot_be_preempted_by p)∧ $L_{ai} \leq L_p$

∧ (∄$p_m$,$p_m$∈P-g:t<$s'(p_m)$∧ $e(p_m) \leq s(p) \wedge L_{ai}<L_{pm} \wedge$ (∄$p_1$∈P-g:

$p_1$ excludes $a_i$∧ ($p_1$'s time slot overlaps with $p_m$'s time slot))

∧ (there does not exists any interval [t, $t_2$] on processor k, such that:

$$t<t_2 \leq s(p)$$

∧ ∄$p_1$, $p_1$ ∈P-g: any portion of $p_1$'s time slot is mapped to any portion of the interval [t, $t_2$] on the time axis corresponding to processor k in the pre-run-time schedule)

$$\bigwedge (\not\exists\ p_j, p_m \in P - g:\ p_j\ \text{excludes}\ a_i \wedge (p_j\text{'s time slot overlaps with }[t, t2]))\bigwedge$$

$$(t_2 - t) \geq c_{a_i} +$$

$$\sum_{a_k \in A-h-k-a \wedge L_{a_k} < L_p \wedge (\neg(0 \leq R'(a_k)) \vee (R'(a_k) \leq t \wedge \neg(e'(a_k) \leq t)) \vee (R'(a_k) + \min_{a_k} < e(p)))} \left\lceil \frac{t_2 - t}{\min_{a_k}} \right\rceil \cdot c_{a_k}$$

then Delay $a_i$;

In Case 1: $a_i$ is delayed either if there exists the possibility that the immediate execution of $a_i$ may cause a P-g process p with less latitude to be delayed (as shown in FIG. 20A); or, if there exists the possibility that it may cause some A-h-k-a process $a_j$ to be blocked for the duration of two processes $a_i$ and p which both have greater latitude compared with $a_j$'s latitude (as shown in FIG. 20B).

Case 2: if on any processor k, $\exists x, x \in P\text{-}g \vee x \in A\text{-}h\text{-}k\text{-}a$:

$s'(x) < t \wedge \neg(e'(x) \leq t) \wedge$ excludes $a_i$ then Delay $a_i$;

In Case 2: $a_i$ is delayed because it is not allowed to start its execution if there exists any process x that excludes $a_i$ that has started but not yet completed (as shown in FIG. 20C).

Case 3: if on processor k $\exists x, x \in P\text{-}g \vee x \in A\text{-}h\text{-}k\text{-}a$:

$s'(x) < t \wedge \neg(e'(x) \leq t) \wedge L_x < L_{ai}$ then $a_i$ is ineligible to execute at time t on processor k;

In Case 3: $a_i$ is ineligible to execute at time t on processor k because it is not allowed to preempt any process x that has less or the same latitude as $a_i$ (as shown in FIG. 20D).

Case 4: if on processor k, $\exists a_j, p, a_j \in A\text{-}h\text{-}k\text{-}a, p \in P\text{-}g$:

$s'(p) \geq t \wedge s'(a_j) < t \wedge \neg(e'(a_j) \leq t)$ $\wedge\ a_j$ excludes $p \wedge L_p \leq L_{ai}$ then $a_i$ is ineligible to execute at time t on processor k In Case 4: $a_i$ is is ineligible to execute at time t on processor k because it is not allowed to preempt any A-h-k-a process $a_j$ which excludes a P-g process p with less or equal latitude compared with $a_i$'s latitude. (as shown in FIG. 20E)

Case 5: on processor k, if $\exists x, a_j, x \in A\text{-}h\text{-}k\text{-}a \vee x \in P\text{-}g$, $a_j \in A\text{-}h\text{-}k\text{-}a$:

$s'(x) < t \wedge \neg(e'(x) \leq t)$ $\wedge\ x$ excludes $a_j$ $\wedge\ L_{aj} < L_x \wedge L_{aj} < L_{ai}$ then $a_i$ is ineligible to execute at time t on processor k.

In Case 5: $a_i$ is ineligible to execute at time t on processor k because it is not allowed to preempt any process x that excludes some other A-h-k-a process $a_j$ which has a latitude that is less than both x and $a_i$'s latitude, because that may cause $a_j$ to be blocked by the duration of more than one process with greater latitude (as shown in FIG. 20G).

Case 6: if on processor k $\exists p, p \in P\text{-}g$:

$R_p \leq t \wedge \neg(e'(p) \leq t) \wedge L_p \leq L_{ai}$ $\wedge \neg(s'(a_i) < t \wedge (a_i\ \text{cannot\_be\_preempted\_by}\ p))$ $\wedge\ \not\exists p_i, p_i \in P\text{-}g:\ s(p_i) \leq s(p) \wedge \neg(e'(p_i) < t)$ $\wedge \neg(s(p_i) \leq s(p) \wedge e(p) < e(p_i))$ then $a_i$ is ineligible to execute at time t on processor k;

In Case 6: $a_i$ is ineligible to execute at time t on processor k so that it can be preempted by a P-g process p that has a latitude that is less than or equal to $a_i$'s latitude, when $a_i$ does not exclude p and does not exclude any A-h-k-a process with a latitude that is shorter than p's latitude (as shown in FIG. 20H).

end;

For each processor k, select, among all processes $a_i$ E A-h-k-a, such that $a_i$ has already arrived and not yet completed, and $a_i$ is NOT Delayed, and $a_i$ is NOT ineligible to execute at time t on processor k, the process which has the shortest deadline and execute that process on processor k. If more than one process is thus selected, select among them the process that has the smallest index.

end;

return to Multiple Processor Main Run-Time Scheduler;

Multiple Processor Main-Run-Time-Scheduler Method:

At any time t:

if some process x has arrived at time t, or has completed at time t, or if t is both the release time and start time in the pre-run-time schedule for some P-g process p, i.e., $t = R_p = s(p)$ then execute the Multiple Processor Main-Run-Time-Scheduler as follows:

execute the Multiple Processor A-h-k-a-Scheduler;

For each processor k, if some A-h-k-a process $a_i$ was selected for execution at time t on processor k by the A-h-k-a Scheduler then execute $a_i$ else begin
  if on processor k,
    $\exists p, p \in P\text{-}g: s'(p) \leq t \wedge \neg(e'(p) \leq t)$
    (there exists p that has started and has not completed) then
      continue to execute p.
else
  if on processor k,
    $\exists p, p \in P\text{-}g: R_p \leq t \wedge \neg(e'(p) \leq t)$
    (there exists p that is ready and has not completed)
    then execute p
else
  if $\exists a_i, a_i \in A\text{-}s\text{-}k: R_{ai} \leq t \wedge \neg(e'(a_i) \leq t)$
    $\wedge\ \not\exists x: (s'(x) < t \wedge \neg(e'(x) < t) \wedge ((x\ \text{excludes}\ a_i)$
    $\vee\ (\exists a_j, a_j \in A\text{-}s\text{-}k: s'(x) < t \wedge \neg(e'(x) < t) \wedge x\ \text{excludes}\ a_j$
    $\wedge\ L_{aj} < L_x \wedge L_{aj} < L_{ai}))$ (there exists A-s-k process $a_i$ that is ready and has not completed, and there does not exist any other process x such that x excludes $a_i$ or x excludes some process $a_j$ such that $a_j$ has a latitude that is less than both x's and $a_i$'s latitude, and x has started but not completed) then select among them, a process $a_i$ that has the shortest deadline; if among such processes there are some that have already started, then choose a process that has already started; and execute ai;)

else if $\exists a_i, a_i \epsilon A$-s-u: $R_{ai} \leq t \wedge \neg(e'(a_i) \leq t)$ $\wedge \not\exists x: (s'(x) < t \wedge \neg(e'(x) < t) \wedge ((x \text{ excludes } a_i)$ $\vee (\exists a_j, a_j \epsilon A$-s-u: $s'(x) < t \wedge \neg(e'(x) \leq t) \wedge x$ excludes $a_j$ $\wedge L_{aj} < L_x \wedge L_{aj} < L_{ai}))$ (there exists A-s-u process $a_i$ that is ready and has not completed, and there does not exist any other process x such that x excludes $a_i$ or x excludes some process $a_j$ such that $a_j$ has a latitude that is less than both x's and $a_i$'s latitude, and x has started but not completed) then select among them, a process $a_i$ that has the shortest deadline; if among such processes there are some that have already started, then choose a process that has already started; and execute $a_i$;

end;

The multiple processor simulation method for determining the worst-case response time of A-h-k-a processes can be designed as follows:

Multiple processor method for computing the worst-case response time of an A-h-k-a process $a_i$ corresponding to a feasible pre-run-time schedule of guaranteed periodic processes consisting of an initial part of the pre-run-time schedule $S_0(to)$, in the interval $[0, t_0]$; and a repeating part of the pre-run-time schedule $S_{LCM}(prd_{LCM})$, in the interval $[t_0, t_0 + prd_{LCM}]$:

fail:=false;

for $t_s := 0$ to $t_0 + prd_{LCM} - 1$ do begin

For each A-h-k-a process $a_b$, such that $a_b \epsilon$ A-h-k-a $\wedge L_{ab} > L_{ai} \wedge \exists x_k, x_k \epsilon$ A-h-k-a $\vee x_k \epsilon$ P-g: ab excludes $x_k$ $\wedge L_{xk} \leq L_{ai}$, do the following:

let $a_b$ arrive at time $t_s - 1$, and use the Multiple Processor A-h-k-a Scheduler and Multiple Processor Main Run-Time Scheduler to schedule $a_b$ and $a_i$ to obtain a response time of $a_i$, called $RE_1(a_i, t_s, a_b)$, corresponding to each ab according to the assumptions (1)–(6) below, with the additional assumption that $a_b$ can always start its execution at time $t_s - 1$ (including when $t_s = 0$) except if at time $t_s - 1$ there exists some periodic process p, such that $t_s < s(p)$ and (ab cannot_be_preempted_by p) $\wedge L_{ab} \geq L_p$, and executing $a_b$ at time $t_s - 1$ may cause p to miss its deadline, that is, $a_b$ is delayed by the conditions in Case 1 of the Multiple Processor A-h-k-a Scheduler. At time $t = t_s - 1$, assume that the condition "$s'(p) \geq t$" is true for every periodic process p such that $t_s < s(p)$ when checking whether $a_b$ should be delayed by the conditions of Case 1 of the Multiple Processor A-h-k-a Scheduler. When computing $RE_1(a_i, t_s, a_b)$, if $\exists p_l, p_l \epsilon$ P-g $\wedge s(p_l) \leq t_s < e(p_l)$, then assume that $p_l$ has already completed at time $t_s - 1$, that is, this instance of $p_l$ will not have any effect on $a_b$, $a_i$, or any other process in the system.

(Let each A-h-k-a process $a_b$ that can possibly block $a_i$, arrive at time $t_s - 1$ and determine which one among them will block $a_i$ for the greatest amount of time.)

After obtaining $RE_1(a_i, t_s, a_b)$ for every such ab, use the Multiple Processor A-h-k-a Scheduler and Multiple Processor Main Run-Time Scheduler to schedule $a_i$ to obtain another response time of $a_i$, called $RE_2(a_i, t_s)$, according to the assumptions (1)–(6) below, with the additional assumption that no A-h-k-a process $a_b$, such that $a_b \exists$ A-h-k-a $\wedge L_{ab} > L_{ai} \wedge \vee x_k, x_k \epsilon$ A-h-k-a $\vee x_k \epsilon$ P-g: $a_b$ excludes $x_k$ $\wedge L_{xk} \leq L_{ai}$ had ever arrived. When computing $RE_2(a_i, t_s)$, if $\exists p_l, p_l \epsilon$ P-g $\wedge s(p_l) \leq t_s < e(p_l)$, then assume that $s'(p_l) = s(p_l) \wedge e'(p_l) = e(p_l)$; {i.e., $p_l$ started at the beginning of its time slot and will complete its computation at the end of its time slot in the pre-run-time schedule that was computed using adjusted computation times}.

(1) $a_i$ arrives in the system at time $t_s$.

(2) Unless $a_i$ is delayed because of the conditions in Case 1 of the Multiple Processor A-h-k-a Scheduler, (see (3) below), let the A-h-k-a processes $a_j$ in the set $\{a_j L_{aj} \leq L_{ai} \wedge a_j$ excludes $a_i\}$ arrive one by one in a serial sequence such that each process in the set arrives exactly at the same instant that the process before it in the sequence has just completed, with the first process in the sequence arriving at the time that $a_b$ has just completed if $a_b$ is able to block $a_i$, and at the earliest time t, $t_1 \leq t$ that it can be executed, if $a_b$ does not block $a_i$; let every other A-h-k-a process $a_j$, such that $L_{aj} \leq L_{ai}$ arrive at the time that the last process in the above serial sequence has completed; or at the following instants in time: $R_{aj}(k) = t_s + k^* \min_{aj}$, $$k = 0, 1, 2, \ldots, \left\lfloor \frac{d_{ai}}{\min_{aj}} \right\rfloor,$$

if no such process in the above set exist, and be scheduled before $a_i$ whenever $a_i$ and $a_j$ have both arrived and $a_i$ has not yet started. If $a_j$ is delayed by any of the conditions in Cases 1–6 of the Multiple Processor A-h-k-a Scheduler then let $a_i$ be delayed by the same amount of time.

For each such $a_j$'s subsequent arrival times, use the arrival times: $R_{aj}(k) = t_s + k^* \min_{ai}$, and whenever there is more than one such process arriving at a time that any such process is executing or has arrived but not completed, modify their arrival times as described above.

(All A-h-k-a processes that have shorter deadlines and that exclude $a_i$ arrive in a serial sequence that maximizes the time that $a_i$ is excluded, all other A-h-k-a processes whose deadlines are shorter or equal to $a_i$'s deadline arrive at the end of that sequence if any, and are put into execution before $a_i$.

(3) Whenever the conditions in Case 1 of the Multiple Processor A-h-k-a Scheduler become true for $a_i$ and some P-h-k process p at some time t, i.e.: if on any processor k, $\exists p, p \epsilon$ P-g:

$s'(p) \geq t \wedge (a_i$ cannot_be_preempted_by p) $\wedge L_{ai} \geq L_p$ $\wedge (\not\exists p_m, p_m \epsilon$ P-g: $t < s'(p_m) \wedge e(p_m) > s(p) \wedge L_{ai} < L_{pm} \wedge (\not\exists p_l \epsilon$ P-g: $p_l$ excludes $a_i \wedge (p_1$'s time slot overlaps with $p_m$'s time slot))

$\wedge$ (there does not exists any idle interval $[t, t_2]$ on some processor k, such that:

$t < t_2 < s(p) \wedge$ $(\nexists \ p_j, p_m \in P - g: \ p_j \text{ excludes } a_i \wedge (p_j\text{'s time slot overlaps with } [t, t2])) \wedge$ $(t_2 - t) \geq c_{a_i} +$ $$\sum\nolimits_{a_k \in A - h - k - a \wedge L_{a_k} < L_p \wedge (\neg(0 \leq R'(a_k)) \vee (R'(a_k) \leq t \wedge \neg(e'(a_k) \leq t)) \vee (R'(a_k) + \min_{a_k} < e(p)))} \left\lceil \frac{t_2 - t}{\min_{a_k}} \right\rceil \cdot c_{a_k}$$

let t also be the earliest time that the conditions in Case 1 become true for that instance of p and $a_i$, then for every other A-h-k-a process $a_j$ that belongs to the following set:

$\{a_j|a_j \epsilon A\text{-h-k-a} \wedge j \neq i \wedge L_{aj} \leq L_{ai} \wedge ((\neg(0 \leq R'(a_j)) \vee (R'(a_j) \leq t \wedge \neg(e(a_j) \leq t)) \vee (R'a_j) + \min_{aj} < s(p))) \vee (s'(a_b) \leq t_s \wedge t-1 \leq e'(a_b \wedge s'(a_j) < t))\}$ ($a_j$ has a deadline that is shorter than or equal to $a_i$'s deadline and, either $a_j$ has never arrived; or $a_j$ has arrived but has not completed its computation; or $a_j$ may arrive again before time s(p); or at time t−1 $a_i$ was blocked by ab and $a_j$ started its execution before t), "delay" aj's arrival time to occur at the following time: let the A-h-k-a processes $a_j$ in the set $\{a_j|L_{aj} \leq L_{ai} \wedge a_j$ excludes $a_i\}$ arrive one by one in a serial sequence such that each process in the set arrives exactly at the same instant that the process before it in the sequence has just completed, with the first process in the sequence arriving at the time that p has just completed; let every other A-h-k-a process $a_j$, such that $L_{aj} \leq L_{aj}$ arrive at the time that the last process in the above serial sequence has completed; or at the completion time of p, e(p)', if no such processes in the above set exist, and be scheduled before $a_i$ whenever $a_i$ and $a_j$ have both arrived and $a_i$ has not yet started. If $a_j$ is delayed by any of the conditions in Cases 1–6 of the Multiple Processor A-h-k-a Scheduler, then let $a_i$ be delayed by the same amount of time. If at time s(p) the conditions in Case 1 of the Multiple Processor A-h-k-a Scheduler continue to be true for some other periodic process p', then $a_i$ should be delayed again, and the A-h-k processes $a'_j$ that satisfy the conditions of the formula for p' should also be delayed again in similar manner. For each such $a_j$, let only a single instance of $a_j$ arrive at the above times, even if originally there could be several instances of a same process $a_j$ that satisfy the conditions above.

For each such $a_j$'s subsequent arrival times after s(p), use the same arrival times that were determined in (2), i.e., $a_j$'s subsequent arrival times after s(p) will be: $R_{aj}(k) = t_s + k \cdot \min_{aj}$ such that $R_{aj}(k) > s(p)$, and whenever there is more than one such process arriving at a time that any such process is executing or has arrived but not completed, modify their arrival times as described above.

(If at time t there exists more than one process p for which the conditions of Case 1 are true for p and $a_i$, then let the above apply to the process p among them that has the latest s(p) time in the pre-run-time schedule.)

(if $a_i$ is delayed due to the conditions in Case 1, then an A-h-k-a process $a_j$ could delay $a_i$ by a maximum amount by arriving at the above described times.)

(4) If the end of the current instance of the repeating part of the pre-run-time schedule is reached, continue at the beginning of the next instance of the repeating part of the pre-run-time schedule.

(5) If $a_i$'s deadline dai is reached but $a_i$ has not yet completed its computation, then set fail:=true and exit from the procedure.

(6) If $a_i$'s computation is completed before its deadline $d_{ai}$, then record the completion time of $a_i$ as the response time of $a_i$ (either $RE_2$, ($a_i$, $t_s$, $a_b$) for the current $a_b$, or $RE_2(a_i, t_s)$ when no such $a_b$ is assumed to have arrived at time $t_s$−1).

After the response time RE1 ($a_i$, $t_s$, $a_b$) corresponding to every $a_b$ that may block $a_i$ has been computed, and the response time $RE_2(a_i,t_s)$ that assumed that no such $a_b$ had arrived and blocked $a_i$ has also been computed, set the response time of $a_i$ with arrival time $t_s$, $RE(a_i,t_s)$ to be equal to the greatest among them, i.e., $RE(a_i,t_s)=\max\{RE_1(a_i,t_s, a_b), RE_2(a_i,t_s)\}$, and exit from the current iteration of the loop for this value of $t_s$, and start the next iteration for $t_s:=t_s+1$.

end;

if not fail then $RE_{ai}:=\max\{RE(a_i, t_s)|t_s=0,1, \ldots, LCM-1\}$;

Assuming that the same adjusted_capacity function is used for adjusting the computation times of periodic processes, the Multiple Processor A-h-k-a Scheduler also has the following properties, similar to the properties of the version of the A-h-k-a Scheduler described earlier:

Property 1. Each P-g process p's execution can only be delayed by A-h-k-a processes that have less latitude than p's latitude. A P-g process will never be delayed by any A-h-k-a process that has a greater or equal latitude.

Property 2. Any A-h-k-a process $a_i$ cannot be blocked by more than one critical section belonging to A-h-k-a processes that have deadlines greater than $a_i$'s deadline.

Property 3. No deadlocks can ever occur.

Property 4. Each P-g process p will always be completed on or before e(p), that is, the end of the time slot allocated to p in the pre-run-time schedule.

Example 14

Suppose that a multiprocessor system consists of two processors, two asynchronous processes with hard deadlines and known characteristics (A-h-k processes): $a_A$ and $a_E$; and 3 periodic processes with hard deadlines and known characteristics (P-h-k processes) $p_B$, $p_C$, and $p_D$ as follows.

$a_A$: $c_{aA}=2, d_{aA}=8, \min_{aA}=8$;

$a_E$: $C_{aE}=2, d_{a1}=14, \min_{a1}=1,000$;

$p_B$: $r_{pB}=1$, $c_{pB}=3 d_{pB}=4, \text{prd}_{pB}=6, 0 \leq o_{pB} \leq 3$;

$p_C$: $r_{pC}=0$, $c_{pC}=1$, $d_{pC}=2, \text{prd}_{pC}=4$; $p_{pD}=0$;

$p_D$: $r_{pD}=0$, $c_{pD}=1$, $d_{pD}=1$, $prd_{pD}=3$, $0 \leq o_{pD} \leq 4$;

It is assumed that the application requires that $o_{pC}=0$, $0 \leq o_{pB} < 3$, and $0 \leq o_{pD} \leq 4$, and asynchronous process $a_A$ may make its first request at time 0. It is also assumed that the application requires the following relations be satisfied: $a_A$ excludes $p_D$, $p_D$ excludes $a_A$, $a_A$ excludes $p_B$, $p_B$ excludes $a_A$, $p_C$ excludes $p_D$, $p_D$ excludes $p_C$, $a_E$ excludes $p_B$, $p_B$ excludes $a_E$;

Suppose that when converting $a_A$ to a periodic process, when determining $d_{newpA}$:

$$d_{newpA} = c_{aA} + \text{conversion\_room}(a_A);$$

the following formula was used in the conversion_room function:

$$\text{conversion\_room}(a_A) = \left\lceil \frac{\sum_{p_j \in (S_p \cup S_P) \wedge d_{p_j} \leq d_{x_i}} \left\lceil \frac{d_{x_i}}{prd_{p_j}} \right\rceil * c_{p_j}}{m} \right\rceil +$$

$$\sum_{a_j \in S_a \wedge d_{a_j} \leq d_{x_i} \wedge i \neq j} \left\lceil \frac{d_{x_i}}{\min_{a_j}} \right\rceil * c_{a_j}$$

where m is the number of processors.

Then in the procedure for converting A-h-k processes into periodic processes, prior to entering the while loop, $d_{newpA}=c_A+(c_B+c_C+c_D)/m=2+(2+1+1)/2=4$. After the second iteration of the while loop, $d_{newpA}=c_A+[(c_C+c_D)/m]=2+(1+1)/2=3$. $prd_{newpA}=(d_A-d_{newpA}+1)=8-3+1=6$; $0 < o_{newpA} < prd_{newpA}=6-1=5$. Suppose further that the system designer wanted to increase the chances of $a_A$ being converted into a periodic process, so the threshold($a_A$) was assigned a low value of 0.5.

$RPC_{newpA}=c_{newpA}/prd_{newpA}=2/6=0.33$.

$RPC_{aj}=c_{aA}/\min_{aj}=2/8=0.25$.

As threshold($a_A$)*$RPC_{newpA}$=0.5*0.33<$RPC_{aA}$=0.25, the procedure will convert $a_A$ into a periodic process $newp_A$.

Suppose also that the system designer did not want $a_E$ to be converted into a periodic process, so threshold($a_E$) was assigned a high value of 50. The procedure will not convert $a_E$ into a periodic process.

If the method in the aforenoted 1993 article by Xu was used by the procedure for constructing a feasible pre-run-time schedule for a given pre-run-time schedule with offsets, it will find the feasible schedule for $newp_A$, $p_B$, $p_C$, and $p_D$, on two processors illustrated in FIG. 21, when the offsets are set to the following values: $o_{newpA}=2$, $o_{pB}=3$, and $o_{pD}=1$. The feasible schedule consists of a non-repeating initial schedule $S_0(1)$ for the interval [0,1], and a repeating schedule $S_{LCM}$ (12) that is of length equal to the Least Common Multiple of the periods of $newp_A$, $p_B$, $p_C$, and $p_D$, which is LCM(6, 6, 4, 3)=12.

If $a_E$ is scheduled by the Multiple Processor A-h-k-a Scheduler using the information in the pre-run-time schedule including the processes $newp_A$, $p_B$, $p_C$, $p_D$ constructed by the Pre-run-time Scheduler above, then $a_E$'s worst-case response time will happen when $a_E$ makes a request at time 3, and will be delayed by the conditions in Case 1 of the Multiple Processor A-h-k-a Scheduler at time 3. $a_E$ will be executed from time 13 to time 15 after $p_B$, has completed. The multiple processor simulation procedure for determining each A-h-k-a process' worst-case response time will simulate this execution in which $a_E$'s worst-case response time is $RE(a_E, t_s)=RE(a_E, 3)=e'(a_E)-s'(a_E)=15-3 = 12 \leq d_{aE}=14$. In this case $a_E$ is guaranteed to always meet its deadline. See FIG. 22.

Suppose the value chosen for threshold($a_A$) is greater than 0.75, then A-h-k process $a_A$ will not be converted into a new periodic process. If $a_A$ is scheduled by the Multiple Processor A-h-k-a Scheduler using the information in the pre-run-time schedule including the processes, $p_B$, $p_C$, $p_D$ constructed by the Pre-run-time Scheduler above, then $a_A$'s worst-case response time will happen when $a_A$ makes a request at time 3, and will be delayed by the conditions in Case 1 of the Multiple Processor A-h-k-a Scheduler at time 3. $a_A$ will be executed from time 8 to time 10 after $p_{D2}$ has completed. $a_E$'s response time is $RE(a_A,t_s)=RE(a_A, 3)=e'(a_A)-s'(a_A)=10-3=7 \leq d_{aA}=14$. In this case $a_A$ is guaranteed to always meet its deadline. See FIG. 23. However, while it is possible to guarantee that both $a_A$ and $a_E$ will always meet their respective deadlines when $a_A$ is converted into a new periodic process $newp_A$ as illustrated in FIG. 22; it is interesting to note that, if $a_A$ is not converted into a new periodic process and remains asynchronous, then it would be impossible to guarantee that $a_E$ will always meet its deadline, because there exist certain times, e.g., any time between 13 and 16, at which, if $a_E$ is put into execution, it may be preempted by $a_A$ and cause $p_B$ to miss its deadline. Prohibiting $a_A$ from preempting $a_E$ by adding the exclusion relation $a_E$ excludes $a_A$ is not a solution, because not allowing $a_A$ to preempt $a_E$ will increase $a_A$'s worst-case response time to exceed $a_A$'s deadline. This example illustrates that, in certain cases, it may be advantageous to convert an asynchronous process with a hard deadline and known characteristics into a new periodic process and schedule it before run-time. underline □

It should be noted that various other embodiments of the present invention may be designed.

For example, tables of safe start time intervals for asynchronous processes may be used.

In the methods described prior to the above description of scheduling processes on multiple processors, each periodic process was not restricted to execute within the time slot that was used to reserve processor capacity for that periodic process in the pre-run-time schedule.

However, it is possible to enforce the requirement that every periodic process must execute strictly within its reserved time slot in the pre-run-time schedule, simply by changing each periodic process p's release time $R_p$ to be equal to the beginning of its time slot in the pre-run-time schedule, i.e., set $R_p=s(p)$ for every p.

One advantage of doing this, is that it will make the execution times of periodic processes highly predictable, and thus allow one to construct tables of "safe start time intervals" for asynchronous processes before run-time. Such tables would allow asynchronous processes to be scheduled at run-time by simple table lookup, and substantially reduce the run-time overhead of scheduling asynchronous processes.

The safe start time intervals can be computed by using the A-h-k-a Scheduler (or Multiple Processor A-h-k-a Scheduler) to determine, for each point in time t of the pre-run-time schedule, and for each processor k, whether each asynchronous process $a_i$ can be put into execution at time t on processor k.

Example 15

For the asynchronous processes $a_E$, $a_A$ in the system is Example 14, the following "safe start time tables" may be constructed.

When $a_A$ is converted into a new periodic process $newp_A$, and the pre-run-time schedule is as shown in FIG. 21, the safe start time table for $a_E$ should preferably contain the following "safe start time intervals":

on processor 1: empty;

on processor 2: [(k*12)+1, (k*12)+2], k=0,1,2, . . .

When $a_A$ is not converted into a new periodic process, and the pre-run-time schedule is as shown in FIG. 22, the safe start time table for $a_A$ should preferably contain the following "safe start time intervals":

on processor 1: [(k*6)+2], k=0, 1, 2, . . .

on processor 2: [(k*12)+2], k=0,1,2 . . .

When $a_A$ is not converted into a new periodic process, and the pre-run-time schedule is as shown in FIG. 22, the safe start time table for $a_E$ should preferably contain the following "safe start time intervals": on processor 1: empty; on processor 2: empty;

The safe start time intervals define the only times at which an asynchronous process can start its execution on a processor when the processor is idle without the possibility of causing some hard deadline process to miss its deadline. □

Many priority and or criticality levels may be handled. One can easily adapt the present invention to handle any number of priority/criticality levels.

If some set of periodic processes is to be treated at the same priority as some set of asynchronous processes, then they could be scheduled in a way similar to the way P-h-k processes and A-h-k processes have been scheduled as described earlier.

If some set of periodic processes is to be treated at a higher priority than some set of asynchronous processes, then they could be scheduled in a way similar to the way P-h-k processes and A-s-k processes have been scheduled as described earlier.

If some set of periodic processes is to be treated at a lower priority than some set of asynchronous processes, then they could be scheduled in a way similar to the way P-s-k processes and A-h-k processes have been scheduled as described earlier.

If some set of periodic processes is to be treated at a lower priority than some other set of periodic processes, then they could be scheduled in a way similar to the way [I scheduled] P-s-k processes and P-h-k processes have been scheduled as described earlier.

If some set of asynchronous processes is to be treated at lower priority than some other set of asynchronous processes, then they could be scheduled in a way similar to the way A-s-k processes and A-h-k processes have been scheduled as described earlier.

For example, although in this specification A-s-k processes are described as having been scheduled at a priority level that is lower than P-s-k processes, a different set of asynchronous processes with soft deadlines and known characteristics, say A-s-k-2, could have been chosen, that is scheduled at the same priority level as the P-s-k processes. Then the relationship between the A-s-k-2 processes and the P-s-k processes could be handled in a way that is similar to the way the relationship between the A-h-k and P-h-k processes was handled.

When using the integration method to schedule processes with different priority levels, the following general rules should be observed:

(a) Periodic processes with known characteristics should be scheduled before run-time. The worst-case response times of asynchronous processes with known characteristics should also be determined before run-time. At run-time, the asynchronous processes should be scheduled in a way that guarantees that the timing constraints of all processes scheduled in the pre-run-time phase are always satisfied. Processes with unknown characteristics should be scheduled at a priority level that is lower than that of all processes with known characteristics.

(b) One should schedule the set of processes that have higher priority first and make sure that all their timing constraints are satisfied, before using the remaining processor capacity to schedule a set of processes that have lower priority.

In the present invention, different methods for scheduling each type of processes, while observing the general rules above, may be used.

The present invention can also be used in an on-line mode. In such cases, in Step 2, when constructing a feasible pre-run-time schedule, when using a single processor method such as that described in the aforenoted 1990 article by Xu and Parnas, or when using a multiprocessor method such as that described in the aforenoted 1993 article by Xu, instead of constructing a search tree, the method can be used in a way such that it always only constructs one schedule for each set of processes, which should be as fast as any existing method, and still provide better chances of finding a feasible pre-run-time schedule than other methods.

As noted earlier, a simplified procedure for Step 4, pre-run-time scheduling of periodic processes with soft deadlines and known characteristics, will now be described. [In order to to try to find a feasible schedule of all soft-deadline periodic processes together with all the guaranteed hard-deadline periodic processes using the optimal method, if a feasible schedule does not exist, then find an optimal schedule.]

P-s-k Scheduler Method

Try to find a feasible schedule of all soft-deadline periodic processes together with all the guaranteed hard-deadline periodic processes using the optimal method in the aforenoted 1990 article by Xu and Parnas.

If a feasible schedule does not exist, then find an optimal schedule discontinue:=false;

nocandidate:=false;

while not discontinue do begin{try to construct a feasible schedule} if $e'(p_l) - D_{p_l} = \max\{e'(p_i) - D_{p_i} \mid p_i \in \text{P-h-k} \vee p_i \in \text{P-s-k}\}$ and $e'(p_l) > D_{p_l}$
    {$p_l$ is the latest process and $p_l$ is late}
then
begin{try to reduce the lateness of latest process $p_l$}
    candidatefound:=false;
    CandidateSet:=P-s-k
    while not candidatefound and not nocandidate do
    begin{search for candidate to revise deadline}
        select $p_j$ such that
            $p_j \in \text{CandidateSet} \wedge d_{p_j} < d_{upplimit(p_j)} \wedge$
            criticality($p_j$) = min{criticality($p_i$) | $p_i$ in critical set $Z(p_l)$}
            {$Z(p_l)$ is a set of processes that includes the latest
             process $p_l$ and there is no time during which the processor
             is idle between their execution.
             (see aforenoted 1990 article by Xu and Parnas)}

-continued
```
            if no such p_j exists then
                nocandidate:=true;
            else
            begin
                if e'(p_l) + 1 ≦ d_upplimit(p_j)
                then
                begin
                    if j ≠ 1
                    then d_pj:=e'(p_l) + 1
                        {this will cause p_j to
                        be scheduled after p_l
                        which may help reduce lateness}
                    else d_pj:=e'(p_l);
                        {if p_j itself is latest
                        then set d_pj such
                        that p_j will not be late}
                    candidatefound:=true
                end
                else remove p_j from CandidateSet
                    {scheduling p_j after p_l
                    is futile}
            end;
    end{search for candidate to revise deadline};
    if nocandidate
    then
    begin
        output Z(p_l);
        discontinue:=true;
            {the user must modify the
            characteristics of one or more
            processes in Z(p_l) before
            a feasible schedule can be found}
    end
    else
    begin
        Use the aforenoted algorithm to try to find
        a feasible schedule again with the revised d_pj;
        if feasible does not exist, then find an optimal schedule;
    end;
    end{try to reduce the lateness of latest process p_l}
    else discontinue:=true; {feasible schedule found}
end{try to construct a feasible schedule};
{Verify the schedulability of all A-h-k-a processes}
for each a_i ∈ E A-h-k-a do
    if not discontinue
    then
    begin
        while RE_ai > L_ai and not discontinue do
        begin
            let CandidateSet:={p_j | p_j ∈ P-s-k ∧ L_Pj ≦ L_ai}
            select p_j such that p_j ∈ CandidateSet and
                criticality(p_j) = min{criticality(p_i) | p_i ∈ CandidateSet
                    ∧d_i < d_upplimit(p_j)}
            if no such p_j exists then
                discontinue:=true;
                {the user must increase the deadline upper limit of
                some P-s-k process in CandidateSet}
            else
                p_Pj:=d_Pj + 1;
        end; {while}
    end; {for}
end.
```

A method and a simulation procedure for determining the worst-case response times of the A-s-k processes, for example $a_i$ follows:

For all $a_i \epsilon$ A-s-k:

$$RE_{a_i} = c_{a_i} + DelayA(a_i, RE_{a_i}) + DelayP(a_i, RE_{a_i}) + B(a_i) \text{ where}$$

$$DelayA(a_i, RE_{a_i}) = \sum_{a_j \in A-h-k \vee (a_j \in A-s-k \wedge L_{a_j} \leq L_{a_i} \wedge j \neq 1)} \left\lceil \frac{RE_{a_i}}{\min_{a_j}} \right\rceil \cdot c_{a_j}$$

and $$DelayP(a_i, RE_{a_i}) = \sum_{p_j \in P-h-k \vee p_j \in P-s-k} \left\lceil \frac{RE_{a_i}}{prd_{p_j}} \right\rceil \cdot c_{p_j}$$

and $$B(a_i) = \max\{c_{a_j} \mid (a_j \in A-s-k \wedge L_{a_j} < L_{a_i} \wedge \exists x_k, x_k \in A-s-k: a_j \text{ excludes } x_k \wedge L_{x_k} \leq L_{a_i})\}$$

Note: In the above formula, the value of $c_{pj}$ is the original computation time of $p_j$ (it does not include the time reserved for A-h-k-a processes with shorter deadlines).

The following procedure can be used to compute the worst-case response time of each A-s-k process:

```
i:=0;
failure=false;
while i ≦ number-of-A-s-k-processes and not(failure) do
begin
    if a_i ∈ A-s-k
    then
    begin
        RE_newi:=c_ai;
        responsetimefound:=false;
        while not(responsetimefound) and not(failure) do
        begin
            RE_previousi:=RE_newi;
            RE_newi:=c_ai + DelayA(a_i,RE_previousi) + DelayP(a_i,RE_previousi)
                + B(a_i);
            if RE_previousi = RE_newi
            then
            begin
                RE_ai := RE_newi;
                responsetimefound:=true;
            end
            if (RE_newi > responsetimelimit)
                then failure:=true;
        end;
    end;
    i:=i + 1;
end—
```

See Example 9 concerning use of the above procedure.

In the following description, the second method is described, which uses simulation to determine the worst-case response time of an A-s-k process.

This method uses the functions of the A-h-k-a Scheduler and the Main Run-Time Scheduler, which are described earlier.

A preferred method for computing the worst-case response time of an A-s-k process ai corresponding to a feasible pre-run-time schedule of guaranteed periodic processes comprising an initial part of the pre-run-time schedule $S_0(t_0)$, in the interval $[\{0, t_0\}]$ underline $[t_0, t_0]$; and a repeating part of the pre-run-time schedule $S_{LCM}(prd_{LCM})$, in the interval $[t_0, t_0+prd_{LCM}]$ is as follows:

fail:=false;

for $t_s$:=0 to $t_0+prd_{Lcm}-1$ do begin

Use the Main Run-Time Scheduler to schedule $a_i$ under the following assumptions:

(1) $a_i$ arrives in the system at time $t_s$.

(2) Let every A-h-k-a process $a_j$ arrive at the following instants in time: $R_{aj}(k)=t_s+k*\min_{aj}$, $$k = 0, 1, 2, \ldots, \left\lfloor \frac{d_{a_i}}{\min_{a_j}} \right\rfloor,$$

and be scheduled before $a_i$. {all A-h-k-a processes arrive at the same time as $a_i$ at time $t_s$, and are put into execution before $a_i$.}

(3) Let every A-s-k process $a_j$, such that $L_{aj} \leq L_{a1}$ arrive at the following instants in time: $R_{aj}(k) = t_s + k*\min_{ai}$, $$k = 0, 1, 2, \ldots, \left\lfloor \frac{d_{a_i}}{\min_{a_j}} \right\rfloor,$$

and be scheduled before $a_i$ whenever $a_i$ and $a_j$ have both arrived and $a_i$ has not yet started. {all A-s-k processes whose latitudes are less than or equal to $a_i$'s latitude arrive at the same time as $a_i$ at time $t_s$, and are put into execution before $a_i$.}

(4) Let A-s-k process $a_{j1}$, such that $c_{aj1} = \max\{c_{aj} | a_j \epsilon \text{A-s-k} \wedge L_{aj} > L_{ai} \wedge \exists x_k, x_k \epsilon \text{A-s-k} \wedge x_k \epsilon \text{P-g}: a_j \text{ excludes } x_k \wedge L_{xk} \leq L_{ai})\}$ arrive at the following instants in time: $R_{aj1}(k) = t_s - 1 + k*\min_{aj1}$, $$k = 0, 1, 2, \ldots, \left\lfloor \frac{d_{a_i}}{\min_{a_{j1}}} \right\rfloor$$

{$a_{ji}$ arrives 1 time unit before $a_i$ at time $t_s - 1$, and, if it can be put into execution at the time, it will block $a_i$.}

(5) If $\exists p_l, p_l \epsilon \text{P-g} \wedge s(p_l) \leq t_s < e(p_l)$, then assume that $s'(p_l) = s(p_l) \wedge e'(p_l) = e(p_l)$; {e.e., $p_l$ started at the beginning of its time slot and will complete its computation at the end of its time slot in the pre-run-time schedule that was computed using adjusted computation times}.

(6) If the end of the current instance of the repeating part of the pre-run-time schedule is reached, continue at the beginning of the next instance of the repeating part of the pre-run-time schedule.

(7) If $a_i$'s computation is completed before its response time limit, then record the completion time of $a_i$ as its response time $RE(a_i, t_s,)$, and exit from the current iteration of the loop for this value of $t_s$, and start the next iteration for $t_s := t_s + 1$.

(8) If $a_i$'s response time limit is reached but $a_i$ has not yet completed its computation, then set fail:=true and exit from the procedure.

end;

if not fail then $RE_{ai} := \max\{RE(a_i, t_s) | t_s = 0, 1, \ldots, LCM-1\}$;

It should be noted that while the above-described methods can be carried out in a software programmed processor, and have been described with such a processor as an example, they, or one or more steps in the methods, can can alternatively be carried out by hardware such as gate arrays or by other fixed or programmable structures, or combinations of these structures.

A processor can be any physical or virtual structure which can perform one or more functions. A processor can be a machine, a computer processor, a logic device, an organization, etc. A process can be any task or job that requires a finite amount of time to complete on a certain processor. Computation time is the amount of time that a process requires from start to completion on a certain processor.

FIG. 24 illustrates an example of a system on which the methods described herein can be carried out. Any of plural peripherals 1 provide input signals which require processing. For example, peripherals can be a keyboard, a signal from an emergency response telephone system, an alarm clock, a program running in background on a processor, a pipeline, etc. A memory 3 stores processes, e.g. series of instructions, for carrying out the various processes. The memory can be in the form of any storage structure, and can be, for instance a store for a series of electronic, pneumatic, hydraulic, etc. control signals for operating a plurality of industrial processes that require scheduling in accordance with the demands of the input signals. In one embodiment, the memory can be a hard random access memory and/or a disk drive of a computer, of well known form and the input signals can be electronic. In another embodiment, in the case in which the memory is in the form of industrial process structures, the input signals can be fluids, photons, objects, audio, data or other signals, etc, which are to be scheduled to be processed by the various industrial processes.

The input signals and the memory are coupled to a processor 4 of any form with which the present invention can be operated, such a computer processor. The processor has an output which is coupled to an output device or system 5, which receives the output result of the operation of the processes by the processor.

The memory preferably also has a portion 7 for storing a pre-run-time schedule, and a portion 9 for storing a run-time schedule for execution of the processes stored in the memory 3.

In operation, the processor receives input signals which demand that processes stored in the memory 3 (or which are received from other control or interrupt inputs, not shown) are executed. As described earlier in this specification, some of these processes can be periodic and some can be asynchronous. The processor, operating using an operating system stored in the memory 3, obtains the characteristics of the various processes from the memory, and creates or simulates a pre-run-time schedule, then creates or simulates a run-time schedule which uses the pre-run-time schedule, as described earlier in this specification. It then executes the run-time schedule as described herein, providing an output to the output device or system.

FIG. 24A provides another example of a multiprocessor system on which the methods described herein can be carried out. The real-time system consists of a controlling system having two parts, a pre-run-time scheduling subsystem 10 and a run-time scheduling subsystem 11, and a controlled system 12. The controlled system 12 has data/control buses linking the various components. The controlled system 12 is comprised of a set of periodic processes $p_1, p_2, \ldots, p_n$, a set of asynchronous processes $a_1, a_2, \ldots, a_j$, and one or more processors $13a, 13b, \ldots, 13m$. Each processor $13a$–$13m$ may have local memory and shared memory. On each processor $13a$–$13m$ the processes, either periodic or asynchronous, may be executed. Each process can be a task that requires a finite amount of time to complete on a processor that may have memory resources. Examples of such processes include: a service routine that periodically monitors conditions on a physical system and sends a signal when the conditions meet a certain standard or a task that responds to random user initiated requests. Any of the processes can be a complete subsystem unto itself comprising a processor and a memory that requires the use of some services offered by controlled system 12 in order to execute other periodic or asynchronous processes.

The pre-run-time scheduling subsystem 10 consists of one or more processors 14 that are used to perform pre-run-time scheduling. The pre-run-time scheduling subsystem scheduler (not shown) acquires information about the periodic processes such as constraints, release time, deadline, offset, precedence, and exclusion relations. The scheduler then uses this information to determine whether each asynchronous process should be converted into a new periodic process or not. After converting any suitable subset of asynchronous processes into new periodic processes but before run-time of the processes, the pre-run-time scheduler constructs a pre-run-time schedule for all the periodic processes which satisfies all the constraints and relations defined on the periodic processes. The scheduler then makes this schedule available to the run- time scheduling subsystem 11.

The run-time scheduling subsystem 11 consists of one or more processors 15 that are used to perform run- time scheduling of the periodic and asynchronous processes. The run-time scheduling subsystem 11 uses the information 16 provided by the pre-run-time scheduler and stored in memory, to schedule the processes for execution on processor(s) 15. The processors 13a–13m in the controlled system 12 on which the periodic or asynchronous processes are executed may share memory and other resources. Consequently, it is important to enforce exclusion relations on the execution of the processes to prevent more than one process from accessing a shared memory resource at the same time. The pre-run time scheduling subsystem 10 and the run-time scheduling subsystem 11 work together to control the execution of all the processes in the controlled system 12. These two subsystems 10 and 11 guarantee that all the processes in the controlled system 12 are completed before their respective deadlines and that all the constraints and relations among the processes are satisfied.

While FIG. 24A shows the run-time scheduling subsystems 11 as being within the controlled system 12, this is not necessary for the proper working of the invention. The run-time scheduling subsystem 11 can be separate from the controlled system 12.

Some applications of the present invention can be in aircraft flight control, plant process control, traffic control, communication systems, multimedia, signal control of the internet, electronic commerce, electronic buses, computer operation, etc.

A person understanding the above-described invention may now conceive of alternative designs, using the principles described herein. All such designs which fall within the scope of the claims appended hereto are considered to be part of the present invention.

I claim:

1. A method of scheduling on one or more processors, executions of a plurality of periodic and asynchronous processes, comprising:

(A)
  automatically generating a pre-run-time schedule comprising mapping from a set of periodic process executions to a sequence of time slots on one or more processor time axes, each of the time slots having a beginning time and an end time, reserving each one of the time slots for execution of one of the periodic processes, the positions of the end time and the beginning time of each of the time slots being such that execution of the periodic processes, including satisfaction of predetermined constraints comprising
    (1) worst-case computation times for periodic processes and asynchronous processes,
    (2) period for periodic processes,
    (3) minimum time between two consecutive requests for asynchronous processes,
    (4) deadline for periodic processes and asynchronous processes,
    (5) permitted range of offset constraints for periodic processes wherein a permitted range of offset of a periodic process comprising an interval that begins at a lower bound value and ends at an upper bound value which may be equal to the lower bound value, the duration of the time interval between the beginning of the first period of said periodic process and time zero must be greater than or equal to said lower bound value and less than or equal to said upper bound value,
    (6) precedence relations for periodic processes wherein each precedence relation being defined between a selected pair of processes comprising a first process and a second process, both said first process and said second process being periodic processes, said first process precedes said second process, execution of said second process only allowed to start after said first process has completed its execution, and
    (7) exclusion relations for periodic and asynchronous processes wherein each exclusion relation being defined between a selected pair of processes comprising a first process and a second process, said first process being either a periodic process or an asynchronous process and said second process being either a periodic process or an asynchronous process, said first process excludes said second process, no execution of said second process being allowed to occur between the time that said first process starts its execution and the time that said first process completes its computation,
  can be completed between the beginning time and end time of respective time slots, further including converting one or more asynchronous processes into corresponding new periodic processes prior to the mapping step, and mapping new periodic processes to time slots in a manner similar to mapping of other periodic processes, such that all of said predetermined constraints will be satisfied (B)
  during run-time using the information in the pre-run-time schedule, including the positions of the beginning time and end time of the time slots of the periodic processes, to schedule the process executions, such that said predetermined constraints will be satisfied.

2. The method as defined in claim 1, including further executing a set of asynchronous processes that are not mapped to time slots during run-time of the processor at times which do not interfere with execution of processes mapped to time slots in the pre-run-time schedule.

3. The method as defined in claim 1 including following pre-run-time scheduling and during run-time of the processor, further scheduling executions of a set of asynchronous processes that are not mapped to time slots and executions of periodic processes including said new periodic processes that are mapped to time slots such that said predetermined constraints are satisfied.

4. The method as defined in claim 1, including scheduling, between the beginning time and end time of each of the time slots in the pre-run-time schedule reserved for execution of a corresponding periodic process, time capacity sufficient to complete execution of said corresponding periodic process and additional time capacity sufficient to complete execution of asynchronous processes that are not converted to new periodic processes and hence not mapped to time slots in the pre-run-time schedule and have less latitude than said corresponding periodic process in meeting their respective deadlines.

5. The method as defined in claim 4, including prior to the mapping step, automatically adjusting lengths of periods of a predetermined set of periodic processes by generating a list of reference periods, setting the length of the period of each periodic process to the length of the largest reference period that is no larger than an original period of the periodic process to form adjusted periods, and storing the adjusted periods for subsequent use in pre-run-time scheduling of executions of the periodic processes.

6. The method as defined in claim 1, including prior to the mapping step, automatically adjusting lengths of periods of a predetermined set of periodic processes, generating a set of reference periods, setting the length of the period of each periodic process to the length of the largest reference period that is no larger than an original period of the periodic process to form adjusted periods, and storing the adjusted periods for subsequent use in pre-run-time scheduling of executions of the periodic processes.

7. The method as defined in claim 1 including, prior to generating the pre-run-time schedule, determining whether each asynchronous process should or should not be converted into a new periodic process, converting a subset of a predetermined set of asynchronous processes having worst-case computation time, deadline, minimum time between two requests constraints, which have been determined to be convertible, into a set of new periodic processes having worst-case computation time, period, deadline, permitted range of offset constraints and reducing possible timing conflicts with other periodic or asynchronous processes with less latitude in meeting their deadlines, by taking into consideration the computation time requirements of the latter processes when determining the deadline of the new periodic process.

8. The method as defined in claim 7, in which the determining step comprises
   (1) calculating a first processor capacity that is required for the asynchronous process if left unconverted,
   (2) calculating a second processor capacity which is required to be reserved for the new periodic process,
   (3) determining whether the ratio of said first processor capacity to said second processor capacity exceeds a predetermined threshold value.

9. The method as defined in claim 1 including, prior to generating the pre-run-time schedule, determining whether each asynchronous process should or should not be converted into a new periodic process, converting a subset of a predetermined set of asynchronous processes having a worst-case computation time, deadline, minimum time between two requests constraints which have been determined to be convertible, into a set of new periodic processes having release time, worst-case computation time, period, deadline, permitted range of offset constraints, wherein a permitted range of offset of each new periodic process being a subinterval of an interval or a full interval that begins at the earliest time that the corresponding being converted asynchronous process can make a request for execution, and ends at a time equal to the sum of the earliest time that said being converted asynchronous process can make a request for execution plus the period length of the new periodic process minus one time unit.

10. The method as defined in claim 1, including generating the pre-run-time schedule as a feasible two-part pre-run-time-schedule for execution of periodic processes that may have non-zero offsets (a) an initial part which may be of zero length, and (b) a repeating part having length which is equal to a least common multiple of lengths of the periods of the periodic processes,
   all executions of all periodic processes within a time interval of length equal to the length of the least common multiple of the periodic process periods being included in the repeating part of the pre-run-time schedule, wherein all said predetermined constraints being satisfied for all executions of all periodic processes within said initial part and said repeating part.

11. The method as defined in claim 10, including using any offset value in a permitted range of offsets of each periodic process, including any offset value in the permitted range of offsets of any new periodic process that may have been converted from an asynchronous process, to generate said feasible pre-run-time schedule.

12. The method as defined in claim 11, wherein said permitted range of offsets of any new periodic process that may have been converted from an asynchronous process is a subinterval of an interval or a full interval that begins at the earliest time that the corresponding being convened asynchronous process can make a request for execution, and ends at a time equal to the sum of the earliest time that said being convened asynchronous process can make a request for execution plus the period length of the new periodic process minus one time unit.

13. A method as defined in claim 10, further including the steps of
(A)
   constructing a first schedule for executions of the periodic process within an interval starting from zero and having length equal to maximum offset value plus a bounded number of times of the length of at least common multiple of the periodic process periods, conditions for determining feasibility requiring the existence of a point in said first schedule wherein starting from the latter point the schedule repeats in subschedule interval lengths equal to a least common multiple of lengths of the periodic process periods, timing of all executions of all periodic processes within a time interval having length equal to the length of the least common multiple of the periodic process periods being included in each said repeating subschedule interval, and including satisfaction of all predetermined constraints for all executions of all periodic processes within the subschedule interval starting from time zero and ending at said point plus the length of the least common multiple of the periodic process periods in said first schedule, and checking for the first occurrence of said point in said first schedule,
(B)
   generating said feasible two-part pre-run-time-schedule by
   (1) using a subschedule interval starting from time zero and ending at said point in said first schedule as said initial part of said feasible two-part pre-run-time schedule, and
   (2) using a subschedule interval starting from said point and ending at said point plus the length of the least common multiple of the periodic process periods in said first schedule as said repeating part of said feasible two-part pre-run-time schedule.

14. The method as defined in claim 13, including using any offset value in a permitted range of offsets of each periodic process, including any offset value in the permitted range of offsets of any new periodic process that may have been converted from an asynchronous process, to generate said feasible pre-run-time schedule.

15. The method as defined in claim 14, wherein said permitted range of offsets of any new periodic process that may have been converted from an asynchronous process is a subinterval of an interval or a full interval that begins at the earliest time that the corresponding being convened asynchronous process can make a request for execution, and ends at a time equal to the sum of the earliest time that said being converted asynchronous process can make a request for execution plus the period length of the new periodic process minus one time unit.

16. The method as defined in claim 1, further comprising:
(a) during run-time, or during a pre-run-time phase, using the information in the pre-run-time schedule, including the positions of the beginning time and end time of the time slots of the periodic processes, to determine, for any point in time, whether there exists a possibility that immediate execution of a particular asynchronous process which has not been mapped to a time slot may cause the execution of any periodic process with less latitude in meeting a deadline of the latter periodic process as compared with latitude of meeting the deadline of said particular asynchronous process, to be delayed beyond a predetermined time limit, even if the periodic process is not ready for execution at said any point in time, and
(b) during run-time, delaying execution of said particular asynchronous process if said possibility is found to exist, even if said possibility is the only reason for delaying the execution of said particular asynchronous process at said any point in time, and even if the delay will cause the processor to be in an idle state for a time interval of non-zero length beginning from said any point in time.

17. The method as defined in claim 1, further comprising:
(a) either during run-time, or during a pre-run-time phase, using the information in the pre-run-time schedule, including the positions of the beginning time and end time of the time slots of the periodic processes, to determine, for any point in time, whether there exists a possibility that immediate execution of a particular asynchronous process which has not been mapped to a time slot may cause the execution of any periodic process with less latitude in meeting a deadline of the latter periodic process as compared with latitude of meeting the deadline of said particular asynchronous process, to be delayed beyond the end of the time slot of the periodic process in the pre-run-time schedule, even if the periodic process is not ready for execution at said any point in time, and
(b) during run-time, delaying execution of said particular asynchronous process if said possibility is found to exist, even if said possibility is the only reason for delaying the execution of said particular asynchronous process at said any point in time, and even if the delay will cause the processor to be in an idle state for a time interval of non-zero length beginning from said any point in time.

18. The method as defined in claim 1, further comprising:
(a) either during run-time, or during a pre-run-time phase, using the information in the pre-run-time schedule, including the positions of the beginning time and end time of the time slots of the periodic processes, to determine, for any point in time, whether there exists a possibility that immediate execution of a particular asynchronous process which has not been mapped to a time slot may cause the execution of said particular asynchronous process, or the execution of some other asynchronous process, to extend beyond the beginning of the time slot of any periodic process that has not yet started in the pre-run-time schedule, even if the periodic process is not ready for execution at said any point in time, and
(b) during run-time, delaying execution of said particular asynchronous process if said possibility is found to exist, even if said possibility is the only reason for delaying the execution of said particular asynchronous process at said any point in time, and even if the delay will cause the processor to be in an idle state for a time interval of non-zero length beginning from said any point in time.

19. The method as defined in claim 1, further comprising:
(a) either during run-time, or during a pre-run-time phase, using the information in the pre-run-time schedule, including the positions of the beginning time and end time of the time slots of the periodic processes, to determine, for any point in time, whether there exists a possibility that immediate execution of a particular asynchronous process which has not been mapped to a time slot may cause the execution of any periodic process to be delayed beyond the end of the time slot of that periodic process in the pre-run-time schedule, even if the periodic process is not ready for execution at said any point in time, and
(b) during run-time, delaying execution of said particular asynchronous process if said possibility is found to exist, even if said possibility is the only reason for delaying the execution of said particular asynchronous process at said any point in time, and even if the delay will cause the processor to be in an idle state for a time interval of non-zero length beginning from said any point in time.

20. The method as defined in claim 1, further comprising:
(a) either during run-time, or during a pre-run-time phase, using the information in the pre-run-time schedule, including the positions of the beginning time and end time of the time slots of the periodic processes, to determine, for any point in time, whether there exists a possibility that immediate execution of a particular first asynchronous process which has not been mapped to a time slot may cause execution of any second asynchronous process which has not been mapped to a time slot to be continuously blocked for a duration of the execution of the first asynchronous process and a duration of the execution of any periodic process, when the second asynchronous process has less latitude in meeting the deadline of the second asynchronous process as compared with the latitude of both the first asynchronous process in meeting the deadline of the first asynchronous process and the latitude of the periodic process in meeting the deadline of the periodic process, even if neither the periodic process nor the second asynchronous process are ready for execution at said any point in time, and (b) during run-time, delaying execution of the first asynchronous process if said possibility is found to exist, even if said possibility is the only reason for delaying the execution of the first asynchronous process at said point in time, and even if the delay will cause the processor to be in an idle state for a time interval of non-zero length beginning from said any point in time.

21. The method as defined in claim 1, including determining a worst-case response time of a particular asynchronous process which has not been mapped to a time slot that has not been converted into a periodic process using a formula comprising:

the sum of worst-case computation times of asynchronous processes and periodic processes that have less or equal latitude as compared with the latitude of said particular asynchronous process in meeting their respective deadlines, plus the maximum time that said particular asynchronous process may possibly be blocked by some asynchronous or periodic process that has greater latitude as compared with the latitude of said particular asynchronous process in meeting their respective deadlines, plus the worst-case computation time of said particular asynchronous process multiplied by the number of periodic processes with which said particular asynchronous process has an exclusion relation.

22. The method as defined in claim 1, including, during a pre-run-time phase, determining by simulation a worst-case response time of a particular asynchronous process which has not been mapped to a time slot corresponding to a feasible pre-run-time schedule of periodic processes consisting of an initial part of the pre-run-time schedule which may be of zero length and a repeating part of the pre-run-time schedule, wherein for each point in time from zero to the end time of the repeating part of the run-time schedule minus one time unit, simulating execution of said particular asynchronous process using functions used to determine a run-time schedule and recording response time of said particular asynchronous process under the assumption that said particular asynchronous process arrives at a point in time under consideration, all other asynchronous processes which have not been mapped to time slots that can possibly block said particular asynchronous process arriving at one time unit prior to the point in time under consideration, and all asynchronous processes which have not been mapped to time slots that have less latitude in meeting their deadlines than latitude of said particular asynchronous process in meeting said particular asynchronous process' deadline arriving at the same said point of time under consideration, scheduling executions of periodic processes to start at the beginning time and to complete execution at the end time of their respective time slots in the pre-run-time schedule, wherein whenever said particular asynchronous process is delayed because it may block execution of some periodic process having less latitude than the latitude of said particular asynchronous process in meeting their respective deadlines, or may block execution of some second asynchronous process for the duration of more than one execution of processes having greater latitude as compared with the latitude of the second asynchronous process, all asynchronous processes having less latitude as compared with the latitude of said particular asynchronous process in meeting their respective deadlines is delayed in order to delay said particular asynchronous process for a maximum possible amount of time, thus simulating all possible worst-case scenarios of executions of said particular asynchronous process.

23. The method as defined in claim 1, including restricting every periodic process in the pre-run-time schedule to be executed strictly within its time slot.

24. The method as defined in claim 1, including, during a pre-run-time phase, generating tables of safe start time intervals for the executions of asynchronous processes which have not been mapped to time slots, wherein every periodic process in the pre-run-time schedule is scheduled to be executed strictly within its time slot, wherein for every point in time of the pre-run-time schedule, it is determined whether each particular asynchronous process which has not been mapped to a time slot should be delayed, under the assumption that the actual start time of execution of every periodic process is equal to the beginning time of its time slot, and the actual end time of execution of every periodic process is equal to the end time of its time slot, wherein for every point in time of the pre-run-time schedule, in the event said particular asynchronous process is to be delayed according to the assumptions, the point in time is set to be unsafe and recorded in a corresponding entry in the table for the point in time and said particular asynchronous process.

25. The method as defined in claim 1, including, during a pre-run-time phase, generating tables of safe start time intervals for the executions of asynchronous processes which have not been mapped to time slots, wherein every periodic process is scheduled to be executed strictly within its time slot in the pre-run-time schedule, wherein for selected points in time of the pre-run-time schedule, it is determined whether each particular asynchronous process which has not been mapped to a time slot should be delayed, under the assumption that the actual start time of execution of every periodic process is equal to the beginning time of its time slot, and the actual end time of execution of every periodic process is equal to the end time of its time slot, wherein for selected points in time of the pre-run-time schedule, in the event said particular asynchronous process is to be delayed according to the assumptions, that point in time is set to be unsafe and recorded in a corresponding entry in the table for the point in time and said particular asynchronous process.

26. The method as defined in claim 1 comprising during run-time, detecting at least one event of, at any point in time, whether some asynchronous process which has not been mapped to a time slot has arrived by said point in time, whether some asynchronous process or periodic process has completed its computation at said point in time, and whether said point in time is both the release time and beginning time of a time slot in the pre-run-time schedule for some periodic process, and activating a run-time scheduler at said point in time, and should said at least one event have occurred, determining whether any asynchronous process which has not been mapped to a time slot and which has arrived but has not yet been completed should be delayed or immediately put into execution, and including delaying execution of a first asynchronous process which has not been mapped to a time slot when execution of some other asynchronous process which has not been mapped to a time slot that excludes a periodic process with less or equal latitude as compared with the latitude of said first asynchronous process in meeting their respective deadlines has already started but has not yet been completed.

27. The method as defined in claim 1, including, during a pre-run-time phase, determining by simulation a worst-case response time of a particular asynchronous process which has not been mapped to a time slot corresponding to a feasible pre-run-time schedule of periodic processes, wherein for each point in time from zero to the end time of the repeating part of the run-time schedule minus one time unit, simulating execution of said particular asynchronous process using functions used to determine a run-time schedule and recording response time of said particular asynchronous process under the assumption that said particular asynchronous process arrives at a point in time under consideration, all other asynchronous processes which have not been mapped to time slots that can possibly block said particular asynchronous process arriving at one time unit prior to the point in time under consideration, and all asynchronous processes which have not been mapped to time slots that have less latitude than latitude of said particular asynchronous process in meeting their respective deadlines arriving at the same said point of time under consideration, scheduling executions of periodic processes to start at the beginning time and to complete execution at the end time of their respective time slots in the pre-run-time schedule, simulating all possible worst-case scenarios of executions of said particular asynchronous process.

28. A method of scheduling on one or more processors, executions of a plurality of periodic and asynchronous processes, comprising:

(A)
automatically generating a pre-run-time schedule comprising mapping from a set of periodic process executions to a sequence of time slots on one or more processor time axes, each of the time slots having a beginning time and an end time, reserving each one of the time slots for execution of one of the periodic processes, the positions of the end time and the beginning time of each of the time slots being such that execution of the periodic processes, including satisfaction of predetermined constraints comprising
(1) worst-case computation times for periodic processes and asynchronous processes,
(2) period for periodic processes,
(3) minimum time between two consecutive requests for asynchronous processes,
(4) deadline for periodic processes and asynchronous processes,
(5) permitted range of offset constraints for periodic processes wherein a permitted range of offset of a periodic process comprising an interval that begins at a lower bound value and ends at an upper bound value which may be equal to the lower bound value, the duration of the time interval between the beginning of the first period of said periodic process and time zero must be greater than or equal to said lower bound value and less than or equal to said upper bound value, and
(6) exclusion relations for periodic and asynchronous processes wherein each exclusion relation being defined between a selected pair of processes comprising a first process and a second process, said first process being either a periodic process or an asynchronous process and said second process being either a periodic process or an asynchronous process, said first process excludes said second process, no execution of said second process being allowed to occur between the time that said first process starts its execution and the time that said first process completes its computation, can be completed between the beginning time and end time of respective time slots, (B)
during run-time using the information in the pre-run-time schedule, including the positions of the beginning time and end time of the time slots of the periodic processes, to schedule the process executions, including allowing executions of asynchronous processes that have not been mapped to time slots in the pre-run-time schedule to be completed within any time slot of a periodic process that has greater latitude than the latitude of the asynchronous processes in meeting their respective deadlines, such that all of said predetermined constraints will be satisfied.

29. The method as defined in claim 28, including scheduling, between the beginning time and end time of each of the time slots in the pre-run-time schedule reserved for execution of a corresponding periodic process, time capacity sufficient to complete execution of said corresponding periodic process and additional time capacity sufficient to complete execution of asynchronous processes that are not converted to new periodic processes and hence not mapped to time slots in the pre-run-time schedule and have less latitude than said corresponding periodic process in meeting their respective deadlines.

30. The method as defined in claim 28, further comprising:
(a) generating feasible said pre-run-time schedule for the execution of a set of hard deadline periodic processes, and of a set of soft deadline periodic processes,
(b) assigning a criticality level and a deadline upper-linit to each soft deadline periodic process,
(c) in the case of not finding a feasible pre-run-time schedule under said constraints, identifying a soft critical set that contains soft deadline periodic processes for which modifying the deadlines of one or more processes in said soft critical set is necessary to meet the deadlines of all hard deadline processes,
(d) repeatedly selecting one process with a lowest criticality level among processes for which its criticality level has not reached the deadline upper-limit in the soft critical set in each case in which a feasible pre-run-time schedule has not been found, increasing the deadline of the selected process by an amount that does not exceed the deadline upper-limit of the selected process and repeatedly attempting to find a feasible pre-run-time schedule until either a feasible pre-run-time schedule is found or all the deadline upperlimits of processes in the soft critical set have been reached without finding a feasible schedule, and indicating the event of either the inability of finding a feasible schedule or of finding a feasible pre-run-time schedule, and indicating the critical set when unable to find a feasible schedule,
(e) recomputing worst-case response times of all hard deadline asynchronous processes that have not been converted to periodic processes and hence not mapped to time slots after a feasible pre-run-time schedule has been found for all hard and soft deadline periodic processes, and in every event that the worst-case response time exceeds the deadline of a particular hard deadline asynchronous process which has not been mapped to a time slot, repeatedly selecting one process that has a lowest criticality level among all soft deadline periodic processes that contribute to the worst-case response time of said particular hard deadline asynchronous process and increasing the deadline of the selected soft deadline periodic process until either (i) the worst-case response time of every hard deadline asynchronous process which has not been mapped to a time slot is less than or equal to its deadline or (ii) all the deadline upper limits of the particular set of soft deadline periodic processes which contribute to the worst-case response time of any hard deadline asynchronous process that exceeds said any hard deadline asynchronous process' deadline have been reached, and indicating the event of the latter events (i) or (ii) and the particular set.

31. The method as defined in claim 28, comprising during run-time, detecting, in a case in which no asynchronous process or periodic process that has started is to be immediately put into execution, conditions of whether there exists an execution of a first periodic process that is ready for execution and has not completed execution, and there does not exist any other execution of some second periodic process that has not yet completed, such that execution of the second periodic process is ordered before execution of the first periodic process in the pre-run-time schedule, and the time slot of the first periodic process is not nested within the time slot of the second periodic process in the pre-run-time schedule, and there does not exist any other execution of some third periodic process that is ready and has not completed execution, such that execution of the third periodic process is nested within the time slot of the first periodic process in the pre-run-time schedule, and beginning execution of the first periodic process immediately in the event said conditions are true.

32. The method as defined in claim 28 comprising during run-time, detecting at least one event of, at any point in time, whether some asynchronous process which has not been mapped to a time slot has arrived by said point in time, whether some asynchronous process or periodic process has completed its computation at said point in time, and whether said point in time is both the release time and beginning time of a time slot in the pre-run-time schedule for some periodic process, and activating a run-time scheduler at said point in time, and should said at least one event have occurred, determining whether any asynchronous process which has not been mapped to a time slot and which has arrived but has not yet been completed should be delayed or immediately put into execution, and including delaying execution of a particular asynchronous process which has not been mapped to a time slot in the event there exists the possibility that immediate execution of said particular asynchronous process may cause execution of a first periodic process with less or equal latitude as compared with the latitude of said asynchronous process in meeting their respective deadlines to be delayed, when execution of the first periodic process may be preempted by execution of some second periodic process, and said particular asynchronous process cannot be preempted by the second periodic process.

33. The method as defined in claim 28 comprising during run-time, detecting at least one event of, at any point in time, whether some asynchronous process which has not been mapped to a time slot has arrived by said point in time, whether some asynchronous process or periodic process has completed its computation at said point in time, and whether said point in time is both the release time and beginning time of a time slot in the pre-run-time schedule for some periodic process, and activating a run-time scheduler at said point in time, and should said at least one event have occurred, determining whether any asynchronous process which has not been mapped to a time slot that has arrived but has not yet been completed should be delayed or immediately put into execution, and including delaying execution of any asynchronous process which has not been mapped to a time slot when it is not allowed to preempt execution of any first process that has already started and has not completed execution and that excludes some other second asynchronous process which has not been mapped to a time slot which has latitude in meeting its deadline that is less than both said any first process and the latitude of said second asynchronous process in meeting their respective deadlines, whereby blocking of the second asynchronous process by the duration of more than one execution of processes with greater latitude in meeting their respective deadlines thereof may be avoided.

34. The method as defined in claim 28 comprising during run-time, detecting at least one event of, at any point in time, whether some asynchronous process which has not been mapped to a time slot has arrived by said point in time, whether some asynchronous process or periodic process has completed its computation at said point in time, and whether said point in time is both the release time and beginning time of a time slot in the pre-run-time schedule for some periodic process, and activating a run-time scheduler at said point in time, and should said at least one event have occurred, determining whether any asynchronous process which has not been mapped to a time slot and which has arrived but has not yet been completed should be delayed or immediately put into execution, and including delaying execution of a particular asynchronous process which has not been mapped to a time slot to allow preemption of execution of said particular asynchronous process by execution of a first periodic process that is ready for execution and that has a latitude which is less than or equal to the latitude of said particular asynchronous process in meeting their respective deadlines, when said particular asynchronous process does not exclude the first periodic process and does not exclude any other asynchronous process which has not been mapped to a time slot with a latitude that is less than the latitude of the first periodic process in meeting their respective deadlines, and there does not exist execution of some second periodic process that has not been completed such that execution of the second periodic process is ordered before execution of the first periodic process and execution of the time slot of the first periodic process is not nested within the time slot of the second periodic process in the pre-run-time schedule.

35. A method of scheduling on one or more processors, executions of a plurality of periodic and asynchronous processes, comprising:

(A)
automatically generating a pre-run-time schedule comprising mapping from a set of periodic process executions to a sequence of time slots on one or more processor time axes, each of the time slots having a beginning time and an end time, reserving each one of the time slots for execution of one of the periodic processes, the positions of the end time and the beginning time of each of the time slots being such that execution of the periodic processes,
including satisfaction of predetermined constraints comprising
(1) worst-case computation times for periodic processes and asynchronous processes,
(2) period for periodic processes,
(3) minimum time between two consecutive requests for asynchronous processes,
(4) deadline for periodic processes and asynchronous processes,
(5) precedence relations for periodic processes wherein each precedence relation being defined between a selected pair of processes comprising a first process and a second process, both said first process and said second process being periodic processes, said first process precedes said second process, execution of said second process only allowed to start after said first process has completed its execution, and (6) exclusion relations for periodic and asynchronous processes wherein each exclusion relation being defined between a selected pair of processes comprising a first process and a second process, said first process being either a periodic process or an asynchronous process and said second process being either a periodic process or an asynchronous process, said first process excludes said second process, no execution of said second process being allowed to occur between the time that said first process starts its execution and the time that said first process completes its computation, can be completed between the beginning time and end time of respective time slots, including scheduling, between the beginning time and end time of each of the time slots in the pre-run-time schedule reserved for execution of a corresponding periodic process, time capacity sufficient to complete execution of said corresponding periodic process and additional time capacity sufficient to complete execution of asynchronous processes which are not converted to new periodic processes and hence not mapped to time slots in the pre-run-time schedule and which have less latitude than said corresponding periodic process in meeting their respective deadlines (B)

during run-time using the information in the pre-run-time schedule, including the positions of the beginning time and end time of the time slots of the periodic processes, to schedule the process executions, including allowing executions of asynchronous processes that have not been mapped to time slots in the pre-run-time schedule to be completed within any time slot of a periodic process that has greater latitude than the latitude of the asynchronous processes in meeting their respective deadlines, such that all of said predetermined constraints will be satisfied.

36. The method as defined in claim 35 including, prior to the mapping step, converting one or more asynchronous processes having a worst-case computation time, deadline, minimum time between two requests constraints, into a set of new periodic processes, and reducing possible timing conflicts with other periodic or asynchronous processes with less latitude in meeting their respective deadlines, by taking into consideration the computation time requirements of the latter processes when determining the deadline of each of the new periodic processes, and mapping the new periodic process in a manner similar to mapping of other periodic processes.

37. The method as defined in claim 35 including, prior to generating the pre-run-time schedule, determining whether each asynchronous process should or should not be converted into a new periodic process, converting a subset of a predetermined set of asynchronous processes having worst-case computation time, deadline, minimum time between two requests constraints, which have been determined to be convertible, into a set of new periodic processes having worst-case computation time, period, deadline, and reducing possible timing conflicts with other periodic or asynchronous processes with less latitude in meeting their respective deadlines, by taking into consideration the computation time requirements of the latter processes when determining the deadline of the new periodic process.

38. The method as defined in claim 37, in which the determining step comprises
(1) calculating a first processor capacity that is required for the asynchronous process if left unconverted,
(2) calculating a second processor capacity which is required to be reserved for the new periodic process,
(3) determining whether the ratio of said first processor capacity to said second processor capacity exceeds a predetermined threshold value.

39. A method of scheduling on one or more processors, executions of a plurality of periodic processes, comprising:
(A)
automatically generating a pre-run-time schedule comprising mapping from a set of periodic process executions to a sequence of time slots on one or more processor time axes, each of the time slots having a beginning time and an end time, reserving each one of the time slots for execution of one of the periodic processes, the positions of the end time and the beginning time of each of the time slots being such that execution of the periodic processes,
including satisfaction of predetermined constraints comprising
(1) worst-case computation times,
(2) period,
(3) deadline,
(4) permitted range of offset constraints wherein a permitted range of offset of a periodic process comprising an interval that begins at a lower bound value and ends at an upper bound value which may be equal to the lower bound value, the duration of the time interval between the beginning of the first period of said periodic process and time zero must be greater than or equal to said lower bound value and less than or equal to said upper bound value,
(5) precedence relations wherein each precedence relation being defined between a selected pair of processes comprising a first process and a second process, both said first process and said second process being periodic processes, said first process precedes said second process, execution of said second process only allowed to start after said first process has completed its execution, and
(6) exclusion relations wherein each exclusion relation being defined between a selected pair of processes comprising a first process and a second process, said first process being either a periodic process or an asynchronous process, said first process excludes said second process, no execution of said second process being allowed to occur between the time that said first process starts its execution and the time that said first process completes its computation,
can be completed between the beginning time and end time of respective time slots,
(B) during run-time using the information in the pre-run-time schedule, including the positions of the beginning time and end time of the time slots of the periodic processes, to schedule the process executions such that all of said predetermined constraints will be satisfied.

40. The method as defined in claim 39, including generating the pre-run-time schedule as a feasible two-part pre-run-time-schedule for execution of periodic processes that may have non-zero offsets (a) an initial part which may be of zero length, and (b) a repeating part having length which is equal to a least common multiple of lengths of the periods of the periodic processes, all executions of all periodic processes within a time interval of length equal to the length of the least common multiple of the periodic process periods being included in the repeating part of the pre-run-time schedule, wherein all said predetermined constraints being satisfied for all executions of all periodic processes within said initial part and said repeating part.

41. The method as defined in claim 40, further including (A)

constructing a first schedule for executions of the periodic processes within an interval starting from zero and having length equal to maximum offset value plus a bounded number of times of the length of a least common multiple of the periodic process periods, conditions for determining feasibility requiring the existence of a point in said first schedule wherein starting from the latter point the schedule repeats in subschedule interval lengths equal to a least common multiple of lengths of the periodic process periods, timing of all executions of all periodic processes within a time interval having length equal to the length of the least common multiple of the periodic process periods being included in each said repeating subschedule interval, and including satisfaction of all predetermined constraints for all executions of all periodic processes within the subschedule interval starting from time zero and ending at said point plus the length of the least common multiple of the periodic process periods in said first schedule, and checking for the first occurrence of said point in said first schedule, (B)

generating said feasible two-pan pre-run-time-schedule by (1) using a subschedule interval starting from time zero and ending at said point in said first schedule as said initial pan of said feasible two-part pre-run-time schedule, and (2) using a subschedule interval starting from said point and ending at said point plus the length of the least common multiple of the periodic process periods in said first schedule as said repeating part of said feasible two-part pre-run-time schedule.

42. A method of determining whether each asynchronous process in an original set of asynchronous processes should or should not be converted into a new periodic process and included in a set of periodic processes that will be mapped to time slots in a pre-run-time schedule, each asynchronous process in said original set of asynchronous processes has predetermined asynchronous process constraints comprising worst-case computation time, deadline, and minimum time between two consecutive requests constraints, each periodic process in said set of periodic processes has predetermined periodic process constraints comprising permitted range of offset, worst-case computation time, deadline, period constraints, each new periodic process has new periodic process constraints comprising permitted range of offset, worst-case computation time, deadline, period constraints, said method steps comprising:

(A)

selecting one asynchronous process in said original set of asynchronous processes, (1) tentatively converting said one asynchronous process into a corresponding new periodic process, such that said asynchronous process constraints of said one asynchronous process will be satisfied by said new periodic process constraints of said corresponding new periodic process, (2) calculating a first processor capacity which is required to be reserved if said one asynchronous process is not converted, (3) calculating a second processor capacity which is required to be reserved if said one asynchronous process is converted, (4) including a copy of said one asynchronous process in a second set of asynchronous processes if the ratio of said first processor capacity to said second processor capacity exceeds a predetermined threshold, otherwise including said tentatively converted corresponding new periodic process in said set of periodic processes, (B)

repeating A until every asynchronous processes in said original set of asynchronous processes has been selected, (C)

repeating B, including removing from the periodic set any corresponding new periodic process that was included in the periodic set in any previous execution of B whenever a copy of a asynchronous process is to be included in the second set of asynchronous processes in the current execution of step B, further including removing any copy of an asynchronous process from the second asynchronous set that was included in the second asynchronous set in any previous execution of step A whenever any corresponding new periodic process is to be included in the set of periodic processes in the current execution of step A, (D)

terminating when no more changes to the second asynchronous set have occurred between the beginning and the end of any execution of C.

* * * * *